United States Patent
Jeong et al.

(10) Patent No.: US 9,961,667 B2
(45) Date of Patent: *May 1, 2018

(54) WEARABLE DEVICE AND METHOD OF SETTING RECEPTION OF NOTIFICATION MESSAGE THEREIN

(71) Applicant: SAMSUNG ELECTRONICS CO., LTD., Suwon-si (KR)

(72) Inventors: Kyung-ho Jeong, Seoul (KR); Sun-hwa Kim, Seoul (KR); Jin Ra, Suwon-si (KR); Jong-hyun Ryu, Suwon-si (KR); Chan-hong Min, Yongin-si (KR); Jung-hye Min, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/721,528

(22) Filed: May 26, 2015

(65) Prior Publication Data

US 2015/0341903 A1    Nov. 26, 2015

Related U.S. Application Data

(63) Continuation-in-part of application No. 14/582,794, filed on Dec. 24, 2014.

(30) Foreign Application Priority Data

May 23, 2014   (KR) .................. 10-2014-0062453
Mar. 30, 2015  (KR) .................. 10-2015-0044391

(51) Int. Cl.
*H04W 68/02*    (2009.01)
*H04W 4/00*     (2018.01)
(Continued)

(52) U.S. Cl.
CPC ......... *H04W 68/02* (2013.01); *H04M 1/7253* (2013.01); *H04W 4/008* (2013.01); *H04M 1/72547* (2013.01); *H04W 84/18* (2013.01)

(58) Field of Classification Search
CPC ....... H04W 4/005; H04W 4/008; H04W 4/12; H04W 4/14; H04W 56/00; H04W 56/001;
(Continued)

(56) References Cited

U.S. PATENT DOCUMENTS 6,477,117 B1   11/2002  Narayanaswami et al.
2007/0087790 A1  4/2007  Worick et al.
(Continued)

FOREIGN PATENT DOCUMENTS

KR   1020140023160 A   2/2014
KR   1020140032526 A   3/2014

OTHER PUBLICATIONS

Communication dated Sep. 8, 2015, issued by the European Patent Office in counterpart European Application No. 15168986.6.
(Continued)

*Primary Examiner* — Kwasi Karikari
(74) *Attorney, Agent, or Firm* — Sughrue Mion, PLLC

(57) ABSTRACT

Provided are a portable device, a wearable device, and a system including the same for setting a reception of a notification message in the wearable device. The portable device includes: a wireless communicator configured to receive, from a wearable device via wireless communication, information regarding a notification setting; and a controller configured to identify an event and to determine, based on the received information, whether to transmit a notification to the wearable device in response to the identified event.

22 Claims, 55 Drawing Sheets

(51) Int. Cl.
*H04M 1/725* (2006.01)
*H04W 84/18* (2009.01)

(58) Field of Classification Search
CPC . H04W 56/002; H04W 68/00; H04W 68/005; H04W 68/02; H04W 68/04; H04W 68/06; H04W 68/08; H04W 68/10; H04W 68/12
USPC ..... 455/412.2, 41.2, 556.1, 556.2, 566, 567, 455/575.6
See application file for complete search history.

(56) References Cited

U.S. PATENT DOCUMENTS

| | | | |
|---|---|---|---|
| 2008/0055194 A1 | 3/2008 | Baudino et al. | |
| 2010/0250794 A1* | 9/2010 | Hanks | G06F 1/3265 710/33 |
| 2013/0040610 A1* | 2/2013 | Migicovsky | H04L 1/1867 455/412.2 |
| 2013/0244576 A1* | 9/2013 | Morohoshi | H04B 5/0037 455/41.1 |
| 2014/0066024 A1 | 3/2014 | Lee et al. | |
| 2014/0077947 A1 | 3/2014 | Lee | |
| 2014/0108382 A1 | 4/2014 | Garg et al. | |
| 2014/0298353 A1* | 10/2014 | Hsu | G06F 9/54 719/313 |
| 2015/0020081 A1* | 1/2015 | Cho | G06F 9/542 719/318 |
| 2015/0208220 A1* | 7/2015 | Hulan | H04W 4/22 455/404.1 |
| 2015/0245185 A1 | 8/2015 | Park | |
| 2015/0289227 A1* | 10/2015 | Becker | H04W 68/00 455/41.3 |
| 2015/0309535 A1* | 10/2015 | Connor | G06F 1/1637 361/679.03 |

OTHER PUBLICATIONS

Communication dated Aug. 31, 2015, issued by the International Searching Authority in counterpart International Application No. PCT/KR2015/005202 (PCT/ISA/210 & PCT/ISA/237).

* cited by examiner

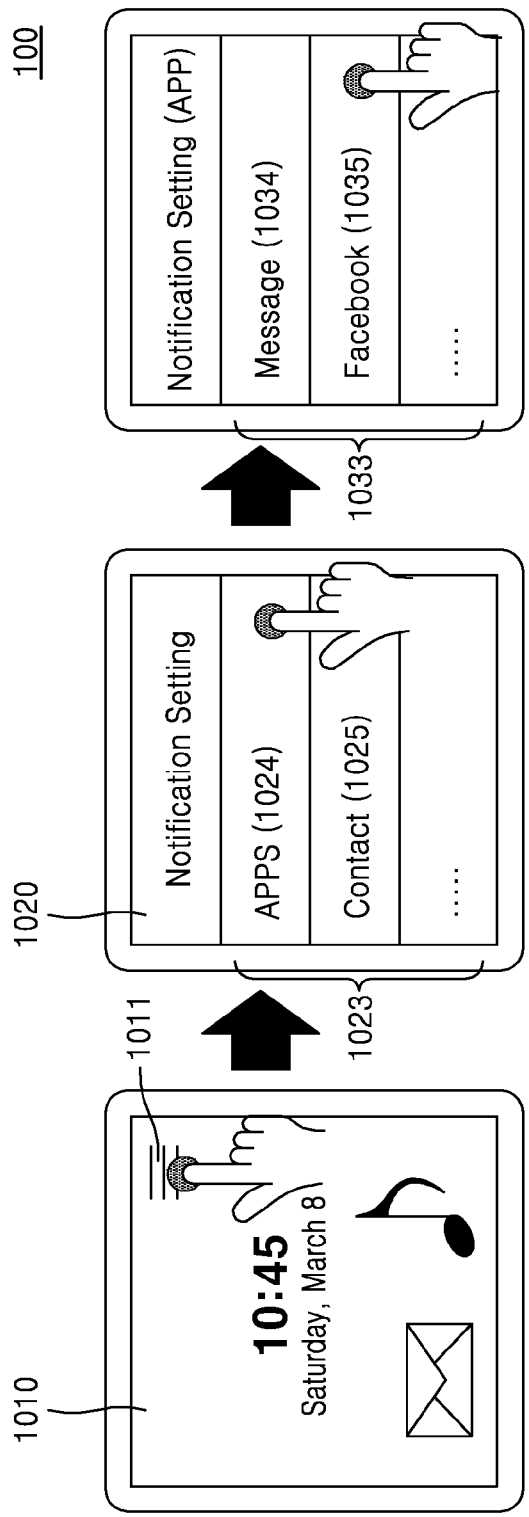

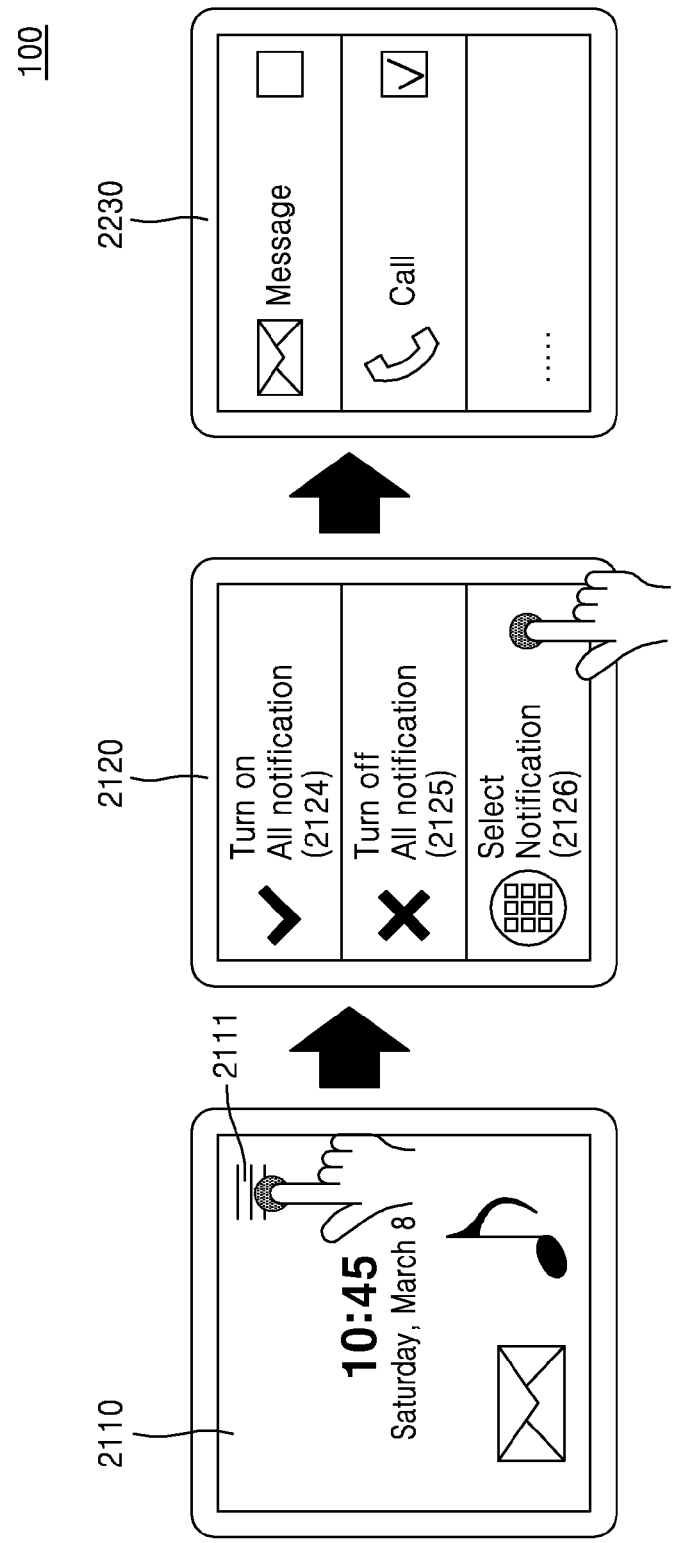

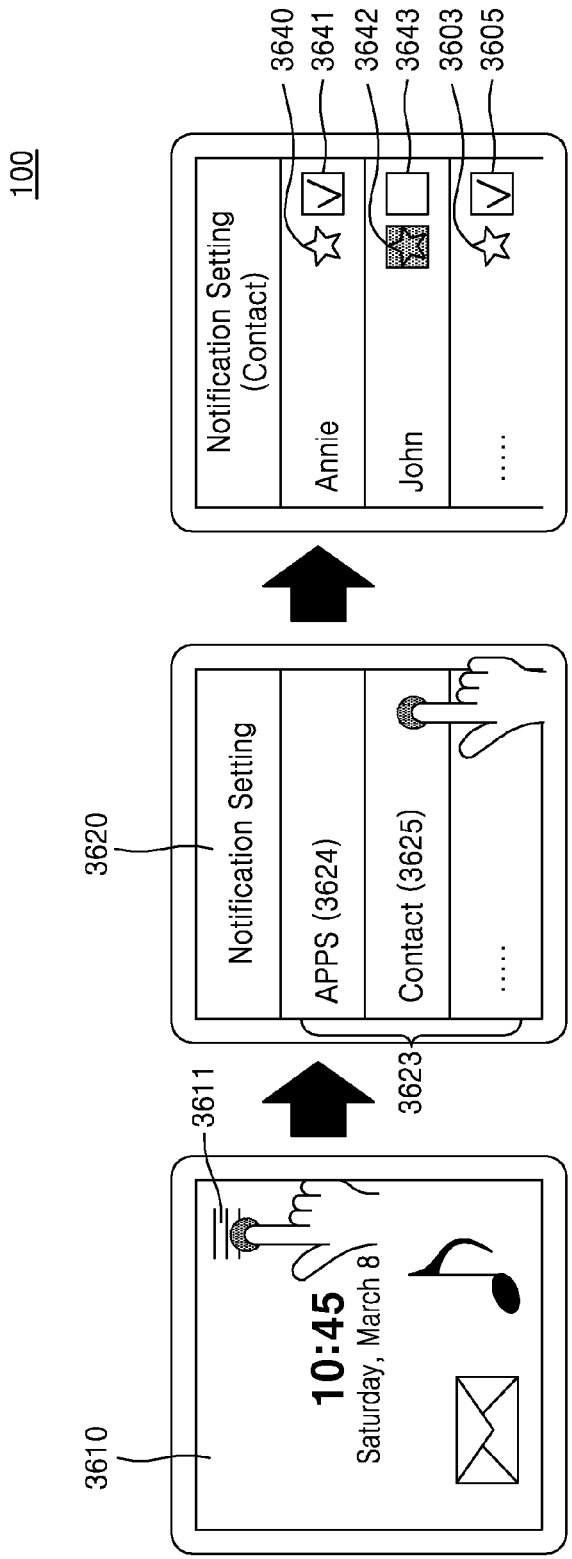

WEARABLE DEVICE AND METHOD OF SETTING RECEPTION OF NOTIFICATION MESSAGE THEREIN

CROSS-REFERENCE TO RELATED APPLICATIONS

This application is a continuation-in-part of U.S. patent application Ser. No. 14/582,794, filed on Dec. 24, 2014, in the US Patent Office, and claims priority from Korean Patent Application No. 10-2014-0062453, filed on May 23, 2014 in the Korean Intellectual Property Office, and Korean Patent Application No. 10-2015-0044391, filed on Mar. 30, 2015 in the Korean Intellectual Property Office, the disclosures of which are incorporated herein in their entireties by reference.

BACKGROUND

1. Field

Apparatuses and methods consistent with exemplary embodiments relate to a wearable device and a method of setting whether to receive a notification message in the wearable device.

2. Description of the Related Art

Due to the miniaturization of devices and the advance in communication technologies, wearable devices also have experienced remarkable development. Wearable devices refer to devices that are attachable to a user's body. For example, wearable devices may be in the form of a watch or glasses.

Since a wearable device is attached to a user's body, the wearable device may have superior accessibility and provide various services to a user together with or independently of a mobile device such as a cellular phone. However, in a related art wearable device, a setting related to an operation of the wearable device is performed by another device connected to the wearable device due to a small size, limited performance, and a limited input method of the wearable device. Therefore, there is a growing benefit for a method of performing a setting related to a wearable device directly in the wearable device.

SUMMARY

Aspects of one or more exemplary embodiments provide a wearable device and a method of setting whether to receive a notification message in the wearable device.

Additional aspects will be set forth in part in the description which follows and, in part, will be apparent from the description, or may be learned by practice of exemplary embodiments.

According to an aspect of an exemplary embodiment, there is provided a portable device including: a wireless communicator configured to receive, from a wearable device via wireless communication, information regarding a notification setting; and a controller configured to identify an event and to determine, based on the received information, whether to transmit a notification to the wearable device in response to the identified event.

The portable device may further include a storage configured to store the notification setting based on the received information, wherein in response to the event, the controller may determine, based on the stored notification setting, whether to transmit the notification to the wearable device.

The received information regarding the notification setting may include sender information, and in response to receiving a message from an external device, the controller may determine not to transmit, to the wearable device, a notification notifying of the received message when a sender of the received message corresponds to the sender information.

The portable device may further include a storage configured to store the received message.

The received information regarding the notification setting may include application information, and in response to an event caused by an application, the controller may determine not to transmit, to the wearable device, a notification for the event when the application corresponds to the application information.

The received information regarding the notification setting may include content information, and in response to an event related to content, the controller may determine not to transmit, to the wearable device, a notification for the event when the content corresponds to the content information.

The wireless communicator may transmit, to the wearable device, a first notification in response to the notification event, and may receive, from the wearable device, the information regarding the notification setting for the event in response to the transmitted first notification.

The received information regarding the notification setting may include at least one of sender information, application information, and content information included in the first notification, and the controller may determine the setting to not transmit a second notification for the event that corresponds to the at least one of the sender information, the application information, and the content information.

According to an aspect of another exemplary embodiment, there is provided a wearable device including: a wireless communicator configured to receive, from another device via wireless communication, a notification corresponding to an event identified by the other device; an output device configured to output the notification or an indicator of the notification; an input device configured to receive, in response to the output notification or the output indicator of the notification, a user input of a notification setting with respect to the received notification; and a controller configured to control the wireless communicator to transmit, to the other device, information regarding the notification setting, wherein the notification setting is a setting for transmission of notifications from the other device to the wearable device based on the user input with respect to the received notification.

The notification setting may correspond to sender information of the received notification, and the controller may control the wireless communicator to transmit the information regarding the notification setting to instruct the other device to not transmit, to the wearable device, a notification for an event when sender information of the event corresponds to the sender information of the received notification.

The notification setting may correspond to application information of the received notification, and the controller may control the wireless communicator to transmit the information regarding the notification setting to instruct the other device to not transmit, to the wearable device, a notification for an event when application information of the event corresponds to the application information of the received notification.

The notification setting may correspond to content information of the received notification, and the controller may control the wireless communicator to transmit the information regarding the notification setting to instruct the other device to not transmit, to the wearable device, a notification for an event when content information of the event corresponds to the content information of the received notification.

The controller may control the wireless communicator to transmit the information regarding the notification setting to instruct the other device to not transmit, to the wearable device, a notification for an event when attribute information of the event corresponds to selected attribute information of the received notification, selected via the received user input.

The controller may control the wireless communicator to transmit the information regarding the notification setting to instruct the other device to transmit, to the wearable device, a notification for an event when attribute information of the event corresponds to selected attribute information of the received notification, selected via the received user input.

The controller may control the wireless communicator to transmit the information regarding the notification setting to instruct the other device to prioritize a notification for an event when attribute information of the event corresponds to selected attribute information of the received notification, selected via the received user input.

The wireless communication may be a Bluetooth communication, a Bluetooth Low Energy (BLE) communication, a Near Field Communication (NFC), a Zigbee communication, an infrared data association (IrDA) communication, or a Wi-Fi Direct (WFD) communication.

According to an aspect of another exemplary embodiment, there is provided a portable device including: a first wireless communicator configured to perform a wireless communication, and a controller configured to identify an event and to transmit, via the first wireless communication, a first notification in response to the identified event; and a wearable device including: a second wireless communicator configured to receive, from the portable device via the wireless communication, the first notification, an output device configured to output the first notification or an indicator of the first notification, an input device configured to receive, in response to the output first notification or the output indicator of the first notification, a user input of a notification setting with respect to the received first notification, and a second controller configured to control the wireless communicator to transmit, to the other device, information regarding the notification setting, wherein the first wireless communicator is configured to receive, from the wearable device via the wireless communication, the information regarding the notification setting, and wherein in response to identifying the event again, the first controller is configured to determine, based on the received information, whether to transmit a second notification to the wearable device in response to the identified event.

The received information regarding the notification setting may include sender information, and in response to receiving a message from an external device, the first controller may determine not to transmit, to the wearable device, a notification notifying of the received message when a sender of the received message corresponds to the sender information.

The received information regarding the notification setting may include application information, and in response to an event caused by an application, the first controller may determine not to transmit, to the wearable device, a notification for the event when the application corresponds to the application information.

The received information regarding the notification setting may include content information, and in response to an event related to content, the first controller may determine not to transmit, to the wearable device, a notification for the event when the content corresponds to the content information.

According to an aspect of another exemplary embodiment, there is provided a wearable device including: a communicator configured to receive notification messages from a device connected to the wearable device via short-range wireless communication; a display configured to display at least one notification message; and a controller configured to determine the at least one notification message to be displayed on the display from among the received notification messages, based on information on whether to receive the at least one notification message.

The communicator may be further configured to receive, from the device, the information on whether to receive the at least one notification message.

According to an aspect of another exemplary embodiment, there is provided a device including: a display configured to display a setting on whether to receive notification messages; a communicator configured to transmit, to a wearable device connected to the device via short-range wireless communication, information on whether to receive the notification messages; and a controller configured to control, in a state where all the notification messages are set to be receivable by the wearable device, the communicator to receive a user input for changing a setting of receivable notification messages, to change the setting of the receivable notification messages, based on the received user input, and to transmit information on the changed setting to the wearable device.

BRIEF DESCRIPTION OF THE DRAWINGS

These and/or other aspects will become apparent and more readily appreciated from the following description of exemplary embodiments, taken in conjunction with the accompanying drawings in which:

FIGS. 10A and 10B illustrate examples of a notification message reception setting screen in a wearable device, according to an exemplary embodiment;

FIGS. 21 and 22 illustrate examples of a screen for setting whether to receive all notification messages in a wearable device, according to an exemplary embodiment;

FIGS. 35A, 35B, and 36 illustrate examples of a screen for setting whether to receive a notification message and whether to prefer the notification message in a wearable device, according to an exemplary embodiment;

DETAILED DESCRIPTION OF EXEMPLARY EMBODIMENTS

Figure 1:
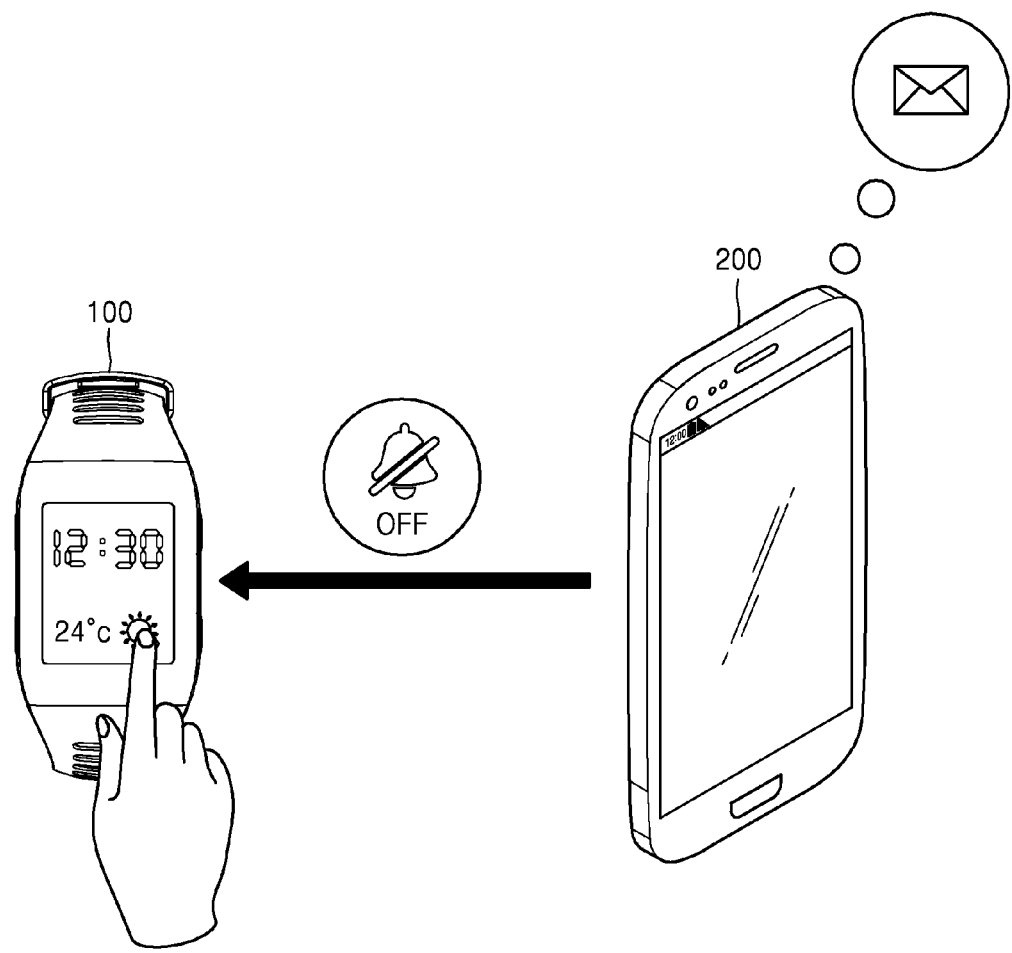
FIG. 1 illustrates a system for a method of setting whether to receive a notification message in a wearable device, according to an exemplary embodiment.

Reference will now be made in detail to exemplary embodiments, examples of which are illustrated in the accompanying drawings, wherein like reference numerals refer to like elements throughout. In this regard, exemplary embodiments may have different forms and should not be construed as being limited to the descriptions set forth herein. Accordingly, exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Throughout the specification, it will be understood that when an element is referred to as being "connected" to another element, it can be directly connected to the other element, or electrically connected to the other element while intervening elements may also be present. It will also be understood that the terms "comprises", "includes", and "has", when used herein, specify the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software.

A "device" as used herein may include at least one of a personal computer (PC), a cellular phone, a smart phone, a television (TV), a tablet PC, a personal digital assistant (PDA), a portable multimedia player (PMP), a navigation device, an MP3 player, a digital camera, a server device, a workstation, a portable device, etc. However, it is understood that exemplary embodiments are not limited thereto.

A "wearable device" as used herein may include a watch, a bracelet, a ring, glasses, a hair band, a hat, a headband, a wristband, a clothing item, a necklace, a clothing accessory, a wearable accessory device, etc., which have a communication operation and a data processing operation. However, it is understood that exemplary embodiments are not limited thereto.

A notification message (i.e., notification) as used herein may be generated by a device, based on a notification event (i.e., event), or may be received from a server by a device or a wearable device, although it is understood that exemplary embodiments are not limited thereto. The notification message is a message generated when a notification event occurs, and may include one or more contents. In addition, the contents included in the notification message may include information on the notification event, as well as at least one of a text, an image, music, and a moving picture data. However, it is understood that exemplary embodiments are not limited thereto, and the contents related to the notification message may be received separately from the notification message or from the information on the notification event.

The notification event as used herein is an event that occurs based on information received from an external server or information included in the device, and may refer to the occurrence in response to which the notification is to be provided to the user. For example, the notification event may refer to reception of a short messaging service (SMS) message and arrival at the notification time.

Throughout the specification, attribute information of the notification message may refer to information related to the notification message or included in the notification message. For example, the attribute information of the notification message may include at least one of application information included in the notification message, sender information included in or corresponding to the notification message, content (or content category) information included in or corresponding to the notification message, information on the notification message generation time, content (e.g., content of an SMS message, an email, a news update, etc.) included in or corresponding to the notification message, recipient information included in or corresponding to the notification message, biometric information included in or corresponding to the notification message, date information included in or corresponding to the notification message, time information included in or corresponding to the notification message, physical condition information included in or corresponding to the notification message, environment information included in or corresponding to the notification message, etc. However, it is understood that exemplary embodiments are not limited thereto.

Throughout the specification, the notification message corresponding to one or more selected attributes among the attributes of the notification message may include at least one of a notification message including the same attribute as the selected attribute, a notification message including the selected attribute, and a notification message including an attribute corresponding to the selected attribute.

FIG. 1 illustrates a system for a reception setting method of a wearable device 100, according to an exemplary embodiment.

Referring to FIG. 1, the wearable device 100 may be connected to a device 200 through a network. The network may include at least one of a local area network, a wide area network, a value added network, a mobile radio communication network, a personal area network, etc. However, exemplary embodiments are not limited thereto and may include any types of wired or wireless networks.

The wearable device 100 may receive a notification message from the device 200 through the network. In addition, the wearable device 100 may directly receive a notification message from an external server.

According to one or more exemplary embodiments, the notification message may include a notification message received from the server by the device 200, or may include a notification message generated by the device 200. However, exemplary embodiments are not limited thereto. In addition, according to one or more exemplary embodiments, various contents such as a text, an image, a moving picture, and music may be included in the notification message. However, exemplary embodiments are not limited thereto.

The wearable device 100 may set whether to receive a notification message from the device 200 in the wearable device 100, i.e., may set or determine a notification setting. According to one or more exemplary embodiments, the wearable device 100 may select an attribute of a notification message and set, as a notification setting, whether to receive a notification message corresponding to the selected attribute. Here, the wearable device 100 may transmit information regarding the notification setting to the device 200. The information regarding the notification setting may include, by way of example, sender information, application information, content information, category information, biometric information, time information, recipient information, date information, etc.

Furthermore, it is understood that the information regarding the notification setting may not include specific attribute information, but may merely indicated a type of attribute information (or may correspond to a predetermined type of attribute information). In this case, the device 200 receiving the information regarding the notification setting may identify the specific attribute information from the event, from the original notification message previously sent to the wearable device 100, etc.

For example, the wearable device 100 may select sender information of a received notification message and set whether to receive a notification message including the same sender information as the selected sender information. According to one or more exemplary embodiments, attribute information of the notification message is information included in the notification message and may refer to information that serves as criteria for setting whether to transmit the notification message and whether to receive the notification message. According to one or more exemplary embodiments, the sender information may include a telephone number, an identifier (ID), an email address, and account information. However, exemplary embodiments are not limited thereto.

According to one or more exemplary embodiments, the wearable device 100 may generate notification message reception setting information that is information indicating whether to receive a notification message. In addition, the wearable device 100 may transmit, to the device 200, information on whether to receive a notification message, i.e., the information regarding the notification setting.

Upon reception of a notification message, the wearable device 100 may set whether to receive a notification message corresponding to an attribute of the received notification message, i.e., set the notification setting. In addition, upon display of content included the received notification message, the wearable device 100 may set whether to receive the received notification message and a notification message corresponding to an attribute of the content within the notification message.

In addition, the wearable device 100 may select an attribute of a notification message and set whether to prefer, prioritize, etc., a notification message corresponding to the selected attribute.

The wearable device 100 may determine a method of displaying a notification message, based on the attribute of the notification message and whether to prioritize the notification message.

According to one or more exemplary embodiments, the wearable device 100 may acquire (i.e., obtain) bio signal information (e.g., biometric information) from a user and select an attribute of the notification message or determine whether to display the notification message, based on the acquired bio signal information. In addition, the wearable device 100 may transmit the acquired bio signal information to the device 200. Here, the bio signal information may be obtained by one or more sensors included on the wearable device 100.

The device 200 may receive, from the wearable device 100, information on whether to receive the notification message, i.e., information regarding a notification setting. The device 200 may selectively transmit the notification message to the wearable device 100, based on the received information on whether to receive the notification message.

According to one or more exemplary embodiments, the device 200 may change notification message transmission setting information (i.e., notification setting), which is notification message transmission information of the device 200, based on the notification message reception information received from the wearable device 100. In addition, the device 200 may store the changed notification message transmission setting information.

According to one or more exemplary embodiments, the device 200 may selectively transmit the notification message to the wearable device 100, based on the information on whether to prioritize the notification message that is received from the wearable device 100. In addition, the device 200 may determine an amount of data to be transmitted to the wearable device 100 with respect to an amount of data of content included in the notification message, based on the information on whether to prioritize the notification message, or based on other information or settings (e.g., a message data size setting, a default setting, a user setting, an application's setting, etc.).

According to one or more exemplary embodiments, the device 200 may receive bio signal information from the wearable device 100. The device 200 may select an attribute of a notification message to be transmitted to the wearable device 100, based on the received bio signal information.

Figure 2:
FIG. 2 illustrates an example of a screen of a wearable device, according to an exemplary embodiment.

FIG. 2 illustrates an example of a screen of the wearable device 100, according to one or more exemplary embodiments.

Referring to FIG. 2, at least one of a text, an image, and a moving picture may be displayed on a screen 201 of the wearable device 100. However, exemplary embodiments are not limited thereto.

In addition, according to one or more exemplary embodiments, the wearable device 100 may display various types of information on the screen 201. For example, the wearable device 100 may display at least one of time information, weather information, information on whether to receive the notification message, information on the presence or absence of the received notification message, information on communication or a state of a provided service such as music, and body information (e.g., biometric information) acquired from a user. However, exemplary embodiments are not limited thereto.

According to one or more exemplary embodiments, some pieces of information displayed on the screen 201 of the wearable device 100 may be displayed in the form of an image such as an icon, a symbol, a thumbnail, a widget, a graphical user interface (GUI) item, etc.

According to one or more exemplary embodiments, the wearable device 100 may include various user receiving input devices that receive a user input, such as a hard key, a touch screen, a dial, a switch, etc. However, exemplary embodiments are not limited thereto. According to one or more exemplary embodiments, the wearable device 100 may receive a user input and display information corresponding to the received user input on the screen 201.

Figure 3A:
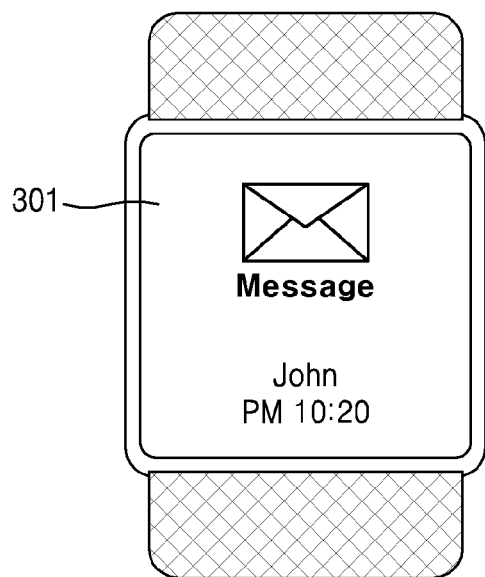
FIGS. 3A to 3C illustrate examples of a screen and a form of display of a wearable device, according to an exemplary embodiment.
Figure 3B:
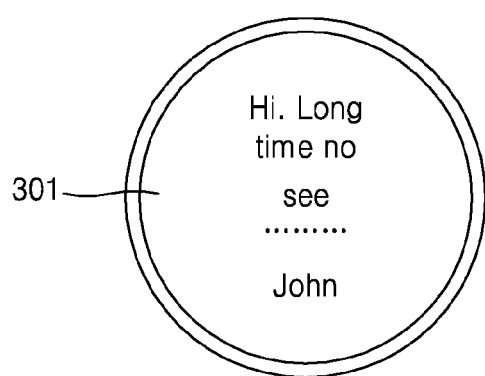
Figure 3C:
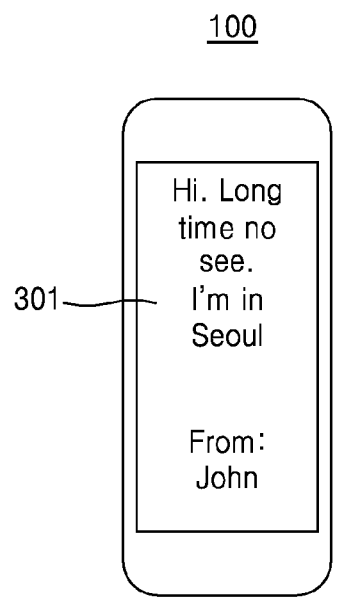

FIGS. 3A to 3C illustrate examples of a screen and a form of a display of the wearable device 100, according to one or more exemplary embodiments.

Referring to FIG. 3A, the display of the wearable device 100 may have a square shape. Referring to FIG. 3B, the display of the wearable device 100 may have a circular shape. Referring to FIG. 3C, the display of the wearable device 100 may have a rectangular shape. However, exemplary embodiments are not limited thereto.

FIG. 3A to 3C illustrate a screen 301 of the wearable device 100 when (i.e., in response to) the wearable device 100 receives a notification message.

According to one or more exemplary embodiments, upon (i.e., after or in response to) reception of the notification message, the wearable device 100 may display at least one of the notification message, an image, symbol, or icon indicating the reception of the notification message, a notification message reception time, information on an application type associated with the notification message, a sender, a subject, and an additional message corresponding to the notification message. However, exemplary embodiments are not limited thereto. Referring to FIGS. 3B and 3C, the wearable device 100 may display, on the screen 301, an image or a text indicating the reception of a notification message generated by a notification event from a sender "John".

According to one or more exemplary embodiments, the additional message corresponding to the notification message may include information on an operation for confirming the notification message, or information on an operation for executing or receiving content included in or related to the notification message. However, exemplary embodiments are not limited thereto. For example, the wearable device 100 may display a message indicating that an additional user input is needed for displaying content included in or related to the notification message on the screen, or indicating that the notification message has a new attribute that has not been received by the wearable device 100 before (e.g., a first ever notification message corresponding to a particular application, a notification message corresponding to a received message from a new or unrecognized sender, etc.).

According to one or more exemplary embodiments, upon (i.e., after or in response to) reception of the notification message, the wearable device 100 may display attribute information of the received notification message. For example, at least one of application information, sender information, and reception time information, which are included in the notification message, may be displayed. However, exemplary embodiments are not limited thereto.

Referring to FIG. 3A, upon reception of the notification message, the wearable device 100 may display information indicating that the notification message has been received. For example, upon reception of the notification message, the wearable device 100 illustrated in FIG. 3A displays information indicating that the notification message has been received. The wearable device 100 may receive a user input and selectively display content included in the received notification message according to the received user input.

Referring to FIG. 3B, upon reception of the notification message, the wearable device 100 may display only some contents among all contents included in the notification message. According to one or more exemplary embodiments, the wearable device 100 may receive, from the device 200, only a portion of an amount of data from among a total amount of data of the content included in the notification message, and display the content corresponding to the received portion of the amount of the data. In addition, the wearable device 100 may display only the content corresponding to a predetermined amount of data on the screen 301. Furthermore, according to one or more exemplary embodiments, when the wearable device 100 receives the content related to the notification message, the same method may apply to the wearable device 100.

For example, upon reception of the notification message, the wearable device 100 illustrated in FIG. 3B may receive, from the device 200, only data corresponding to a part of texts included in the notification message, or may display only a part of texts included in the notification message on the screen 301 of the wearable device 100. The wearable device 100 may receive a user input and selectively display all contents included in the received notification message according to the received user input.

Referring to FIG. 3C, upon (i.e., after or in response to) reception of the notification message, the wearable device 100 may display all contents included in the notification message. For example, upon reception of the notification message, the wearable device 100 illustrated in FIG. 3C may display all contents included in the notification message.

According to one or more exemplary embodiments, the wearable device 100 may change information displayed on the screen 301, based on the user input, and may change a method of displaying information on the screen 301.

Furthermore, according to one or more exemplary embodiments, the wearable device 100 may not display, upon receiving a notification message, any notification message or information indicating the notification message has been received until a user operates the wearable device 100 in a particular manner (e.g., wake up from sleep mode according to a predetermined gesture or operation of a button or other input device of the wearable device 100).

Figure 4A:
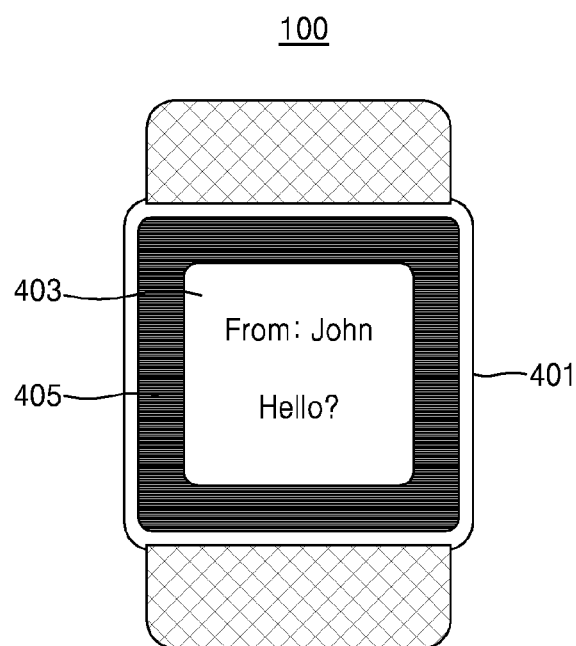
FIGS. 4A and 4B illustrate examples of a screen of a wearable device, according to an exemplary embodiment.
Figure 4B:
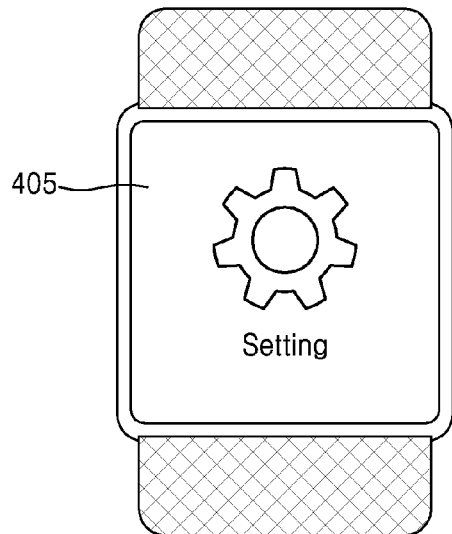

FIGS. 4A and 4B illustrate examples of a screen of the wearable device 100, according to one or more exemplary embodiments;

According to one or more exemplary embodiments, the wearable device 100 may display information on a screen 401 in a method different from those of FIGS. 3A to 3C.

For example, as compared to the screen 301 of the wearable device 100, the content included in the notification message and sender information of the notification message may be displayed on the screen 401 of the wearable device 100 of FIG. 4A in a different order. In addition, according to one or more exemplary embodiments, the wearable device 100 may display an area 403 where the notification message is displayed and an area 405 where the notification message is not displayed, with different colors, different levels of illumination or brightness, etc.

According to one or more exemplary embodiments, the wearable device 100 may determine a displaying method of the screen 401, based on an attribute of the received notification message (e.g., display a content or sender information of the notification message if the notification message corresponds to an SMS message, and display information indicating the notification message has been received if the notification message corresponds to a phone call or an email message). In addition, as described above, the wearable device 100 may change the displaying method of the screen 401, based on a user input.

FIG. 4B illustrates an example of a setting menu screen of the wearable device 100, according to one or more exemplary embodiments.

Referring to FIG. 4B, the wearable device 100 may change predetermined information of the wearable device 100, based on a received user input. For example, the wearable device 100 of FIG. 4B may display a setting menu screen 405 for setting the operation of the wearable device 100, based on the user input.

According to one or more exemplary embodiments, the setting menu of the wearable device 100 may allow a user to set at least one of whether to receive the notification message, a size of a text displayed on the screen, a communication method of the wearable device 100, an interworking between the wearable device 100 and the device 200, a screen brightness of the wearable device 100, a sound output method of the wearable device 100, a vibration output method of the wearable device 100, a sleep mode (e.g., in which the display remains off unless operated by a user), an information display mode or setting (e.g., whether to implement any of the above-described display methods of FIGS. 3A to 3C), etc. However, exemplary embodiments are not limited thereto.

Figure 5A:
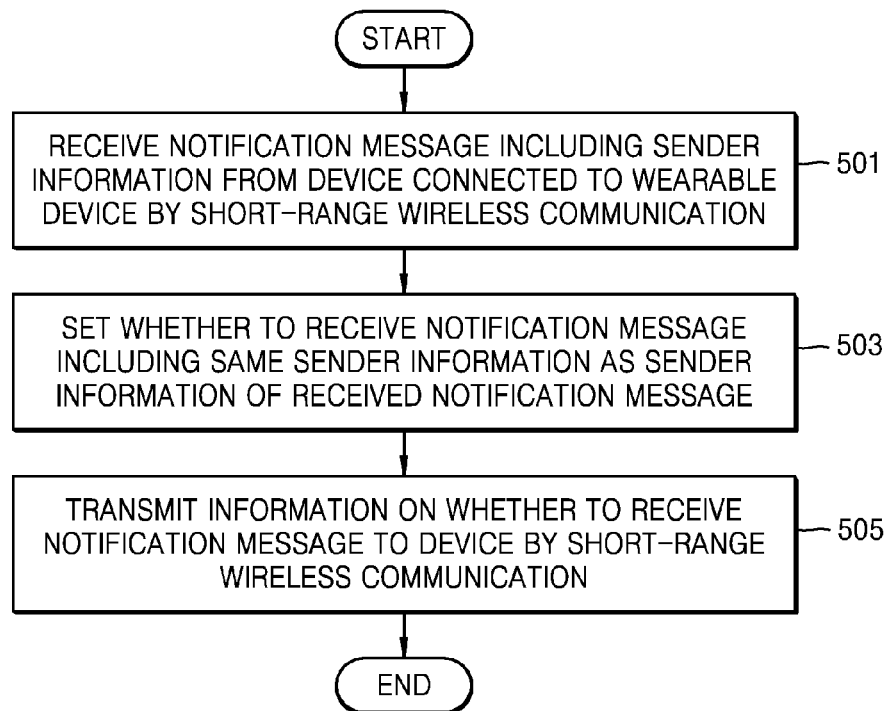
FIGS. 5A and 5B illustrate flowcharts of a method of setting whether to receive a notification message in a wearable device, according to an exemplary embodiment.
Figure 5B:
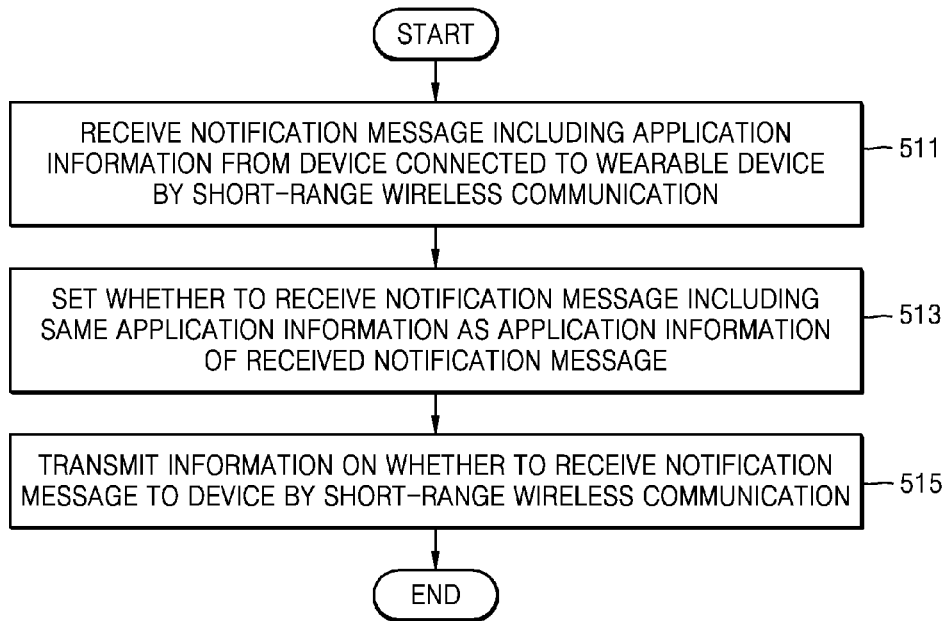

FIGS. 5A and 5B illustrate a flowchart of a method of setting whether to receive a notification message in the wearable device 100, according to one or more exemplary embodiments.

FIG. 5A illustrates a flowchart of a method of setting whether to receive a notification message in the wearable device 100, based on sender information, according to one or more exemplary embodiments.

In operation 501, the wearable device 100 may receive a notification message including sender information from the device 200 connected to the wearable device 100 through short-range wireless communication. According to one or more exemplary embodiments, the short-range wireless communication may include various communications that may be performed within a predetermined range. For example, the short-range wireless communication may include a near field communication (NFC), Bluetooth, Bluetooth Low Energy (BLE), Ultra Wide Band (UWB), Zig-Bee, WiFi-Direct, a location limited communication protocol channel, but is not limited thereto.

According to one or more exemplary embodiments, the wearable device 100 may acquire the sender information from the received notification message. According to one or more exemplary embodiments, the sender information may include information capable of identifying the source of the notification message, like a provider of the notification message, such as a telephone number, an ID of a social network service (SNS) application, an email address, a communication protocol address (e.g., an Internet Protocol address), an alias, a screen name, a username, a handle, etc., but is not limited thereto.

In operation 503, the wearable device 100 may select or set (e.g., according to a user input) whether to receive a notification message including the same sender information as the sender information of the received notification message.

According to one or more exemplary embodiments, the wearable device 100 may block notification messages including the same sender information as the sender information of the received notification message. In addition, according to another exemplary embodiment, the wearable device 100 may select whether to receive a notification message including the same application information as the application information of the received notification message.

According to another exemplary embodiment, the wearable device 100 may select whether to receive a notification message including the same content information as the content information of the received notification message. Here, a same content information may refer to, for example, a same content as the received notification message, a same content as a message or message header (e.g., subject line) corresponding to the received notification message (e.g., an email corresponding to the notification message), or a same attribute as the received notification message. Furthermore, according to another exemplary embodiment, the wearable device 100 may select whether to receive a notification message including the same recipient information as the recipient information of the received notification message. For example, the wearable device 100 may select to not receive notification message corresponding to messages sent to a particular group chat, to any group chats, to a particular messaging group, to any messaging groups, to a particular listserv, to any listservs, etc.

According to one or more exemplary embodiments, the wearable device 100 may determine (i.e., select or set) to block all notification messages in the wearable device 100. In addition, the wearable device 100 may determine to receive a notification message including the same sender information as the sender information of the received notification message and block all or some other notification messages with different sender information.

According to another exemplary embodiment, the wearable device 100 may determine to receive a notification message including the same application information as the application information of the received notification message and block all or some other notification messages with different application information. According to another exemplary embodiment, the wearable device 100 may determine to receive a notification message having a same content information as the received notification message, and block all or some other notification messages with different content information. Furthermore, according to another exemplary embodiment, the wearable device 100 may determine to receive a notification message including the same recipient information as the recipient information of the received notification message, and block all or some other notification messages with different recipient information.

According to one or more exemplary embodiments, the wearable device 100 may determine whether to prioritize the notification message including the same sender information as the sender information of the received notification message or, according to one or more other exemplary embodiments, including the same application information as the application information of the received notification message, including the same content information as the content information of the received notification message, including the same recipient information as the recipient information of the received notification message, etc. In addition, the wearable device 100 may determine a method of displaying the received notification message, based on information on whether to prioritize the notification message.

In operation 505, the wearable device 100 may transmit the information on whether to receive the notification message (i.e., the information regarding the notification setting) to the device 200 by, for example, the short-range wireless communication.

According to one or more exemplary embodiments, the information on whether to receive the notification message may include the sender information of the received notification message.

According to one or more other exemplary embodiments, the information may alternatively or additionally include at least one of the application information of the received notification message, the content information of the received notification message, the recipient information of the received notification message, etc.

According to one or more exemplary embodiments, the information on whether to receive the notification message may include the sender information included in the received notification message, and the information on whether to receive the notification message including the same sender information as the sender information included in the notification message.

According to one or more other exemplary embodiments, the information may alternatively or additionally include at least one of the application information of the received notification message, the content information of the received notification message, the recipient information of the received notification message, etc., and the information on whether to receive the notification message including the same application information as the application information included in the notification message, the same content information as the content information included in the notification message, the same recipient information as the recipient information included in the notification message, etc.

According to one or more exemplary embodiments, the wearable device 100 may change predetermined information on whether to receive a notification message, based on the information on whether to receive the notification message. In addition, the wearable device 100 may store the changed information on whether to receive the notification message.

According to one or more exemplary embodiments, the wearable device 100 may transmit information on whether to prioritize the notification message to the device 200.

Based on operations 501 to 505, the wearable device 100 may selectively receive notification messages according to senders.

FIG. 5B illustrates a flowchart of a method of setting whether to receive a notification message in the wearable device 100, based on application information, according to one or more exemplary embodiments.

In operation 511, the wearable device 100 may receive a notification message including application information from the device 200 connected to the wearable device 100 through short-range wireless communication.

According to one or more exemplary embodiments, the wearable device 100 may acquire the application information from the received notification message. According to one or more exemplary embodiments, the application information may include information capable of identifying the application, such as information on an application related to the notification message, an application version, an application developer, and an account within the application, but is not limited thereto.

In operation 513, the wearable device 100 may select whether to receive a notification message including the same application information as the application information of the received notification message.

According to one or more exemplary embodiments, the wearable device 100 may block the notification message including the same application information as the application information of the received notification message. In addition, the wearable device 100 may select whether to receive a notification message including the same sender information as the sender information of the received notification message. According to one or more exemplary embodiments, the wearable device 100 may block the notification message generated by a notification event of a TWITTER application (generated from the TWITTER application).

In operation 515, the wearable device 100 may transmit the information on whether to receive the notification message to the device 200 by the short-range wireless communication.

According to one or more exemplary embodiments, the information on whether to receive the notification message may include the application information of the received notification message. According to one or more exemplary embodiments, the information on whether to receive the notification message may include the application information included in the received notification message, and the information on whether to receive the notification message, including the same application information as the application information included in the notification message.

Based on operations 511 to 515, the wearable device 100 may selectively receive notification messages according to applications.

While the above-described exemplary embodiments are with reference to settings based on sender information, application information, content information, and recipient information, it is understood that one or more other exemplary embodiments are not limited thereto, and, for example, can be based on other types of attribute information. Additionally, according to one or more other exemplary embodiments, the settings and information regarding the notification setting may be based on or include combinations of the above-described information. For example, the wearable device 100 may select or determine to not receive notification messages from a particular sender to a particular recipient, i.e., with a same sender information and a same recipient information as those of a received notification message. According to another example, the wearable device 100 may select or determine to not receive notification messages from a particular sender with a particular content, i.e., with a same sender information and a same content information as those of the received notification message.

Figure 6:
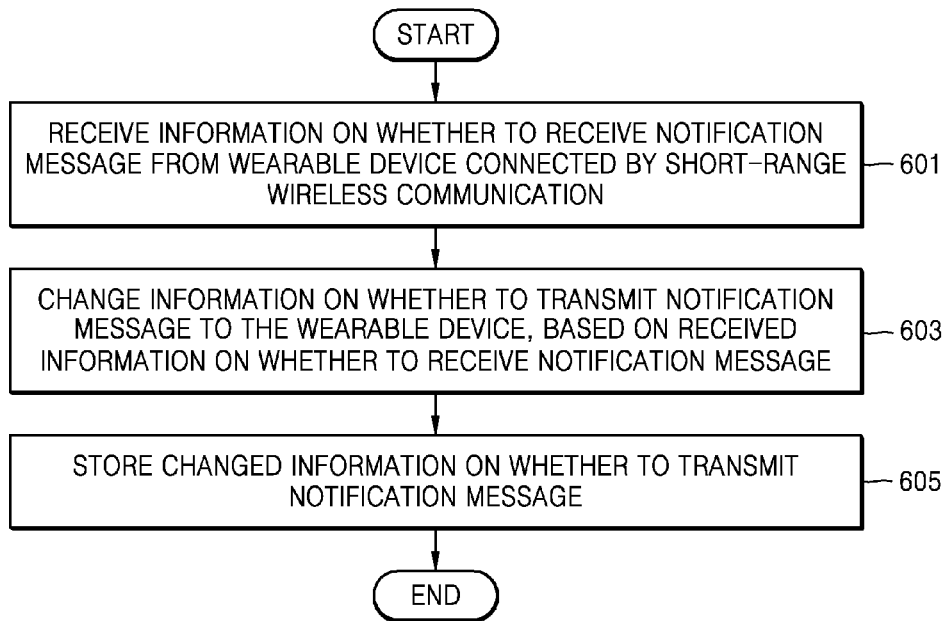
FIG. 6 illustrates a flowchart of a method of setting whether to transmit a notification message in a device, according to an exemplary embodiment.

FIG. 6 illustrates a flowchart of a method of setting whether to transmit a notification message in the device 200, according to one or more exemplary embodiments.

In operation 601, the device 200 may receive information on whether to receive a notification message from the wearable device 100 connected to the device 200 by short-range wireless communication. Since the short-range wireless communication corresponds to that described above, a detailed description thereof is omitted here.

According to one or more exemplary embodiments, the information on whether to receive the notification message may include information on an attribute selected by the wearable device 100, and information on whether to receive a notification message corresponding to the selected attribute.

According to one or more exemplary embodiments, the device 200 may receive information on whether to prioritize the notification message from the wearable device 100.

In operation 603, the device 200 may change notification message transmission information (i.e., notification transmission setting or information regarding a notification transmission setting) of the wearable device 100, based on the received information on whether to receive the notification message.

According to one or more exemplary embodiments, the device 200 may change a predetermined notification message transmission setting of the device 200, based on the received information on whether to receive the notification message.

In operation 605, the device 200 may store the changed notification transmission setting.

According to one or more exemplary embodiments, the device 200 may acquire a notification message generated by a notification event. The device 200 may generate a notification message based on a notification event, or receive a notification message from a server.

According to one or more exemplary embodiments, the device 200 may selectively transmit the acquired notification message to the wearable device 100 by the short-range wireless communication, based on the notification transmission setting.

Figure 7:
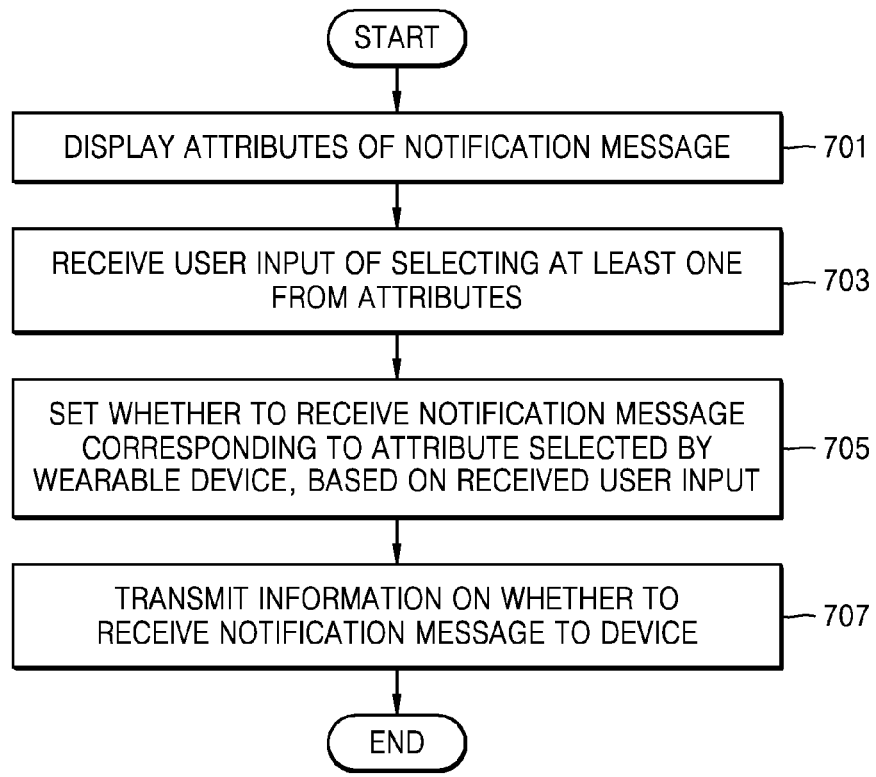
FIG. 7 illustrates a flowchart of a method of setting whether to receive a notification message in a wearable device, according to an exemplary embodiment.

FIG. 7 illustrates a flowchart of a method of setting whether to receive a notification message in the wearable device 100, according to one or more exemplary embodiments.

In operation 701, the wearable device 100 may display attributes of the notification message. According to one or more exemplary embodiments, the wearable device 100 may receive the notification message and display attributes of the received notification message. In addition, the wearable device 100 may receive the notification message, display contents included in the received notification message, and display attributes of the displayed notification message and attributes of the contents included in the notification message.

According to one or more exemplary embodiments, the wearable device 100 may display a list of the attributes of the notification message. A format of the list of the attributes of the notification message may be a text format or an icon format. However, exemplary embodiments are not limited thereto.

According to one or more exemplary embodiments, the wearable device 100 may display the list of the attributes of the notification message in an entire area or partial area of the screen of the wearable device 100, and display the list of the attributes of the notification message in a screen switching method, a popup method, a screen splitting method, etc.

According to one or more exemplary embodiments, the wearable device 100 may display a list including a part of attributes of the notification message. For example, the wearable device 100 may display a list including only application information and sender information among the application information, the sender information, and the reception time information included in the notification message.

According to one or more exemplary embodiments, the wearable device 100 may display a list of the attributes of the notification message, based on a predetermined input method. In addition, the wearable device 100 may display a list of the attributes of the notification message, based on a user input of selecting a predetermined icon displayed on the screen.

In operation 703, the wearable device 100 may receive a user input of selecting at least one from the attributes. The wearable device 100 may receive the user input by using a touch screen, a hard key, a sensor included in the wearable device 100, such as an acceleration sensor, a dial, etc., However, exemplary embodiments are not limited thereto.

According to one or more exemplary embodiments, the wearable device 100 may determine that a predetermined attribute has been selected, based on the user input. For example, the wearable device 100 may determine that the user input of touching a predetermined position for a predetermined time is an input of selecting a sender of the notification message among the attributes of the notification message.

In operation 705, the wearable device 100 may set whether to receive a notification message corresponding to the attribute selected by the wearable device 100, based on the received user input. According to one or more exemplary embodiments, the wearable device 100 may determine to always receive or block the notification message corresponding to the selected attribute.

According to one or more exemplary embodiments, the wearable device 100 may determine whether to receive notification messages according to senders, or determine whether to receive notification messages according to applications, contents, recipients, etc. In addition, the wearable device 100 may determine whether to receive the notification message, based on the information capable of identifying a sender related to a predetermined application. For example, a notification message from an ID "Sheldon" among notification messages related to a social media application (e.g., FACEBOOK application) may be blocked.

According to one or more exemplary embodiments, the wearable device 100 may determine to block all notification messages regardless of attributes, or may determine to block all other notification messages except for the notification message(s) set to be always received. In addition, the wearable device 100 may determine to selectively receive the notification message, based on time and location. However, exemplary embodiments are not limited thereto.

According to one or more exemplary embodiments, the wearable device 100 may receive a predetermined user input, and determine whether to receive the notification message including the attribute selected in operation 703 in the wearable device 100, based on the received user input. For example, the wearable device 100 may sequentially receive a user input of selecting an application related to the notification message among the attributes of the notification message, and a user input of blocking the notification message related to the selected application.

According to one or more exemplary embodiments, the wearable device 100 may determine whether to prioritize or prefer the notification message corresponding to the selected attribute. By determining whether to prioritize the notification message corresponding to the selected attribute, the wearable device 100 may always receive the notification message corresponding to the prioritized or preferred attribute, or display the corresponding notification message on the screen of the wearable device 100 in accordance with a predetermined method.

In operation 707, the wearable device 100 may transmit information on whether to receive the notification message to the device 200. The wearable device 100 may generate the information on whether to receive the notification message, based on the information set in operation 705, and transmit the generated information to the device 200 that is interworked with the wearable device 100. The information on whether to receive the notification message may include information on the attribute of the notification message that is selected by the wearable device 100, information on whether to receive the notification message corresponding to the selected attribute, and information on whether to block the notification message corresponding to the selected attribute. In addition, the information on whether to receive the notification message may include information on the wearable device 100 and information on the device 200.

According to one or more exemplary embodiments, the wearable device 100 may transmit information on whether to prioritize the notification message to the device 200. The information on whether to prioritize the notification message may include information on the attribute of the notification message that is selected by the wearable device 100, and information on whether to prioritize the notification message corresponding to the selected attribute.

According to one or more exemplary embodiments, the device 200 may determine the attribute corresponding to the notification message to be transmitted from the device 200 to the wearable device 100, based on the information on whether to receive the notification message that is received from the wearable device 100.

Figure 8:
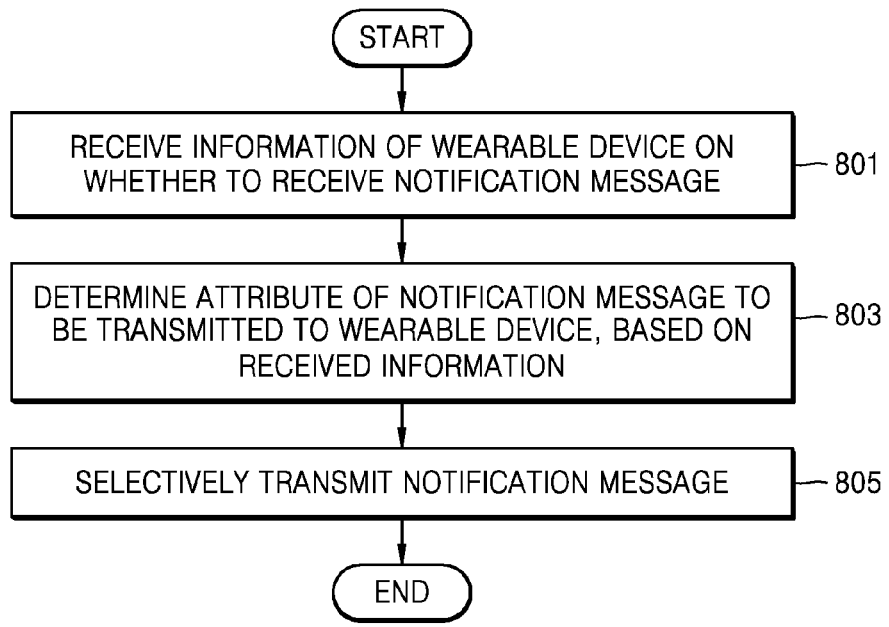
FIG. 8 illustrates a flowchart of a method of setting whether to transmit a notification message in a device, according to an exemplary embodiment.

FIG. 8 illustrates a flowchart of a method of setting whether to transmit a notification message to the wearable device 100, which is performed in the device 200, according to one or more exemplary embodiments.

In operation 801, the device 200 may receive information of the wearable device 100 on whether to receive a notification message.

According to one or more exemplary embodiments, the device 200 may receive the information of the wearable device 100 on whether to receive the notification message by short-range wireless communication. The device 200 may receive information of the wearable device 100 on whether to receive the notification message from an external server connected to the wearable device 100, or through a relay device. The information on whether to receive the notification message may include information on an attribute of the notification message that is selected by the wearable device 100, information on whether to receive the notification message corresponding to the selected attribute, and information on whether to block the notification message corresponding to the selected attribute.

In operation 803, the device 200 may determine an attribute of a notification message to be transmitted to the wearable device 100, based on the received information. The device 200 may determine the attribute of the notification message to be transmitted to the wearable device 100, based on the attribute of the notification message included in the information on whether to receive the notification message that is received from the wearable device 100, information on whether to receive the notification message corresponding to the attribute, or information on whether to block the notification message corresponding to the attribute.

According to one or more exemplary embodiments, the device 200 may change the notification message transmission setting of the device 200, based on the information on whether to receive the notification message that is received from the wearable device 100.

According to one or more exemplary embodiments, the device 200 may receive information of the wearable device 100 on whether to prioritize the notification message. According to one or more exemplary embodiments, the device 200 may determine an amount of data to be transmitted to the wearable device 100 with respect to a total amount of data of content included in the notification message, based on the information on whether to prioritize the notification message.

According to one or more exemplary embodiments, the device 200 may determine an amount of data to be transmitted to the wearable device 100 with respect to a total amount of data of content related to the notification message, based on the information on whether to prioritize the notification message.

For example, the device 200 may transmit only 500 kilobytes (KBs) of a one megabyte (MB) text data, which is included in the notification message, to the wearable device 100. Alternatively, the device 200 may not transmit the notification message including content of 500 KB or more to the wearable device 100.

According to one or more exemplary embodiments, the device 200 may transmit the notification message to the wearable device 100 after changing a resolution of an image included in the notification message to a predetermined size. When the content included in the notification message to be transmitted to the wearable device 100 is a moving picture or music, the device 200 may set whether to provide the content by using a streaming method, whether to transmit a still image, whether to transmit a thumbnail image, whether to transmit a preview image, etc.

In operation 805, the device 200 may selectively transmit the notification message to the wearable device 100. According to one or more exemplary embodiments, when a notification event occurs, the device 200 may analyze (e.g., determine, parse, etc.) an attribute of an acquired notification message corresponding to the notification event, and selectively transmit the acquired notification message to the wearable device 100, based on the analyzed attribute of the notification message and the attribute of the notification message to be transmitted to the wearable device 100 that is determined in operation 803.

Figure 9:
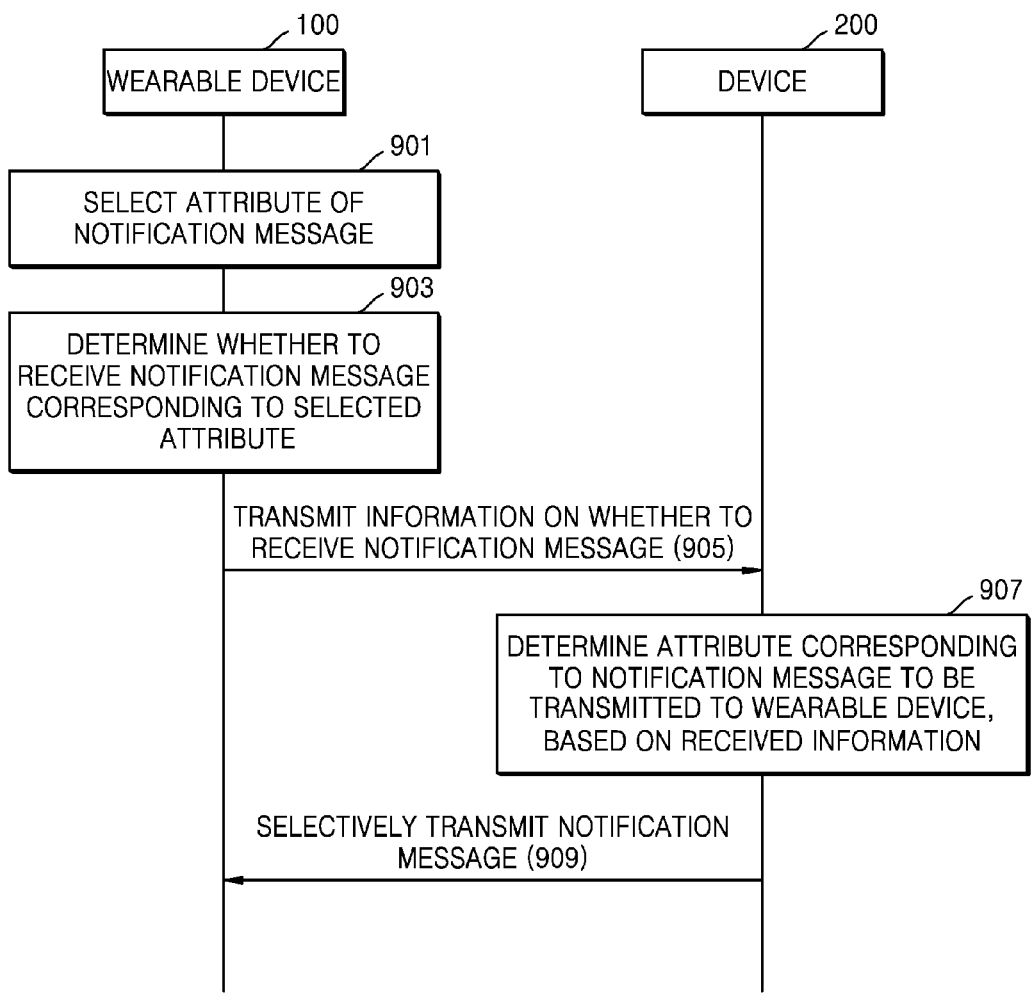
FIG. 9 illustrates a flowchart of a method of setting whether to receive a notification message between a wearable device and a device, according to an exemplary embodiment.

FIG. 9 illustrates a flowchart of a method of setting whether to receive a notification message between the wearable device 100 and the device 200, according to one or more exemplary embodiments.

In operation 901, the wearable device 100 may select an attribute of a notification message. For example, the wearable device 100 may display a list of attributes of the notification message, and select an attribute of the notification message, based on a user input of selecting one of the attributes from the list. According to another exemplary embodiment, the wearable device 100 may select a plurality of attributes of the notification message based on one or more user input.

In operation 903, the wearable device 100 may determine whether to receive a notification message corresponding to the selected attribute. For example, the wearable device 100 may determine whether to receive the notification message corresponding to the attribute of the notification message that is selected in operation 901, based on the user input.

According to one or more exemplary embodiments, the wearable device 100 may determine whether to prefer or prioritize the notification message corresponding to the attribute of the notification message that is selected in operation 901, based on the user input.

In operation 905, the wearable device 100 may transmit the information on whether to receive the notification message to the device 200. The wearable device 100 may generate, set, or obtain the information on whether to receive the notification message, based on the determination in operation 903, and transmit the generated information to the device 200.

In operation 907, the device 200 may determine the notification message to be transmitted to the wearable device 100, based on the information on whether to receive the notification message that is received from the wearable device 100.

According to one or more exemplary embodiments, the device 200 may change a notification message transmission setting of the device 200, based on the information on whether to receive the notification message that is received from the wearable device 100, and store information on the changed notification message transmission setting. In addition, the device 200 may store the changed notification message transmission setting as or to a predetermined mode, and apply the changed notification message transmission setting according to a user input of selecting the predetermined mode.

In operation 909, the device 200 may selectively transmit the notification message to the wearable device 100. For example, the device 200 may determine the notification message to be transmitted to the wearable device 100 according to the attribute of the notification message that is determined in operation 907.

Figure 10B:
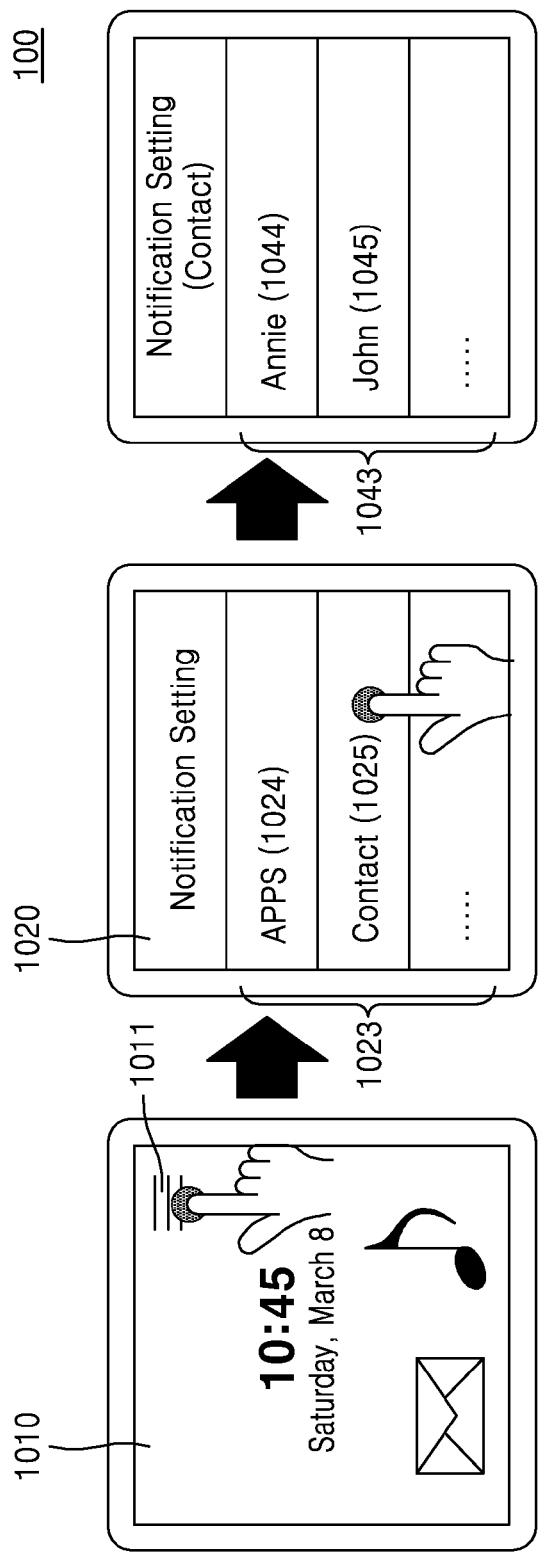

FIGS. 10A and 10B illustrate examples of a notification message setting screen of a wearable device 100, according to one or more exemplary embodiments.

The wearable device 100 may display a screen 1010 for notification message reception setting based on a user input. According to one or more exemplary embodiments, the user input may include an icon selection input, a predetermined pattern input, and a predetermined gesture input, but is not limited thereto. In addition, according to one or more exemplary embodiments, when a sensor included in the wearable device 100 acquires a threshold value or a value greater than a threshold value, the wearable device 100 may determine that the user input has been received.

Referring to FIG. 10A, the wearable device 100 may display an icon 1011 for a notification message reception setting on the screen 1010 of the wearable device 100. According to one or more exemplary embodiments, the wearable device 100 may display at least one of information on time and information on a service that may be provided by the wearable device 100, as well as the icon 1011 for the notification message reception setting, but is not limited thereto.

The wearable device 100 may receive a user input of selecting the icon 1011 for the notification message reception setting. When the user input of selecting the icon 1011 is received, the wearable device 100 may display a setting window 1020 for the notification message reception setting on the screen of the wearable device 100. The setting window 1020 for the notification message reception setting may be displayed on the entire screen of the wearable device 100, but is not limited thereto.

In addition, the setting window 1020 may display a list 1023 of attributes of the notification message. For example, the list of the attributes of the notification message may include an application (AP) field 1024 and a contact field 1025. According to one or more exemplary embodiments, the wearable device 100 may determine whether to receive the notification message, based on the attributes of the notification message.

The wearable device 100 may receive a user input of selecting the application field 1024. The wearable device 100 may display a list 1033 of a plurality of applications according to the reception of the user input of selecting the application field 1024. According to one or more exemplary embodiments, the plurality of applications may include applications installed on the device 200. The list 1033 of the plurality of applications may display fields corresponding to the respective applications. For example, the list 1033 of the plurality of applications may include a field 1034 corresponding to a message application and a field 1035 corresponding to a FACEBOOK application.

The wearable device 100 may receive a user input of selecting at least one from the respective fields corresponding to the plurality of applications. When the wearable device 100 receives the user input of selecting the field 1035 corresponding to the FACEBOOK application, the wearable device 100 may change the setting of whether to receive the notification message related to the FACEBOOK application among the notification messages in the wearable device 100.

For example, by receiving the user input of selecting the field 1035 corresponding to the FACEBOOK application, the wearable device 100 may be set to not receive the notification message generated by the notification event (for example, a push notification) related to the FACEBOOK application in the wearable device 100.

In addition, when the wearable device 100 receives the user input of selecting at least one from the respective fields corresponding to the plurality of applications, the wearable device 100 may display a list of detailed attributes of the applications. For example, the wearable device 100 may receive the user input of selecting the field 1035 corresponding to the FACEBOOK application, and display information capable of identifying a sender related to the FACEBOOK application (e.g., an account of a user and an account of another user registered as a friend). By receiving the user input of selecting the information capable of identifying the sender related to the FACEBOOK application, the wearable device 100 may change the setting of whether to receive the notification message from a certain sender in the wearable device 100 among the notification messages related to the FACEBOOK application.

Referring to FIG. 10B, the wearable device 100 may display an icon 1011 for a notification message reception setting on the screen 1010 of the wearable device 100.

The wearable device 100 may receive a user input of selecting the icon 1011 for the notification message reception setting. Since this corresponds to that of FIG. 9, a detailed description thereof is omitted here.

The setting window 1020 may display a list 1023 of attributes of the notification message. For example, the list of the attributes of the notification message may include an application (AP) field 1024 and a contact field 1025.

The wearable device 100 may receive a user input of selecting the contact field 1025. The wearable device 100 may display a list 1034 of a plurality of contacts according to the reception of the user input of selecting the contact field 1025. According to one or more exemplary embodiments, the contact may refer to stored information capable of identifying senders.

In addition, the list 1043 of the plurality of contacts may display fields corresponding to the respective contacts. For example, the list 1043 of the plurality of applications may include a field 1044 corresponding to a contact of Annie and a field 1045 corresponding to a contact of John.

The wearable device 100 may receive a user input of selecting at least one from the respective fields corresponding to the plurality of contacts. When the wearable device 100 receives the user input of selecting the field 1045 corresponding to the contact of John, the wearable device 100 may change the setting of whether to receive the notification message from John among the notification messages in the wearable device 100. For example, the wearable device 100 may be set to not receive the notification message including the sender information of John.

According to one or more exemplary embodiments, the wearable device 100 may display a list of attributes of the notification message, select at least one from the displayed list of the attributes, and receive a user input of determining whether to receive the notification message corresponding to the selected attribute.

According one or more exemplary embodiments, the wearable device 100 may display the selected field and the unselected field with different colors, or display a text within the selected field with different colors, but is not limited thereto.

Figure 11:
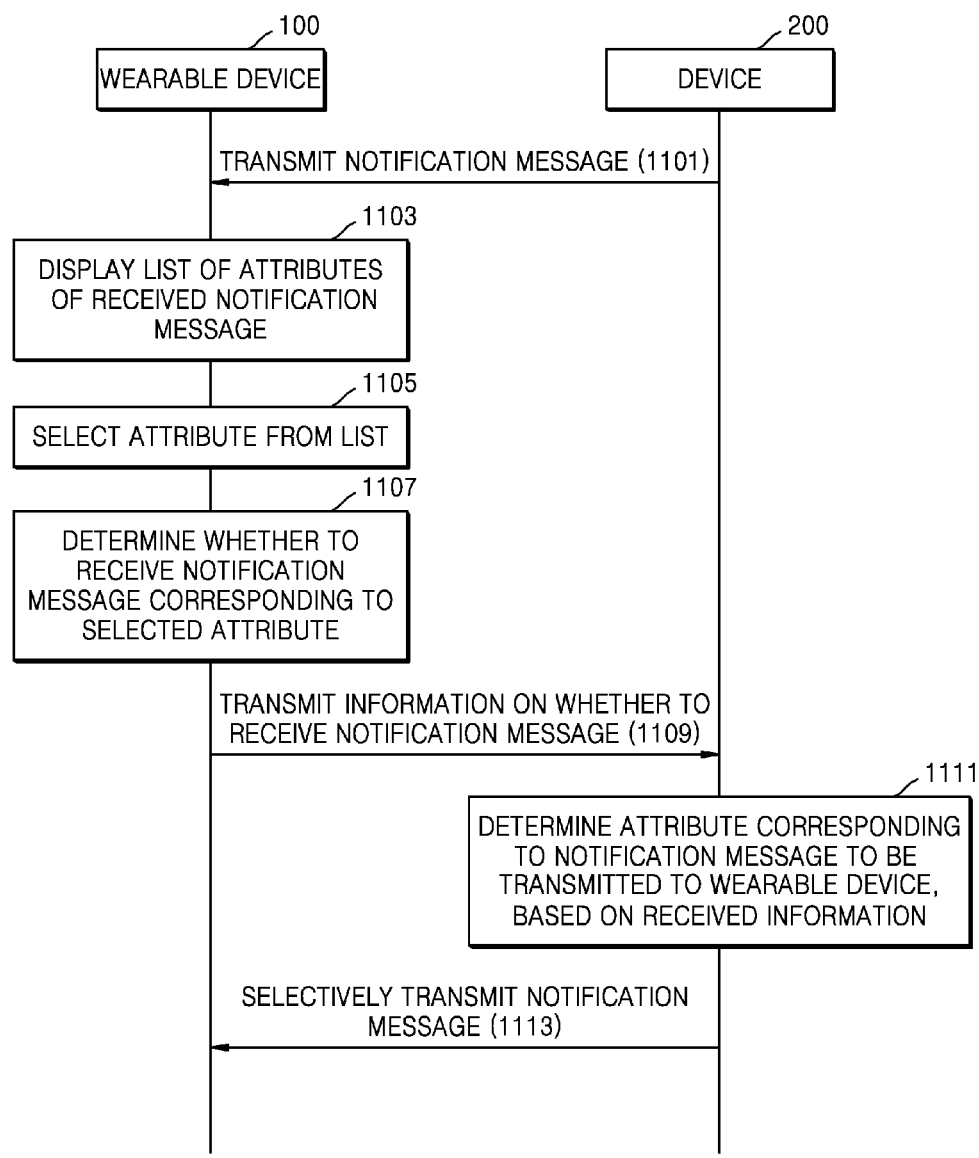
FIG. 11 illustrates a flowchart of a method of setting whether to receive a notification message in a wearable device upon reception of the notification message, according to an exemplary embodiment.

FIG. 11 illustrates a flowchart of a method of setting whether to receive a notification message in a wearable device 100 upon (i.e., after or in response to) reception of the notification message, according to one or more exemplary embodiments.

In operation 1101, the device 200 may transmit a notification message to the wearable device 100. The device 200 may selectively transmit the notification message to the wearable device 100, based on a predetermined transmission setting. According to one or more exemplary embodiments, the device 200 may transmit the information to the wearable device 100 by short-range wireless communication.

In operation 1103, the wearable device 100 may display a list of attributes of the received notification message. The wearable device 100 may determine the attributes included in the notification message received from the device 200, and display the list of the attributes of the received notification message, based on the determination result. For example, the wearable device 100 may determine the attributes of the notification message, such as application information, sender information, content information, reception information, etc., which are included in the received notification message, and display the list of the attributes of the notification message, based on the determination result.

In operation 1105, the wearable device 100 may select one or more attributes of the notification message. The wearable device 100 may display the list of the attributes of the received notification message, which is displayed in operation 1103, and select one or more attributes of the notification message, based on a user input of selecting at least one attribute from the list.

In operation 1107, the wearable device 100 may determine whether to receive a notification message corresponding to the selected one or more attributes. According to one or more exemplary embodiments, the wearable device 100 may be set to block or always receive the notification message corresponding to the selected attribute.

In operation 1109, the wearable device 100 may transmit the information on whether to receive the notification message. For example, the wearable device 100 may generate notification message reception setting information, based on the determination on whether to receive the notification message in operation 1107, and transmit the generated notification message reception setting information. According to one or more exemplary embodiments, the notification message reception setting information may include information on the selected one or more attributes and information on whether to receive the notification message corresponding to the selected one or more attributes.

In operation 1111, the device 200 may determine one or more attributes corresponding to a notification message to be transmitted to the wearable device 100, based on the information received from the wearable device 100. The device 200 may receive information on whether to receive the notification message including information indicating the blocking of the notification message including information on a certain attribute (e.g., sender) selected by the wearable device 100, and determine a notification message to be transmitted, based on the received information on whether to receive the notification message.

According to one or more exemplary embodiments, the device 200 may change the notification message transmission setting of the device 200, based on the notification message reception setting information that is received from the wearable device 100. In addition, the device 200 may store the changed notification message transmission setting information.

In operation 1113, the wearable device 100 may selectively transmit the notification message. According to one or more exemplary embodiments, the device 200 may generate the notification message according to the occurrence of the notification event. The device 200 may generate the notification message based on information received from a server, or generate the notification message according to the notification event in the device 200. In addition, the device 200 may receive the notification message itself from the server.

The device 200 may determine one or more attributes of the generated notification message, compare the one or more attributes with the one or more attributes determined in operation 1111, and selectively transmit the notification message to the wearable device 100 accordingly.

Figure 12:
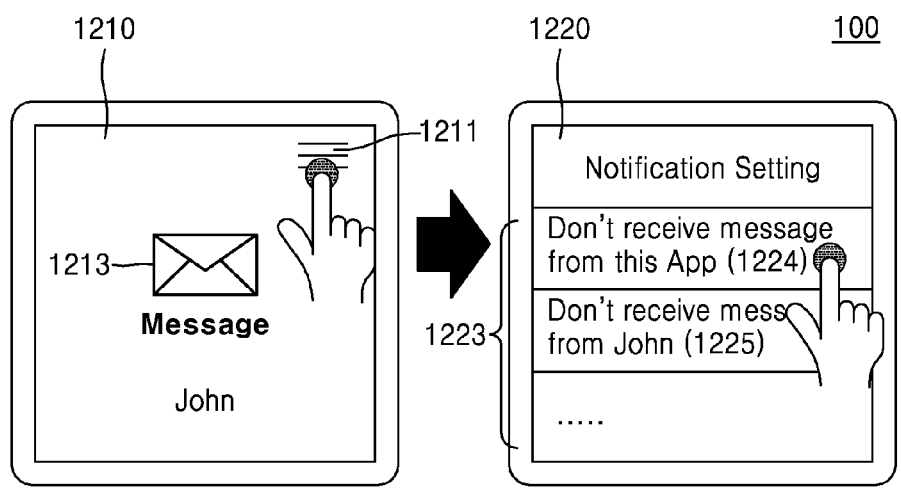
FIGS. 12 and 13 illustrate examples of a screen for setting whether to receive a notification message upon reception of the notification message in a wearable device, according to an exemplary embodiment.
Figure 13:
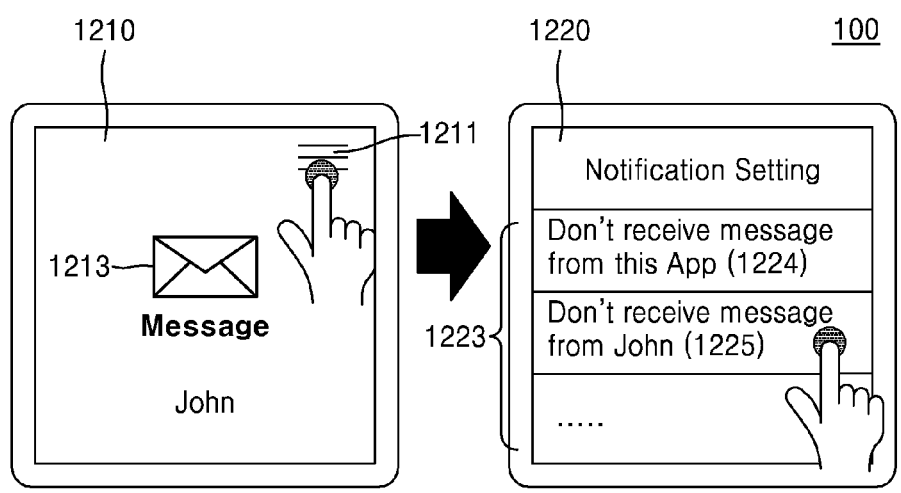

FIGS. 12 and 13 illustrates examples of a screen for setting whether to receive a notification message in a wearable device 100 upon (i.e., after or in response to) reception of the notification message, according to one or more exemplary embodiments.

Referring to FIG. 12, the wearable device 100 may display an icon 1213 indicating the reception of the notification message on a screen 1210 of the wearable device 100. The icon illustrated in FIG. 12 is merely exemplary and is not limited thereto.

According to one or more exemplary embodiments, the wearable device 100 may display at least one of information on time and information on a service that may be provided by the wearable device 100, as well as the icon 1213 indicating the reception of the notification message, but is not limited thereto.

The wearable device 100 may receive a user input of selecting an icon 1211 for a notification message reception setting. When the user input of selecting the icon 1211 is received, the wearable device 100 may display a setting window 1220 for the notification message reception setting on the screen of the wearable device 100. The setting window 1220 for the notification message reception setting may be displayed on the entire screen of the wearable device 100, but is not limited thereto.

In addition, the setting window 1220 may display fields 1223 for setting whether to block the notification message. For example, the fields 1223 for setting whether to block the notification message may include an application blocking setting field 1224 indicating that the notification message related to the application corresponding to the received notification message is not received, and a sender blocking setting field 1225 indicating that the notification message related to a sender corresponding to the received notification message is not received, but is not limited thereto.

The wearable device 100 may receive a user input of selecting the application blocking setting field 1224. Based on the received user input, the wearable device 100 may be set to not receive the notification message from the application corresponding to the received notification message. For example, the wearable device 100 may be set to not receive the notification message including the same application information as the application information included in the received notification message.

Referring to FIG. 13, the wearable device 100 may receive a user input of selecting the sender blocking setting field 1225. Based on the received user input, the wearable device 100 may be set to not receive the notification message from the sender corresponding to the received notification message. For example, the wearable device 100 may be set to not receive the notification message including the same sender information as the sender information included in the received notification message.

Figure 14:
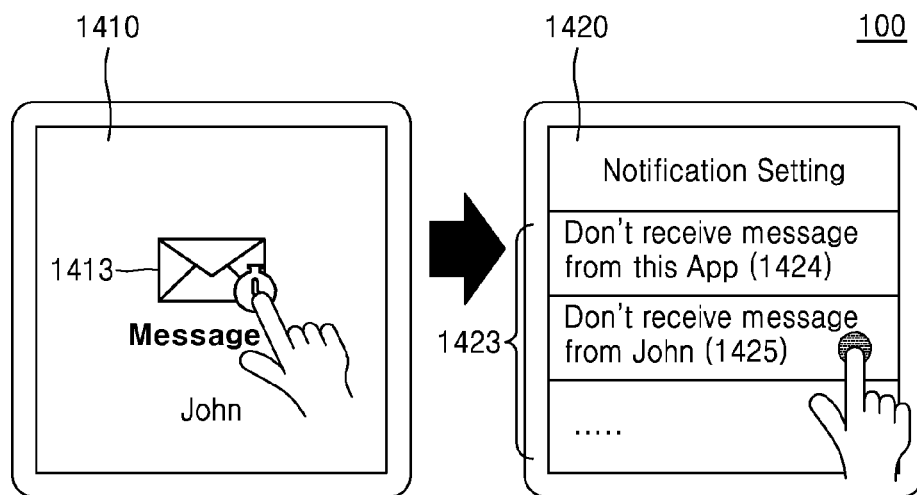
FIGS. 14 and 15 illustrate examples of a screen for setting whether to receive a notification message in a wearable device upon reception of the notification message, according to an exemplary embodiment.
Figure 15:
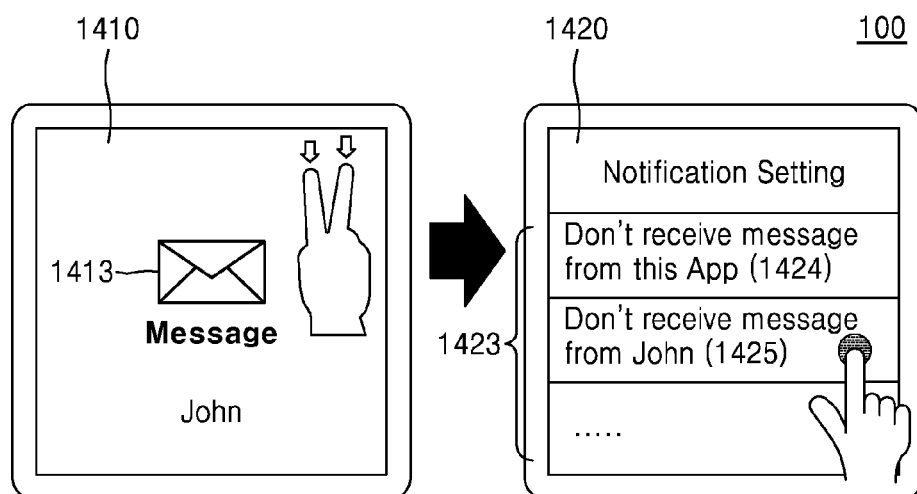

FIGS. 14 and 15 illustrates examples of a screen for setting whether to receive a notification message in a wearable device 100 upon (i.e., after or in response to) reception of the notification message, according to one or more exemplary embodiments.

Referring to FIG. 14, the wearable device 100 may display an icon 1413 indicating the reception of the notification message on a screen 1410 of the wearable device 100. The icon illustrated in FIG. 14 is merely exemplary and is not limited thereto. Since this corresponds to those described with reference to FIGS. 12 and 13, a detailed description thereof is omitted here.

When comparing FIGS. 14 and 15 with FIGS. 12 and 13, the icons 1211 for the notification message reception setting are not displayed on the screen 1410. The wearable device 100 may receive a predetermined input from a user, based on predetermined information, and display a setting window 1420 for a notification message reception setting, based on the received input. Referring to FIG. 14, the wearable device 100 may receive a user input of clicking an icon indicating the reception of the notification message for a predetermined time, and display the setting window 1420, based on the received information. However, exemplary embodiments are not limited thereto.

When the user input for the notification message reception setting is received, the wearable device 100 may display the setting window 1420 on the screen of the wearable device 100. Since this corresponds to those described with reference to FIGS. 12 and 13, a detailed description thereof is omitted here.

In addition, the setting window 1420 may display a blocking setting list 1423. For example, the blocking setting list 1423 may include an application blocking setting field 1424 and a sender blocking setting field 1425, but is not limited thereto.

The wearable device 100 may receive a user input of selecting the application blocking setting field 1424. Based on the received user input, the wearable device 100 may be set to not receive the notification message from the application corresponding to the received notification message.

Referring to FIG. 15, the wearable device 100 may display an icon 1413 indicating the reception of the notification message on the screen 1410 of the wearable device 100. Since this corresponds to those described with reference to FIGS. 12 to 14, a detailed description thereof is omitted here.

The wearable device 100 may receive a user input for a notification message reception setting. According to one or more exemplary embodiments, the wearable device 100 may receive a predetermined input from a user, based on predetermined information, and display a setting window 1420 for a notification message reception setting, based on the received input.

Referring to FIG. 15, the wearable device 100 may receive a user input such as a swipe input, and display the setting window 1420 for the notification message reception setting, based on the received user input. However, exemplary embodiments are not limited thereto. The swipe input refers to an action of shifting an object on a screen by a predetermined distance in a horizontal or vertical direction in a state of being touched with a finger or a touch tool.

The wearable device 100 may receive a user input of selecting the sender blocking setting field 1425 included in the blocking setting list 1423 displayed on the setting window 1420. Based on the received user input, the wearable device 100 may be set to not receive the notification message from the sender corresponding to the received notification message.

While in the exemplary embodiments described above with reference to FIGS. 12 through 15, the notification message reception setting is set based on a screen, an icon, or a window, it is understood that one or more other exemplary embodiments are not limited thereto. For example, according to another exemplary embodiment, the notification message reception setting may be set by a user input or gesture when the notification message, an indicator of the notification message, or information corresponding to the notification message is output by the wearable device 100, i.e., without outputting or displaying an additional setting menu, window, icon, or screen. In this regard, the user input or gesture may be a predetermined input or gesture corresponding to a predetermined setting (e.g., a setting to block all notification messages having a same predetermined attribute information or a same predetermined combination of attribute information as the received notification message). Furthermore, according to another exemplary embodiment, if a predetermined period of time elapses after a notification message is received and/or output (or an indicator or corresponding content thereof output) without receiving a user input or predetermined gesture, a notification message reception setting may be set to a predetermined setting (e.g., a setting to not block notification messages having a same predetermined attribute information or a same predetermined combination of attribute information as the received notification message).

Figure 16A:
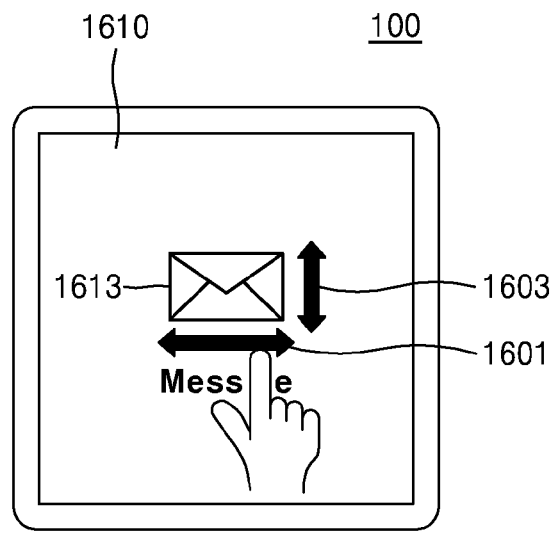
FIG. 16A illustrates an example of a method of setting whether to receive a notification message in a wearable device, according to an exemplary embodiment.

FIG. 16A illustrates an example of a method of setting whether to receive a notification message in a wearable device 100, according to one or more exemplary embodiments.

Referring to FIG. 16A, the wearable device 100 may display an icon 1613 indicating the reception of the notification message on a screen 1610 of the wearable device 100. Since this corresponds to those described with reference to FIGS. 12 to 15, a detailed description thereof is omitted here.

Based on predetermined information, the wearable device 100 may receive a user input of determining whether to receive a notification message corresponding to an attribute of a received notification message.

Referring to FIG. 16A, when the wearable device 100 receives a first predetermined user input (e.g., a horizontal swipe action 1601) from a user, the wearable device 100 may be set to not receive the notification message including the same sender information as the sender information included in the received notification message. In addition, when the wearable device 100 receives a second predetermined user input (e.g., a vertical swipe action 1603) from a user, the wearable device 100 may be set to not receive the notification message including the same application information as the application information included in the received notification message.

The wearable device 100 may set whether to block the notification message according to the attribute, based on the predetermined information and the user input, without displaying the setting window, icon, menu, etc., for the notification message reception setting.

Figure 16B:
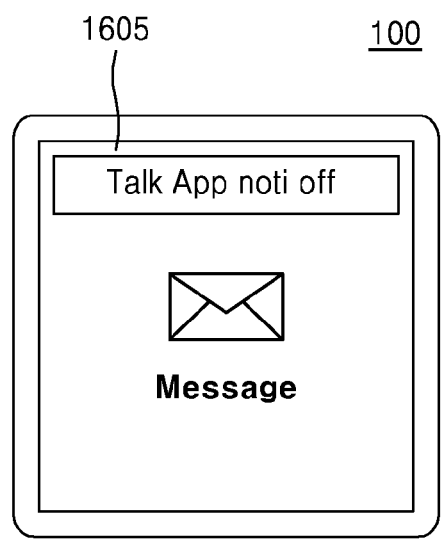
FIG. 16B illustrates an example of a screen showing the result of a notification message reception setting in a wearable device, according to an exemplary embodiment.

FIG. 16B illustrates an example of a screen showing the result of a notification message reception setting in the wearable device 100, according to one or more exemplary embodiments.

The wearable device 100 may display a result display window 1605 showing the result of the notification message reception setting that is set in FIG. 16A.

For example, as described with reference to FIG. 16A, when the wearable device 100 receives the vertical swipe action 1603, the wearable device 100 may be set to not receive the notification message including the same application information as the application information included in the received notification message, and display the result display window 1605 showing the setting result. According to another exemplary embodiment, the wearable device 100 may output an audio signal and/or may vibrate in response to setting the notification message reception setting.

Figure 17:
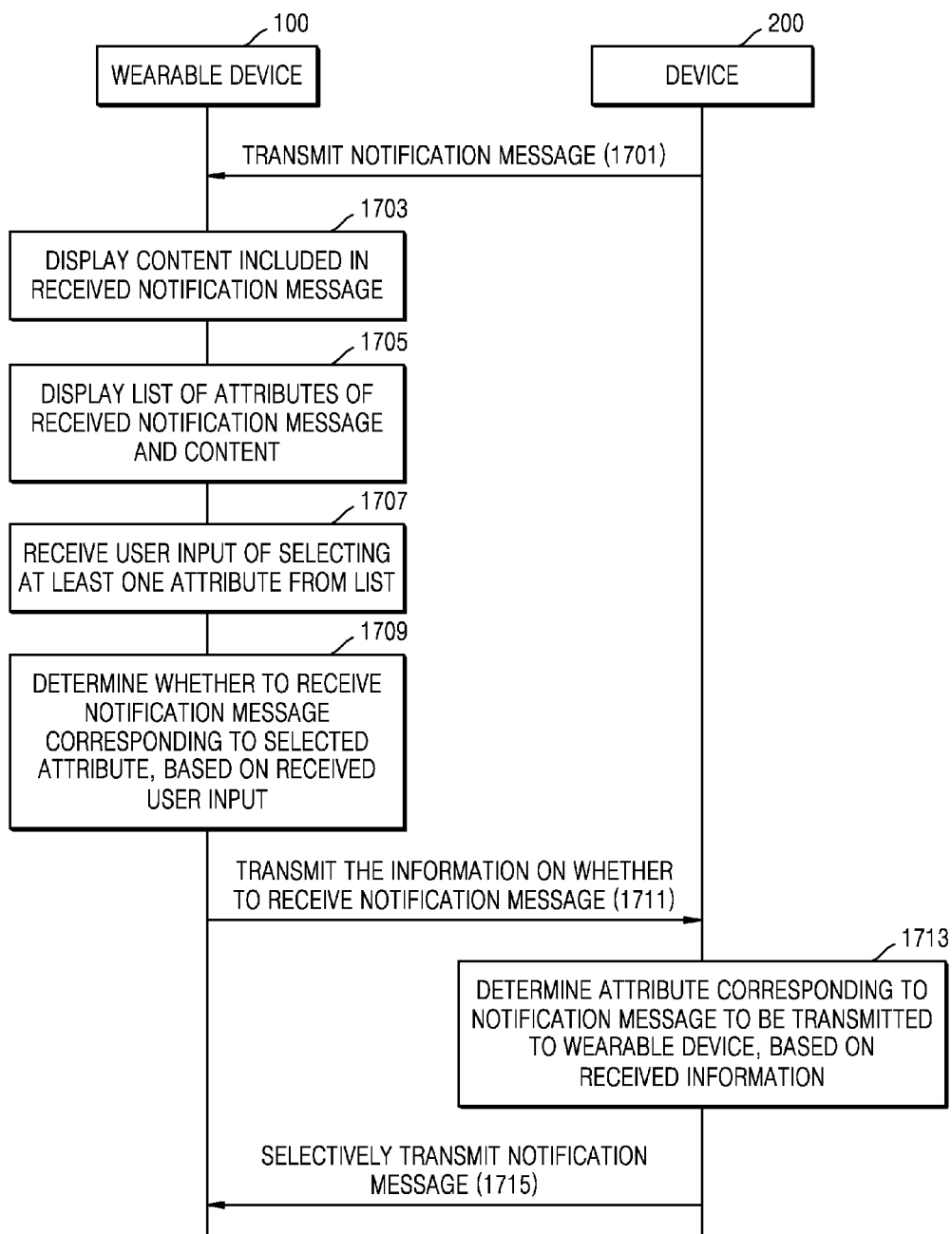
FIG. 17 illustrates a flowchart of a method of transmitting a notification message according to a notification message reception setting, according to an exemplary embodiment.

FIG. 17 illustrates a flowchart of a method of transmitting a notification message according to a setting of whether to receive the notification message, according to one or more exemplary embodiments.

In operation 1701, the device 200 may transmit a notification message to the wearable device 100. According to one or more exemplary embodiments, the device 200 may transmit a notification message, which is received or generated by the device 200, to the wearable device 100, but is not limited thereto.

In addition, the device 200 may determine (e.g., parse, obtain, analyze, etc.) attributes of content included in the notification message that is received or generated by the device 200, or attributes of content related to the notification message generated by the device 200, and transmit the determined attributes to the wearable device 100. According to one or more exemplary embodiments, the attributes of the content may include at least one of a format, a size, and a subject of the content, but are not limited thereto.

In operation 1703, the wearable device 100 may display the content included in the received notification message. In addition, the wearable device 100 may display the content related to the received notification message.

According to one or more exemplary embodiments, the wearable device 100 may display the content within the received notification message, based on a user input. For example, the wearable device 100 may display an icon indicating the reception of an SMS on the screen of the wearable device 100, and display a text included in the SMS on the screen upon (i.e., after or in response to) reception of a user input for selecting the displayed icon.

In operation 1705, the wearable device 100 may display a list of attributes of the received notification message and contents included in the received notification message. The wearable device 100 may determine the attributes of the notification message received from the device 200, and display the list of the attributes of the received notification message, based on the determination result. In addition, the wearable device 100 may display the list of the attributes of the contents included in the notification message received from the device 200.

In operation 1707, the wearable device 100 may receive a user input of selecting at least one attribute from the list.

In operation 1709, the wearable device 100 may determine whether to receive a notification message corresponding to the selected attribute. According to one or more exemplary embodiments, the wearable device 100 may be set to block or always receive the selected attribute. In addition, the wearable device 100 may determine whether to receive the notification message corresponding to the selected attribute, based on the user input of determining whether to receive the selected attribute.

For example, by selecting the subject of the content upon selection of the attribute, the wearable device 100 may be set to always receive or block the notification message related to the selected subject.

In operation 1711, the wearable device 100 may transmit the information on whether to receive the notification message to the device 200.

In operation 1713, the device 200 may determine an attribute corresponding to a notification message to be transmitted to the wearable device 100, based on the received information.

In operation 1715, the wearable device 100 may selectively transmit the notification message. For example, the device 200 may not transmit, to the wearable device 100, a notification message including content corresponding to a predetermined subject.

Figure 18:
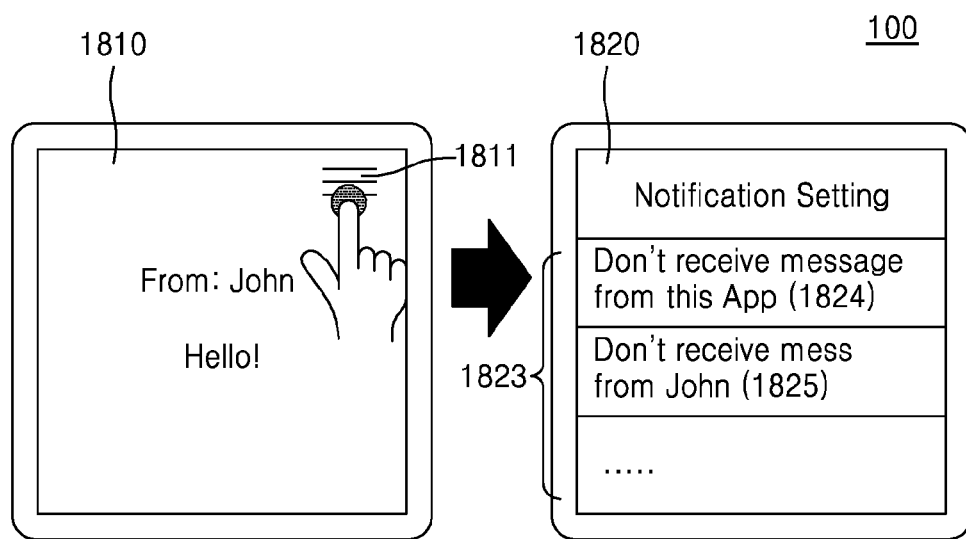
FIG. 18 illustrates an example of a screen for setting whether to receive a notification message on a content display screen within the notification message in a wearable device, according to an exemplary embodiment.

FIG. 18 illustrates an example of a screen for setting whether to receive a notification message on a content display screen within the notification message in a wearable device 100, according to one or more exemplary embodiments.

Referring to FIG. 18, the wearable device 100 may display content included in a notification message on a screen 1810 of the wearable device 100. In addition, content related to the notification message may be displayed on the screen 1810 of the wearable device 100.

According to one or more exemplary embodiments, the wearable device 100 may display at least one of information on time and information on a service that may be provided by the wearable device 100, as well as the content included in the notification message, but is not limited thereto.

The wearable device 100 may receive a user input of selecting an icon 1811 for a notification message reception setting. When the user input of selecting the icon 1811 is received, the wearable device 100 may display a setting window 1820 for the notification message reception setting on the screen of the wearable device 100. Since this corresponds to that of FIG. 12, a detailed description thereof is omitted here.

In addition, the setting window 1820 may display fields 1823 for setting whether to block the notification message. According to one or more exemplary embodiments, the setting window 1820 may additionally display fields for a blocking setting according to attributes of the content included in the notification message.

The wearable device 100 may receive a user input of selecting an application blocking setting field 1824, or may receive a user input of selecting a sender blocking setting field 1825. In addition, the wearable device 100 may receive a user input for a blocking setting according to the attributes of the content.

Based on the received user input, the wearable device 100 may set whether to receive a notification message corresponding to the selected attribute.

Figure 19:
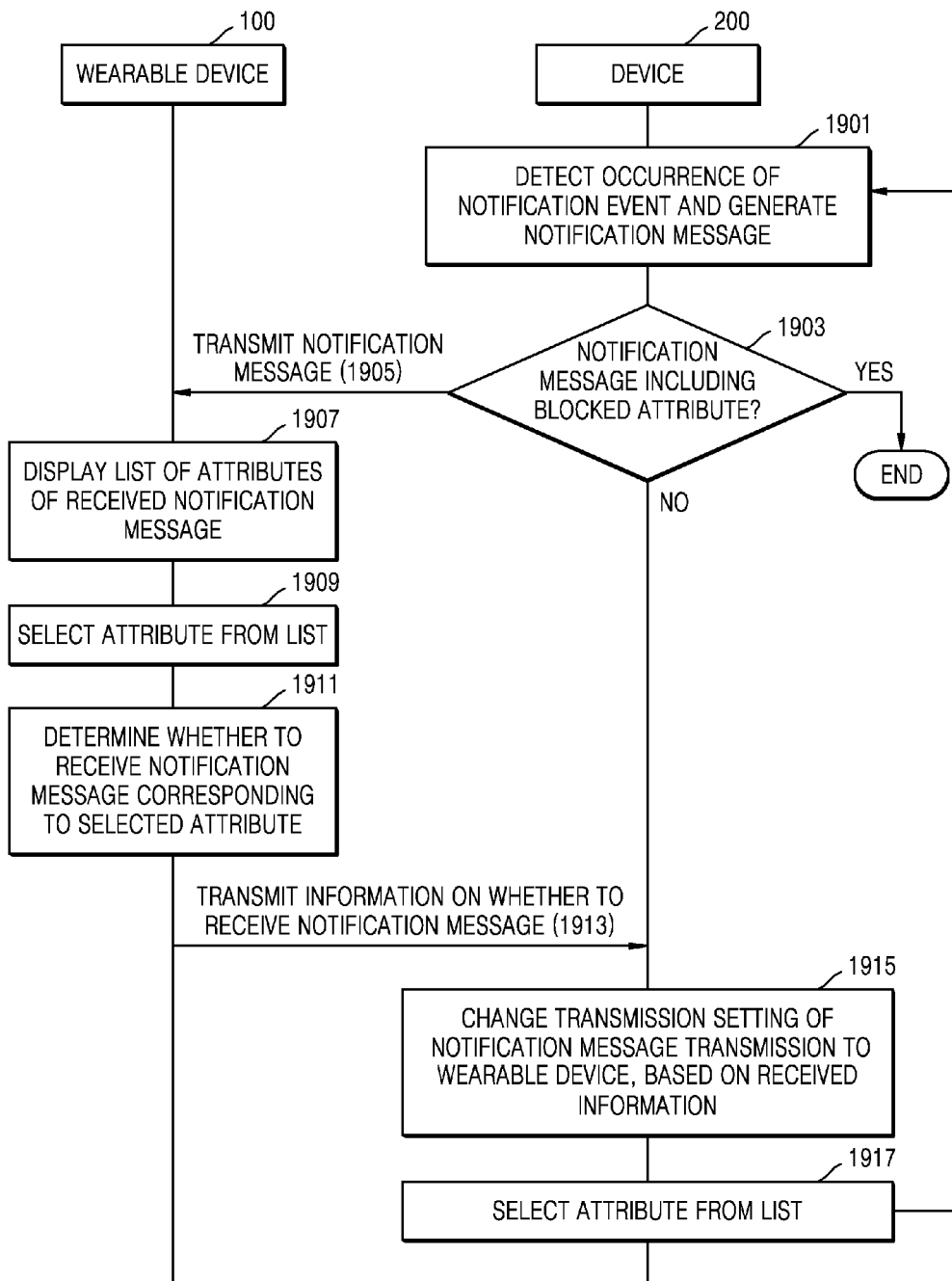
FIG. 19 illustrates a flowchart of a method of transmitting a notification message between a wearable device and a device according to a notification message reception setting in the wearable device, according to an exemplary embodiment.

FIG. 19 illustrates a flowchart of a method of transmitting a notification message between a wearable device 100 and a device 200 according to a notification message reception setting in the wearable device 100, according to one or more exemplary embodiments.

In operation 1901, the device 200 may identify (e.g., detect, determine, etc.) the occurrence of a notification event (i.e., event) and generate a notification message based on the notification event. According to one or more exemplary embodiments, the device 200 may receive a notification message from a server.

In operation 1903, the device 200 may determine whether the generated notification message is a notification message including an attribute blocked in the wearable device 100. According to one or more exemplary embodiments, the device 200 may determine whether to transmit the notification message generated in operation 1901 to the wearable device 100. According to one or more exemplary embodiments, the device 200 may determine whether the generated notification message is a notification message including an attribute blocked in the wearable device 100, based on the attributes of the generated notification message.

When the generated notification message is the notification message including the attribute blocked in the wearable device 100, the device 200 may not transmit the notification message to the wearable device 100.

In operation 1905, when the generated notification message is not the notification message including the attribute blocked in the wearable device 100, the device 200 may transmit the notification message to the wearable device 100.

In operation 1907, the wearable device 100 may display a list of the attributes of the received notification message. Since operation 1907 corresponds to that described with reference to FIG. 11, a detailed description thereof is omitted here.

In operation 1909, the wearable device 100 may select at least one attribute from the list. Since operation 1909 corresponds to that described with reference to FIG. 11, a detailed description thereof is omitted here.

In operation 1911, the wearable device 100 may determine whether to receive a notification message corresponding to the selected attribute. Since operation 1911 corresponds to that described with reference to FIG. 11, a detailed description thereof is omitted here.

In operation 1913, the wearable device 100 may transmit the information on whether to receive the notification message to the device 200. Since operation 1913 corresponds to that described with reference to FIG. 11, a detailed description thereof is omitted here.

In operation 1915, the device 200 may change the transmission setting of notification message transmission to the wearable device 100, based on the information on whether to receive the notification message that is received from the wearable device 100.

In operation 1917, the device 200 may store the changed transmission setting.

Figure 20:
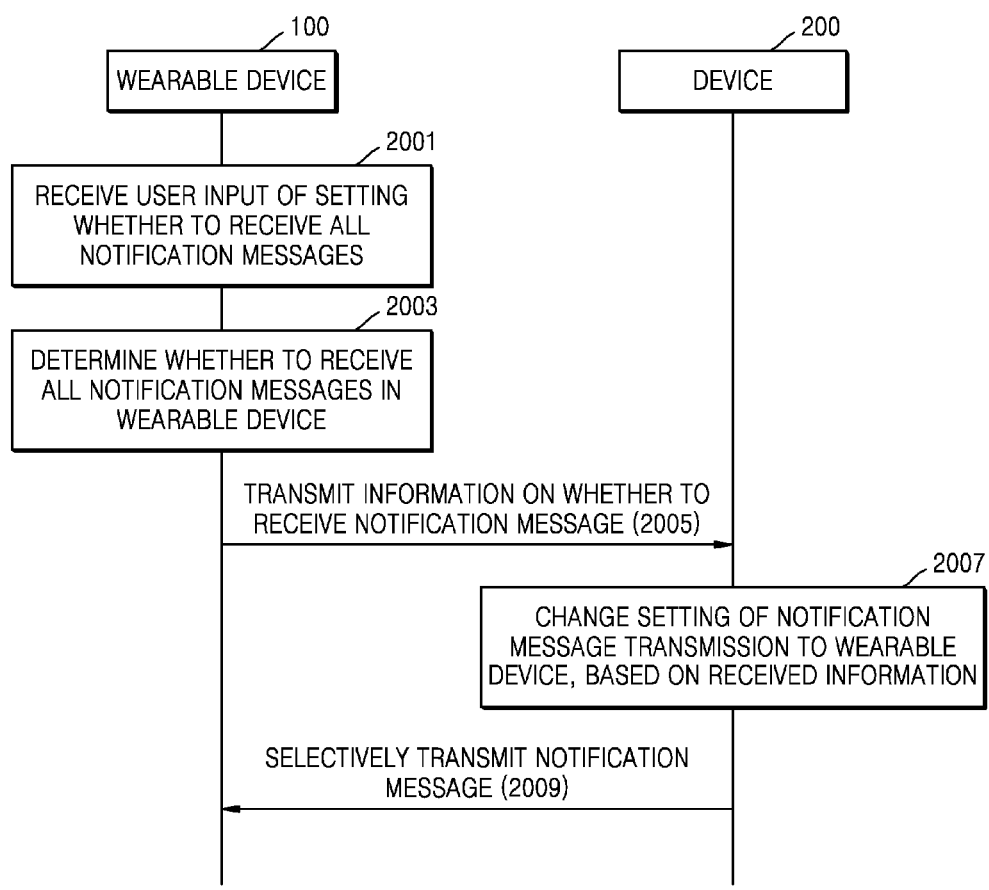
FIG. 20 illustrates a flowchart of a method of setting whether to receive all notification messages in a wearable device, according to an exemplary embodiment.

FIG. 20 illustrates a flowchart of a method of setting whether to receive all notification messages in a wearable device 100, according to one or more exemplary embodiments.

According to one or more exemplary embodiments, the wearable device 100 may set whether to receive a notification message, based on attributes of the notification message, and may set whether to receive all notification messages regardless of attributes of the notification messages.

In operation 2001, the wearable device 100 may receive a user input of setting whether to receive all notification messages. According to one or more exemplary embodiments, the wearable device 100 may selectively display a setting window for setting whether to receive a notification message, or a setting window for setting whether to receive all notification messages, based on a user input and attributes of the notification message.

In operation 2003, the wearable device 100 may determine whether to receive all notification messages in the wearable device 100. According to one or more exemplary embodiments, the wearable device 100 may determine whether to receive all notification messages, based on the user input.

In operation 2005, the wearable device 100 may transmit information on whether to receive the notification message to the device 200. According to one or more exemplary embodiments, the information on whether to receive the notification message may include information on whether to receive all notification messages or on whether to block all notification messages. However, exemplary embodiments are not limited thereto.

In operation 2007, the device 200 may change the setting of notification message transmission to the wearable device 100, based on the received information. Since this corresponds to that described with reference to FIG. 19, a detailed description thereof is omitted here.

In operation 2009, the device 200 may selectively transmit the notification message. According to one or more exemplary embodiments, when the reception of all notification messages is blocked in the wearable device 100, the device 200 may not transmit all notification messages generated by the notification event to the wearable device 100.

Figure 21:
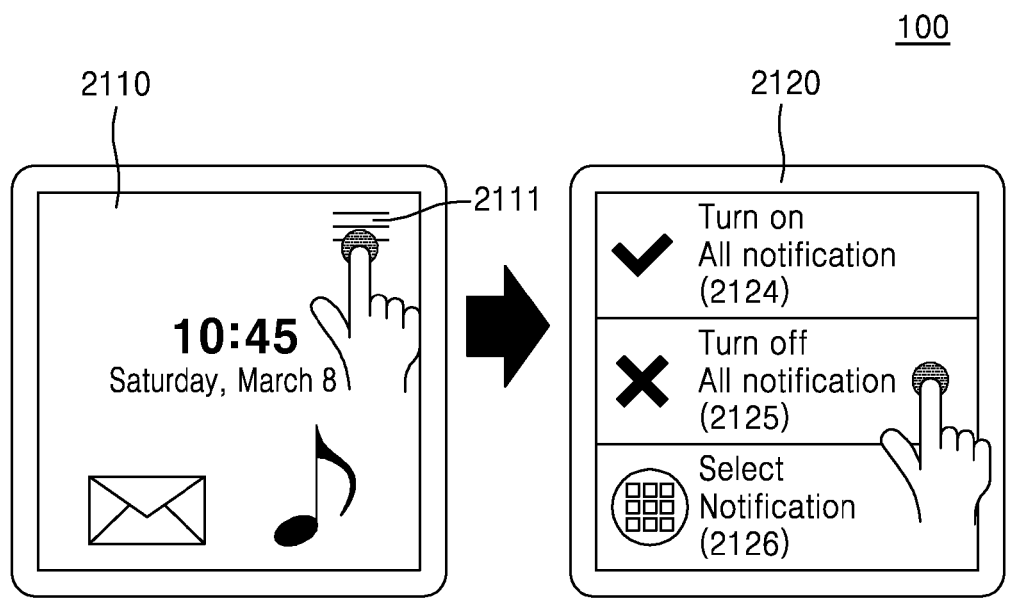

FIGS. 21 and 22 illustrate examples of a screen for setting whether to receive all notification messages in a wearable device 100, according to one or more exemplary embodiments.

Referring to FIG. 21, the wearable device 100 may display an icon 2111 for a notification message reception setting on a screen 2110 of the wearable device 100. Since this corresponds to that described above, a detailed description thereof is omitted here.

The wearable device 100 may receive a user input of selecting the icon 2111 for the notification message reception setting. When the user input of selecting the icon 2111 is received, the wearable device 100 may display a setting window 2120 for the notification message reception setting on the screen of the wearable device 100.

In addition, the setting window 2120 may display an all-notification-message reception field 2124, an all-notification-message blocking field 2125, and a selective notification-message reception field 2126.

According to one or more exemplary embodiments, the wearable device 100 may be set to receive all notification messages in the wearable device 100, based on the user input of selecting the all-notification-message reception field 2124. In addition, the wearable device 100 may be set to block all notification messages in the wearable device 100, based on the user input of selecting the all-notification-message blocking field 2125.

In addition, the wearable device 100 may be set to selectively receive the notification messages according to attributes, based on the user input of selecting the selective notification-message reception field 2126. This will be described below in detail with reference to FIG. 22.

Referring to FIG. 22, the wearable device 100 may receive a user input of selecting the selective notification-message reception field 2126.

The wearable device 100 may display an attribute selection window 2230 including fields corresponding to attributes of notification messages. The wearable device 100 may receive a user input of selecting at least one of the fields included in the attribute selection window 2230. The wearable device 100 may determine whether to receive notification messages corresponding to the selected at least one attribute. Since this corresponds to that described above, a detailed description thereof is omitted here.

In addition, the attribute selection window 2230 may further include fields corresponding to attributes of contents included in notification messages or related to notification messages. By receiving a user input of selecting at least one from the displayed fields, the wearable device 100 may determine whether to receive a notification message corresponding to the selected attribute.

Referring to the wearable device 100 of FIG. 22, the wearable device 100 is set to block a notification related to an application and receive a notification related to a voice call, although it is understood that this is merely an example and one or more other exemplary embodiments are not limited thereto.

Figure 23A:
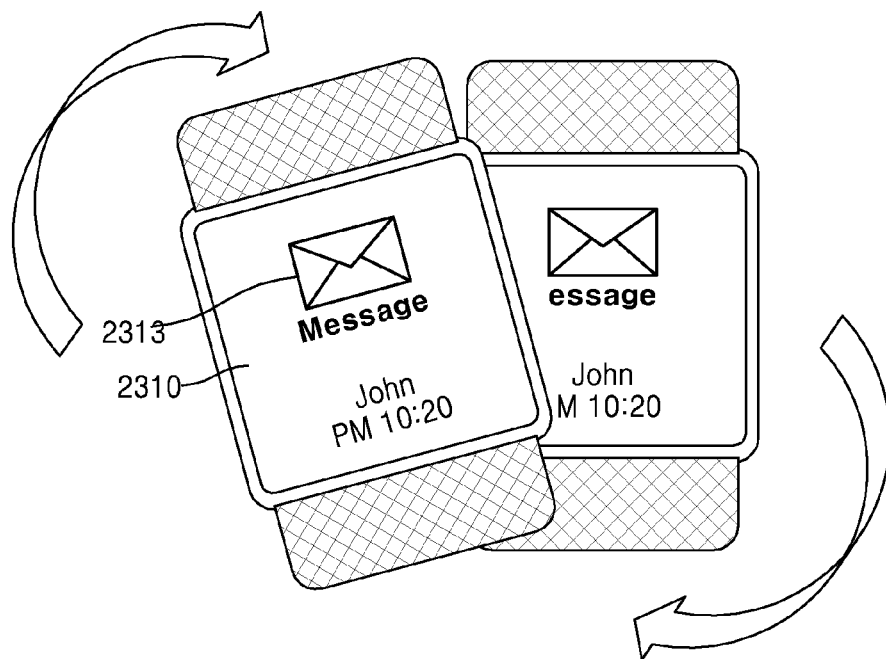
FIG. 23A illustrates an example of a screen for setting whether to receive a notification message in a wearable device according to a gesture, according to an exemplary embodiment.

FIG. 23A illustrates an example of a screen for setting whether to receive a notification message in a wearable device 100 according to a gesture, according to one or more exemplary embodiments.

Referring to FIG. 23A, the wearable device 100 may display an icon 2313 indicating the reception of the notification message on a screen 2310 of the wearable device 100. Based on predetermined information, the wearable device 100 may receive a user input of determining whether to receive a notification message corresponding to an attribute of a received notification message.

In FIG. 23A, the wearable device 100 may acquire acceleration information by using a sensor included in the wearable device 100. The wearable device 100 may determine whether to receive a notification message in the wearable device 100, based on the predetermined information and the acquired acceleration information.

According to one or more exemplary embodiments, when the acquired acceleration information has a value greater than or equal to a threshold value, the wearable device 100 may be set to block all notification messages. However, exemplary embodiments are not limited thereto. For example, when a user shakes the wearable device 100 so that the wearable device 100 has an acceleration of a threshold value or more, the wearable device 100 may be set to block all notification messages.

The wearable device 100 may set whether to block the notification message according to the attribute, based on the predetermined information and a variety of information acquired by on or more sensors, without displaying the setting window for the notification message reception setting.

Figure 23B:
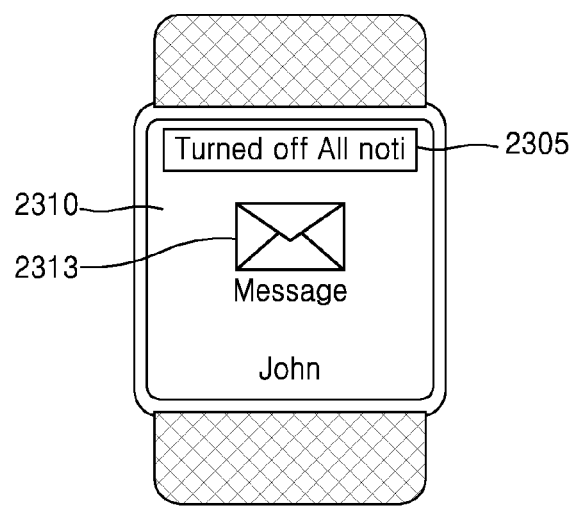
FIG. 23B illustrates an example of a screen showing the result of a notification message reception setting in a wearable device according to a gesture, according to an exemplary embodiment.

FIG. 23B illustrates an example of a screen showing the result of a notification message reception setting in a wearable device 100 according to a gesture, according to one or more exemplary embodiments.

The wearable device 100 may display an icon 2313 indicating the reception of the notification message on a screen 2310. Since this corresponds to that described above, a detailed description thereof is omitted here.

In addition, the wearable device 100 may display a result display window 2305 showing the result of the notification message reception setting that is set in FIG. 23A.

For example, as described above with reference to FIG. 23A, when the wearable device 100 acquires an acceleration having a value greater than or equal to a threshold value, the wearable device 100 may be set to block all notification messages, and display the result display window 2305 showing the setting result.

Figure 24:
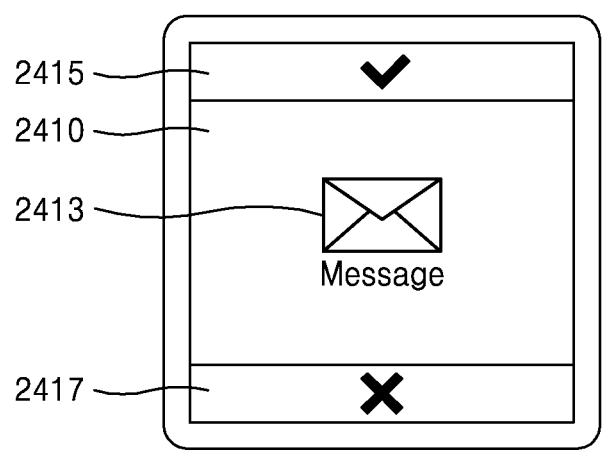
FIGS. 24 and 25 illustrate examples of a setting whether to receive a notification message in a wearable device, according to an exemplary embodiment.
Figure 25:
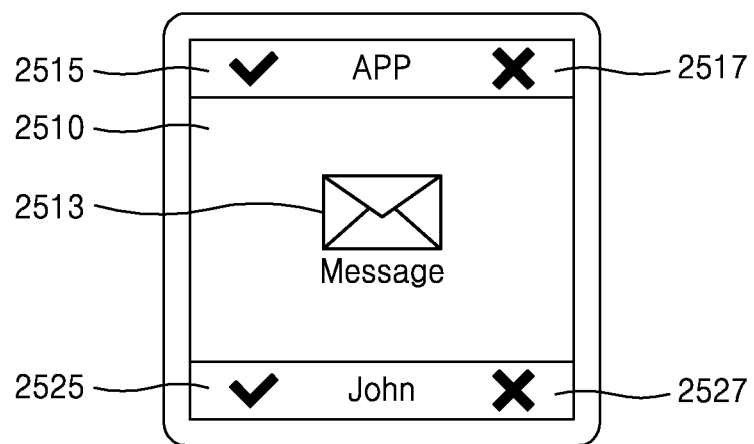

FIGS. 24 and 25 illustrate examples of a notification message reception setting in a wearable device 100, according to one or more exemplary embodiments.

Referring to FIG. 24, the wearable device 100 may display an icon 2413 indicating the reception of the notification message on a screen 2410 of the wearable device 100.

In addition, the wearable device 100 may display a notification message confirm button 2415 indicating content included in the notification message received together with the icon 2313, and a notification message delete button 2417 for deleting the received notification message.

According to one or more exemplary embodiments, the wearable device 100 may display the content included in the notification message on the screen, based on a user input of clicking the notification message confirm button 2415, may not display the content included in the notification message on the screen, based on a user input of clicking the notification message delete button 2417, and may not display the icon 2313 indicating the reception of the notification message on the screen. In addition, the deleted notification message may be stored in the device 200, and if necessary, may be confirmed, viewed, or opened again by executing an application corresponding to the notification message.

Referring to FIG. 25, the wearable device 100 may display an application notification preference button 2515 for preferring or prioritizing notification messages from an application related to the notification message received together with an icon 2513 indicating the reception of the notification message on a screen 2510 of the wearable device 100, an application notification blocking button 2517 for blocking notification messages from the application related to the received notification message, a sender notification preference button 2525 for preferring or prioritizing notification messages from a sender related to the received notification message, and a sender notification blocking button 2527 for blocking notification messages from the sender related to the received notification message. The notification message preference will be described in detail with reference to FIGS. 31 to 43.

According to one or more exemplary embodiments, the wearable device 100 may be set to prioritize notification messages from the application related to the received notification message, based on a user input of clicking the application notification preference button 2515, and may be set to block notification messages from the application related to the received notification message, based on a user input of clicking the application notification blocking button 2517.

According to one or more exemplary embodiments, the wearable device 100 may be set to prioritize notification messages from the sender related to the received notification message, based on a user input of clicking the sender notification preference button 2525, and may be set to block notification messages from the sender related to the received notification message, based on a user input of clicking the sender notification blocking button 2527.

Figure 26A:
FIG. 26A illustrates an example of a screen for setting whether to block a notification message in a wearable device, according to an exemplary embodiment.

FIG. 26A illustrates an example of a screen that displays whether to block a notification message in a wearable device 100, according to one or more exemplary embodiments.

Referring to FIG. 26A, when the wearable device 100 is set to block a notification message, the wearable device 100 may display an icon 2601 indicating that all or part of notification messages are in a blocked state on a screen.

According to one or more exemplary embodiments, the wearable device 100 may display different icons when all notification messages are blocked and when only some of the notification messages are blocked according to attributes of the notification messages.

According to one or more exemplary embodiments, when some notification messages are blocked according to the attributes of the notification messages, the wearable device 100 may display the attributes of the blocked notification messages (or representations thereof) together with the icon.

According to one or more exemplary embodiments, by changing the transmission setting in the device 200, information on the notification message transmission setting may be received from the device 200 even when the reception of the notification message is changed in the wearable device 100, and the icon may be displayed based on the received information.

Figure 26B:
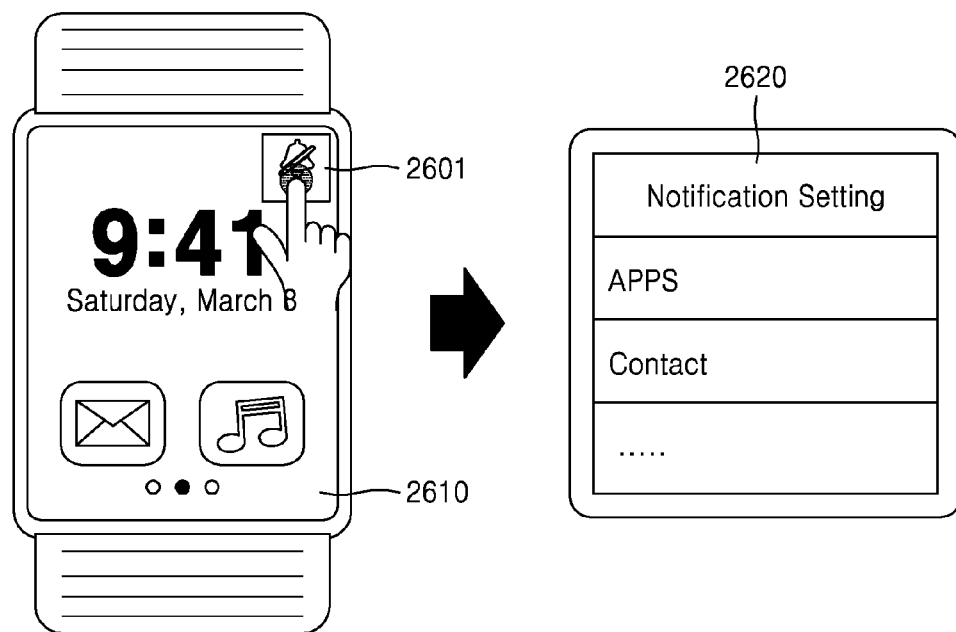
FIG. 26B illustrates an example of a setting whether to block a notification message and a switching of a notification message reception setting screen in a wearable device, according to an exemplary embodiment.

FIG. 26B illustrates an example of a notification message blocking setting and a switching of a reception setting screen in a wearable device 100, according to one or more exemplary embodiments.

Referring to FIG. 26B, the wearable device 100 may receive a user input of selecting an icon 2601 indicating that all or some of notification messages are in a blocked state.

When the user input of selecting the icon 2601 is received, the wearable device 100 may display a setting window 2620 for the notification message reception setting on a screen of the wearable device 100. The setting window 2620 for the notification message reception setting may be displayed on the entire screen of the wearable device 100, but is not limited thereto.

In addition, the setting window 2620 may display a list of attributes of the notification message. For example, the list of the attributes of the notification message may include an application field and a contact field. Since this corresponds to that described above, a detailed description thereof is omitted here.

The wearable device 100 may receive a user input of selecting at least one field and may change the notification message reception setting, based on the received user input.

Figure 27:
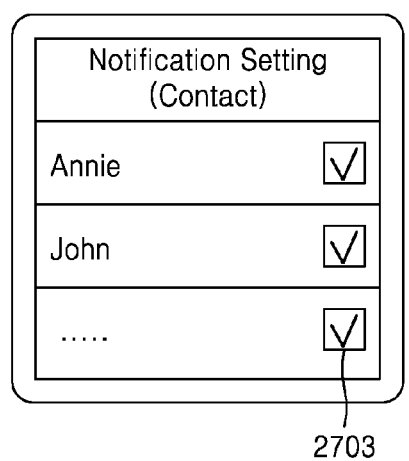
FIG. 27 illustrates an example of a notification message reception setting screen in a wearable device, according to an exemplary embodiment.

FIG. 27 illustrates an example of a notification message reception setting screen in a wearable device 100, according to one or more exemplary embodiments.

According to one or more exemplary embodiments, the wearable device 100 may distinguish a selected field from an unselected field by displaying a check box 2703 corresponding to each field. Since it is understood to those skilled in the art that the check box 2703 is an interface easy to manipulate in a toggle form, a detailed description thereof is omitted here.

According to one or more exemplary embodiments, the wearable device 100 may display an X mark, a V mark, a checkmark, a box fill-in, etc., within the check box 2703, based on a user input of selecting the check box 2703 or the field. The wearable device 100 may provide the user with information on whether to select the corresponding field through the marking of the check box 2703.

In addition, as described above, the wearable device 100 may provide the user with information on whether to select the corresponding field by displaying the selected field and the unselected field with different colors, instead of the check box 2703. However, exemplary embodiments are not limited thereto.

Figure 28:
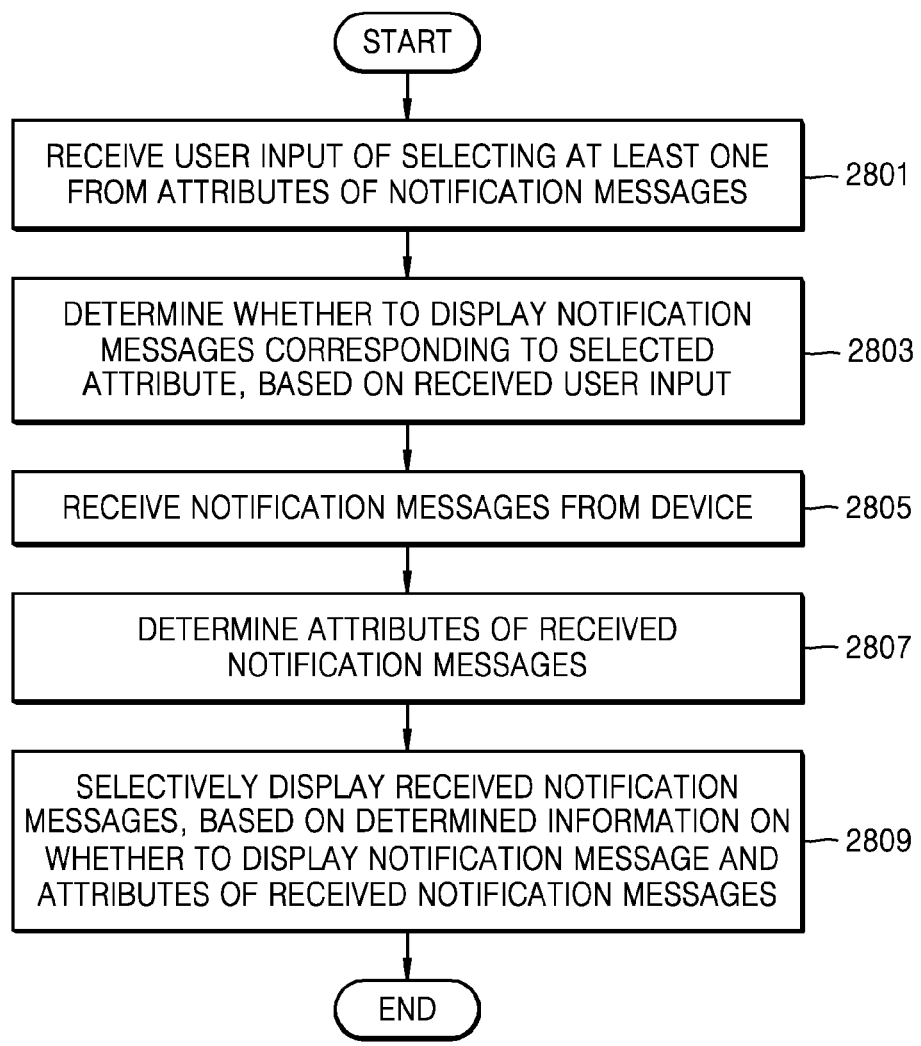
FIG. 28 illustrates a flowchart of a method of determining whether to display a notification message in a wearable device, according to an exemplary embodiment.

FIG. 28 illustrates a flowchart of a method of determining whether to display a notification message in a wearable device 100, according to one or more exemplary embodiments.

According to one or more exemplary embodiments, the wearable device 100 may receive all notification messages and display only a part of the received notification messages, based on a user selection.

In operation 2801, the wearable device 100 may receive a user input of selecting at least one from attributes of the notification messages. For example, the wearable device 100 may display a list of the attributes of the notification messages, and receive a user input of selecting at least one attribute from the displayed list.

In operation 2803, the wearable device 100 may determine whether to display the notification messages corresponding to the attribute selected in operation 2801, based on the received user input. According to one or more exemplary embodiments, the wearable device 100 may receive all notification messages from the device 200 and may not display only the notification messages corresponding to the attribute selected by the user input among the received notification messages.

In operation 2805, the wearable device 100 may receive the notification messages from the device 200. According to one or more exemplary embodiments, the device 200 may transmit all notification messages to the wearable device 100.

In operation 2807, the wearable device 100 may determine attributes of the notification messages received from the device 200.

In operation 2809, the wearable device 100 may selectively display the received notification messages, based on the information on whether to display the notification message that is determined in operation 2803 and the attributes of the notification messages received in operation 2807. For example, when the wearable device 100 is set not to display a notification message received from John, the wearable device 100 may not display the notification message on the screen even when the notification message from John is received.

Figure 29:
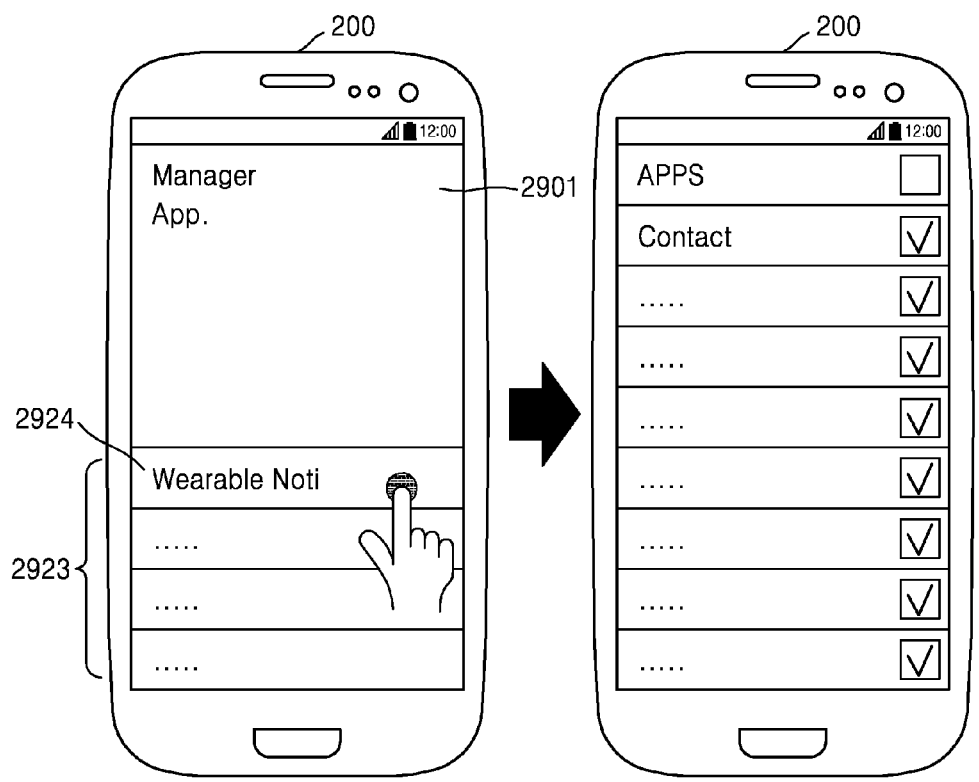
FIGS. 29 and 30 illustrate examples of changing a transmission setting of a device according to notification message reception setting information received from a wearable device, which is performed by a device, according to an exemplary embodiment.
Figure 30:
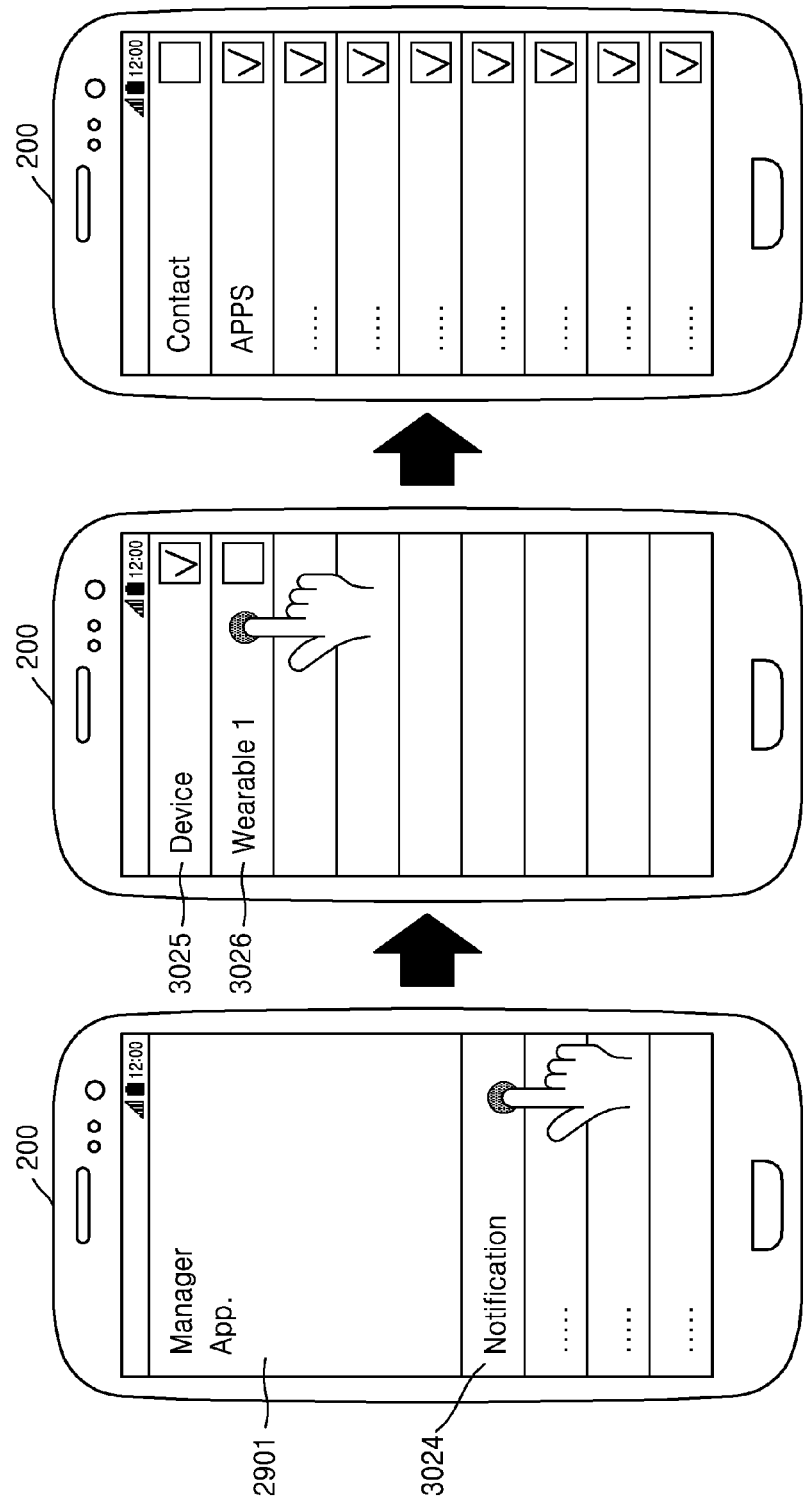

FIGS. 29 and 30 illustrate examples of changing a transmission setting of a device 200 according to information on whether to receive a notification message, which is received from a wearable device 100, according to one or more exemplary embodiments.

The device 200 may set various operations of the device 200, based on a user input. In addition, the device 200 may display a setting window 2901 for setting various operations of the device 200, based on a user input.

The setting window 2901 may include fields 2923 corresponding to various operations of the device 200. For example, the setting window 2901 may include a notification message transmission setting field 2924 for setting a notification message transmission to the wearable device 100.

The device 200 may display a list of attributes of the notification message, based on a user input of selecting the notification message transmission setting field 2924. The device 200 may determine whether to transmit the notification message corresponding to the selected attribute to the wearable device 100, based on a user input of selecting at least one attribute from the list.

According to one or more exemplary embodiments, the device 200 may receive information on whether to receive the notification message from the wearable device 100, and change the notification message transmission setting of the device 200, based on the received information. In addition, the device 200 may store the changed notification message transmission setting.

Furthermore, the device 200 may block the notification message received by the device 200 according to attributes of the notification message.

Referring to FIG. 30, the setting window 2901 may include a notification setting field 3024. When a user input of selecting the notification setting field 3024 is received, the device 200 may display a notification message reception setting field 3025 for setting a notification message reception of the device 200, and a notification message transmission setting field 3026 for setting a notification message transmission to the wearable device 100. According to one or more exemplary embodiments, when a plurality of wearable devices 100 are interworked with the device 200, the device 200 may display a notification message transmission setting field corresponding to each of the wearable devices 100, or may provide the notification message transmission setting field for common settings of the plurality of wearable devices 100.

The device 200 may display a list of attributes of the notification message, based on a user input of selecting the notification message transmission setting field 3026. The device 200 may determine whether to transmit the notification message corresponding to the selected attribute to the wearable device 100, based on a user input of selecting at least one attribute from the list.

In addition, the device 200 may display a list of attributes of the notification message, based on a user input of selecting the notification message reception setting field 3025. The device 200 may determine whether to receive the notification message corresponding to the selected attribute in the device 200, based on a user input of selecting at least one attribute from the list.

According to one or more exemplary embodiments, the device 200 may set a notification message transmission to another device interworked with the device 200, instead of the wearable device 100.

Figure 31:
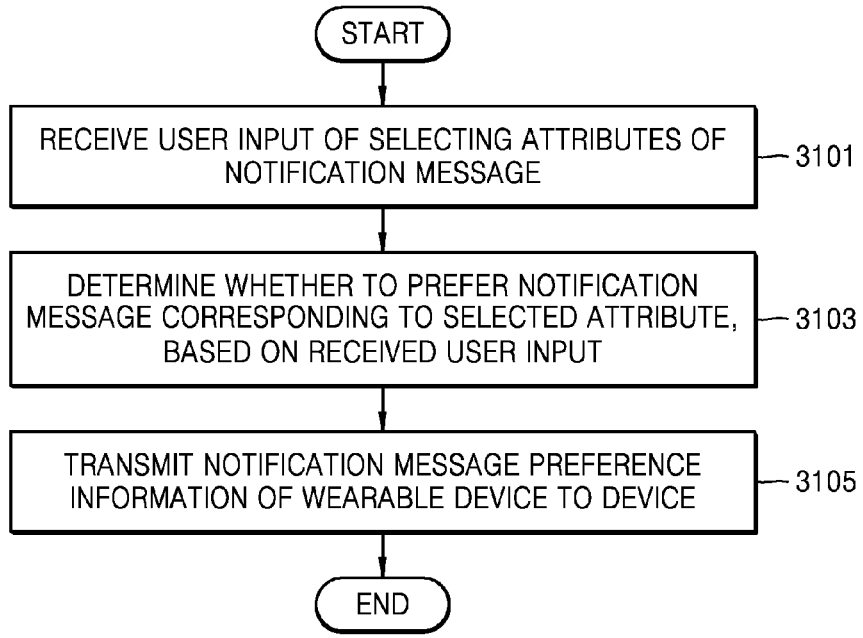
FIG. 31 illustrates a flowchart of a method of determining whether to prefer a notification message, which is performed by a wearable device, according to an exemplary embodiment.

FIG. 31 illustrates a flowchart of a method of determining whether to prioritize a notification message, which is performed by a wearable device 100, according to one or more exemplary embodiments.

In operation 3101, the wearable device 100 may receive a user input of selecting attributes of a notification message. According to one or more exemplary embodiments, the wearable device 100 may display a list of the attributes of the notification message, and receive a user input of selecting at least one attribute from the displayed list. Since this corresponds to that described above, a detailed description thereof is omitted here.

In operation 3103, the wearable device 100 may determine whether to prioritize the notification message corresponding to the selected attribute, based on the received user input. According to one or more exemplary embodiments, the wearable device 100 may determine a method of displaying the notification message based on the attributes of the notification message and whether to prioritize the notification message according to the attributes.

In operation 3105, the wearable device 100 may transmit notification message preference information of the wearable device 100 to the device 200. According to one or more exemplary embodiments, the wearable device 100 may generate the notification message preference information of the wearable device 100, based on the result determined in operation 3103, and transmit the generated information to the device 200. In addition, the wearable device 100 may transmit the notification message preference information to an external server. For example, the external server may include a cloud server, but is not limited thereto.

According to one or more exemplary embodiments, the wearable device 100 may display the prioritized or preferred notification message and the non-prioritized or preferred notification message in different methods by determining whether to prioritize the notification message to be received by the wearable device 100, based on the attributes of the notification message. For example, the wearable device 100 may display the notification message corresponding to the prioritized or preferred attribute in a predetermined area or with a predetermined color, or may output the notification message corresponding to the prioritized or preferred attribute in a predetermined manner (e.g., by outputting an additional audio and/or vibration output, by displaying the notification message directly without first displaying an icon or an indicator indicating receipt of the prioritized notification message, etc.). However, exemplary embodiments are not limited thereto.

In addition, according to one or more exemplary embodiments, the wearable device 100 may be set to always receive the notification message corresponding to the prioritized or preferred attribute (e.g., even if the notification message has another attribute that is set to be blocked) by determining whether to prioritize the notification message corresponding to the selected attribute.

Figure 32:
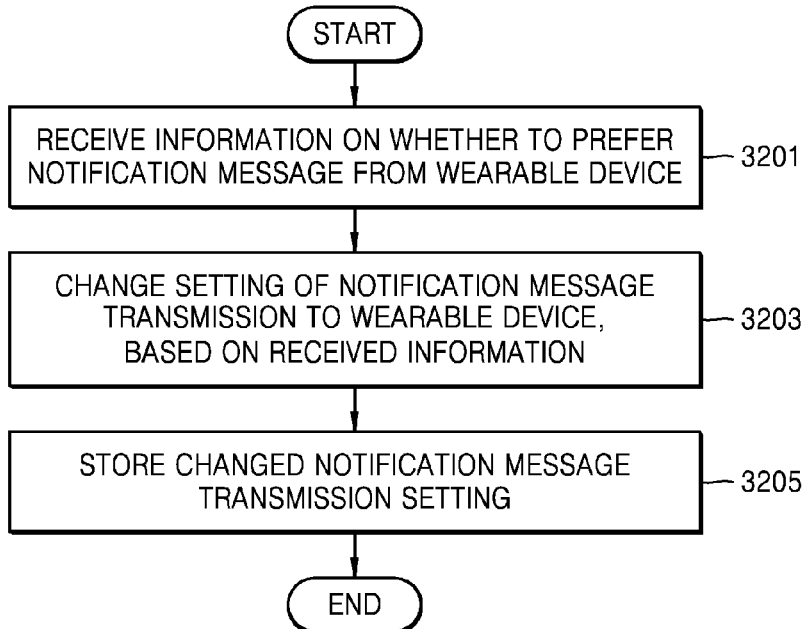
FIG. 32 illustrates a flowchart of a method of determining whether to prefer a notification message in a wearable device, which is performed by a device, according to an exemplary embodiment.

FIG. 32 illustrates a flowchart of a method of determining whether to prioritize a notification message in a wearable device 100, which is performed by a device 200, according to one or more exemplary embodiments.

In operation 3201, the device 200 may receive information on whether to prioritize a notification message from the wearable device 100. According to one or more exemplary embodiments, the information on whether to prioritize the notification message may include information on attributes of the notification message selected by the wearable device 100, and information on whether to prioritize the notification message corresponding to the selected attribute. In addition, the device 200 may directly receive a user input of determining whether to prioritize the notification message according to attributes of the notification message to be transmitted to the wearable device 100.

According to one or more exemplary embodiments, the device 200 may determine whether to transmit the notification message according to whether to prioritize the notification message that is received from the wearable device 100, and determine the size of the notification message to be transmitted.

In operation 3203, the device 200 may change the setting of notification message transmission to the wearable device 100, based on the received information. According to one or more exemplary embodiments, the device 200 may change the predetermined setting of notification message transmission to the wearable device 100, based on the received information.

In operation 3205, the device 200 may store the changed notification message transmission setting. According to one or more exemplary embodiments, the device 200 may transmit the notification message to the wearable device 100, based on the changed notification message transmission setting.

Figure 33:
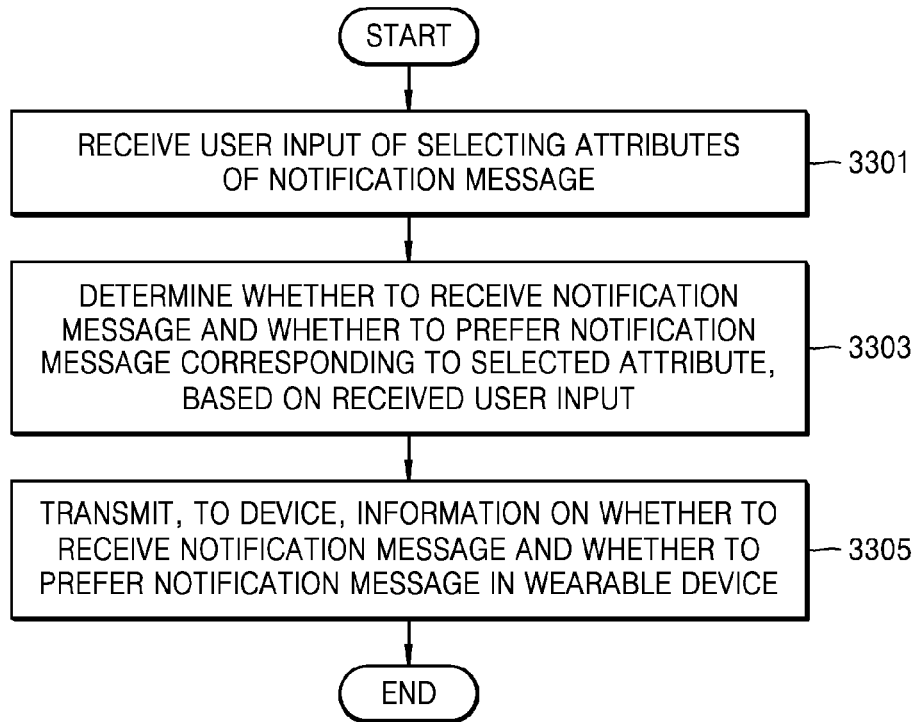
FIG. 33 illustrates a flowchart of a method of setting whether to receive a notification message and whether to prefer the notification message, which is performed by a wearable device, according to an exemplary embodiment.

FIG. 33 illustrates a flowchart of a method of setting whether to receive a notification message and whether to prioritize the notification message, which is performed by a wearable device 100, according to one or more exemplary embodiments.

In operation 3301, the wearable device 100 may receive a user input of selecting attributes of a notification message. The wearable device 100 may display a list of the attributes of the notification message, and receive a user input of selecting at least one attribute from the displayed list.

In addition, according to one or more exemplary embodiments, the wearable device 100 may display the notification message, display the list of the attributes of the received notification message, and receive a user input of selecting at least one attribute from the displayed list.

In operation 3303, the wearable device 100 may determine whether to receive the notification message corresponding to the selected attribute and whether to prioritize the notification message corresponding to the selected attribute, based on the received user input. By receiving the user input, the wearable device 100 may determine whether to receive the notification message corresponding to the selected attribute and whether to prioritize the notification message corresponding to the selected attribute.

In operation 3305, the wearable device 100 may transmit, to the device 200, information on whether to receive the notification message and whether to prioritize the notification message in the wearable device 100. The information on whether to prioritize the notification message may include information on whether to receive the notification message in the wearable device 100.

Figure 34:
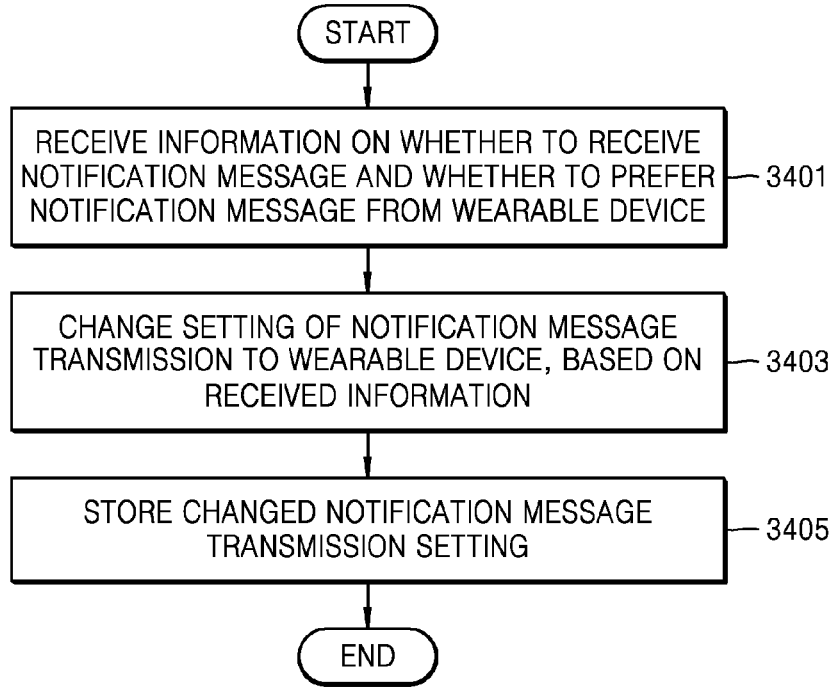
FIG. 34 illustrates a flowchart of a method of setting whether to receive a notification message and whether to prefer the notification message in a wearable device, which is performed by a device, according to an exemplary embodiment.

FIG. 34 illustrates a flowchart of a method of setting whether to receive a notification message and whether to prioritize the notification message in a wearable device 100, which is performed by a device 200, according to one or more exemplary embodiments.

In operation 3401, the device 200 may receive information on whether to receive the notification message and whether to prioritize the notification message from the wearable device 100. In addition, the device 200 may directly receive a user input of determining whether to receive a notification message and whether to prioritize the notification message according to attributes of the notification message to be transmitted to the wearable device 100.

In operation 3403, the device 200 may change the setting of notification message transmission to the wearable device 100, based on the received information. Since this corresponds to that described above, a detailed description thereof is omitted here.

In operation 3405, the device 200 may store the changed notification message transmission setting. In addition, the device 200 may determine the notification message to be transmitted to the wearable device 100 and selectively transmit the notification message, based on the stored notification message transmission setting.

Figure 35A:
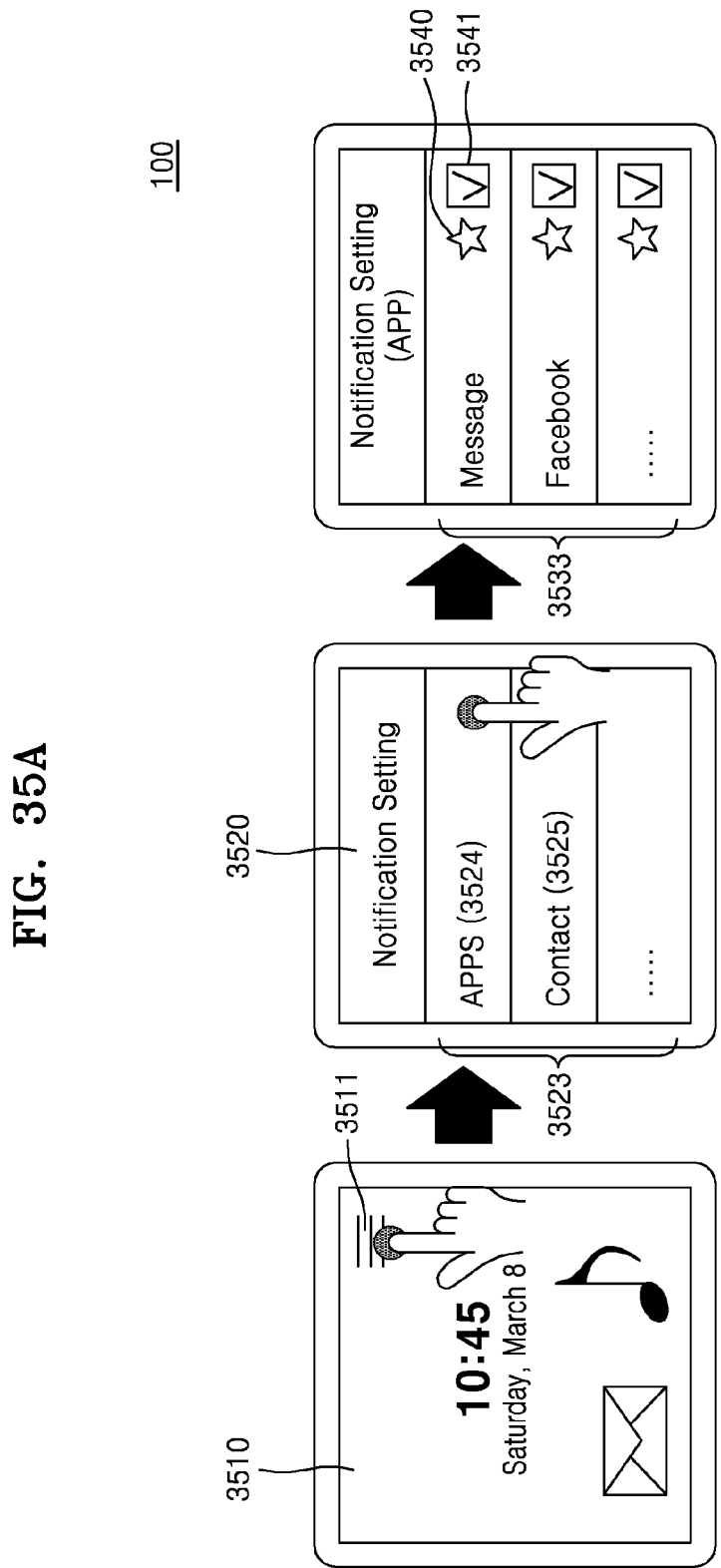
Figure 35B:
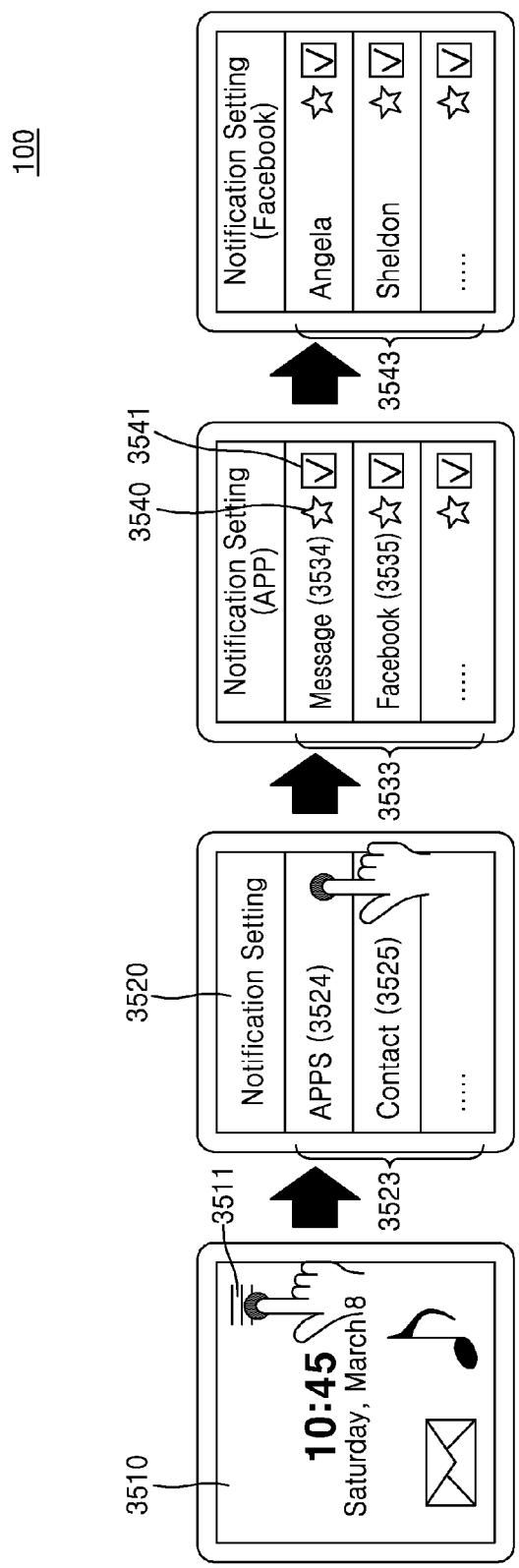

FIGS. 35A and 35B illustrate examples of a screen for setting whether to receive a notification message and whether to prioritize the notification message in a wearable device 100, according to one or more exemplary embodiments.

The wearable device 100 may display a screen 3510 for setting whether to receive the notification message and whether to prioritize the notification message, based on a user input.

Referring to FIG. 35A, the wearable device 100 may display an icon 3511 for setting whether to receive the notification message and whether to prioritize the notification message on the screen 3510 of the wearable device 100.

The wearable device 100 may receive a user input of selecting the icon 3511 for setting whether to receive the notification message and whether to prioritize the notification message. When the user input of selecting the icon 3511 is received, the wearable device 100 may display a setting window 3520 for the notification message reception setting on the screen of the wearable device 100.

In addition, the setting window 3520 may display a list 3523 of attributes of the notification message. For example, the list of the attributes of the notification message may include an application (AP) field 3524 and a contact field 3525. Since this corresponds to that described above, a detailed description thereof is omitted here.

The wearable device 100 may receive a user input of selecting the application field 3524. The wearable device 100 may display a list 3533 of a plurality of applications according to the reception of the user input of selecting the application field 3524.

The list 3533 of the plurality of applications may display fields corresponding to the respective applications. In addition, the wearable device 100 may display a check box 3541 or an icon 3540 for setting whether to prioritize the notification message and whether to receive the notification message together with the field corresponding to each of the plurality of applications.

The wearable device 100 may receive a user input of selecting each field. When a user input of selecting a field, the wearable device 100 may be set to prioritize or receive the notification message including an attribute corresponding to the selected field among the notification messages.

For example, when the user input of selecting the preference field 3540 within the message application field 3533 is received, the wearable device 100 may be set such that the notification message related to the message application among the notification messages are prioritized or preferred or not prioritized or preferred.

In addition, when the user input of selecting the check box 3541 within the message application field 3533 is received, the wearable device 100 may be set such that the notification message related to the message application among the notification messages are received or not received. According to one or more exemplary embodiments, the preference icon 3540 and the check box 3541 may use a toggle method.

According to one or more exemplary embodiments, when the wearable device 100 is set to not receive the notification message including the attribute related to the corresponding field, the wearable device 100 may display the preference icon 3540 in a disabled state.

According to one or more exemplary embodiments, the wearable device 100 may set whether to receive a notification message including predetermined application information. In addition, according to one or more exemplary embodiments, the wearable device 100 may set whether to receive a notification message including predetermined sender information. According to one or more exemplary embodiments, the wearable device 100 may determine whether to receive a notification message that is related to a predetermined application and includes predetermined application information.

Referring to FIG. 35B, the wearable device 100 may display an icon 3511 for setting whether to receive the notification message and whether to prioritize the notification message on a screen 3510 of the wearable device 100.

The wearable device 100 may receive a user input of selecting the icon 3511 for setting whether to receive the notification message and whether to prioritize the notification message. When the user input of selecting the icon 3511 is received, the wearable device 100 may display a setting window 3520 for the notification message reception setting on the screen of the wearable device 100.

In addition, the setting window 3520 may display a list 3523 of attributes of the notification message. The wearable device 100 may receive a user input of selecting an application field 3524. The wearable device 100 may display a list 3533 of a plurality of applications according to the reception of the user input of selecting the application field 3524.

The list 3533 of the plurality of applications may display fields corresponding to the respective applications. The wearable device 100 may receive a user input of selecting a FACEBOOK field 3535 (as an example of a social media application field).

When the wearable device 100 receives the user input of selecting at least one from the respective fields corresponding to the plurality of applications, the wearable device 100 may display a list 3543 of detailed attributes of the applications.

Referring to FIG. 35B, the wearable device 100 may display fields corresponding to information capable of identifying the senders within the FACEBOOK application, based on the user input of selecting the FACEBOOK field 3535. The wearable device 100 may selectively receive the notification messages, based on the user input of selecting the information capable of identifying the senders within the FACEBOOK application. For example, the information capable of identifying the senders may include account information, an ID, and an email address of an application, but is not limited thereto.

According to one or more exemplary embodiments, in a case where the notification message is blocked based on sender information, when the senders are identical even though the information capable of identifying the senders is different for each application, the wearable device 100 may block all notification messages including the information capable of identifying the senders.

According to one or more exemplary embodiments, the wearable device 100 may store the information capable of identifying the senders. For example, the wearable device 100 may store a telephone number, an email address, and account information of other user in a contact. In a case where the wearable device 100 blocks a contact from a certain sender selected by a user input, the wearable device 100 may block all notification messages including information on a plurality of telephone numbers, a plurality of email addresses, and a plurality of account information corresponding to a certain sender, based on the stored information.

For example, assuming that a FACEBOOK ID of John is Sheldon and a TWITTER ID of John is Sheldor, when a user input of blocking a notification message with respect to the sender John, the wearable device 100 may block all notification messages including the ID "Sheldon" related to the FACEBOOK and the ID "Sheldor" related to the TWITTER.

FIG. 36 illustrates an example of a screen for setting whether to receive a notification message and whether to prioritize the notification message in a wearable device 100, according to one or more exemplary embodiments.

Referring to FIG. 36, the wearable device 100 may display an icon 3611 for a notification message reception setting on a screen 3610 of the wearable device 100. The wearable device 100 may receive a user input of selecting the icon 3611 for the notification message reception setting. Since this corresponds to that of FIG. 35, a detailed description thereof is omitted here.

The wearable device 100 may receive a user input of selecting a contact field 3625. The wearable device 100 may display a list 3633 of a plurality of contacts according to the reception of the user input of selecting the contact field 3625. The list 3633 of the plurality of contacts may include fields corresponding to the respective contacts.

The wearable device 100 may display a check box or an icon for setting whether to prioritize the notification message and whether to receive the notification message together with the field corresponding to each of the plurality of contacts.

As compared to FIG. 35, a preference icon 3641 of an Annie contact field in FIG. 36 may refer to a state that is set to not prioritize or prefer notification messages corresponding to Annie's contact. However, a check box 3641 of the Annie contact field may refer to a state that is set such that the wearable device 100 receives notification messages corresponding to Annie's contact.

According to one or more exemplary embodiments, when the wearable device 100 is set to not receive notification messages including the attribute related to the corresponding field, the wearable device 100 may display the preference icon 3642 in a disabled state. A check box 3643 of a John contact field may mean a state that is set such that the wearable device 100 does not receive notification messages corresponding to John's contact, and a preference icon 3642 of the John contact field may be in a disabled state.

Figure 37:
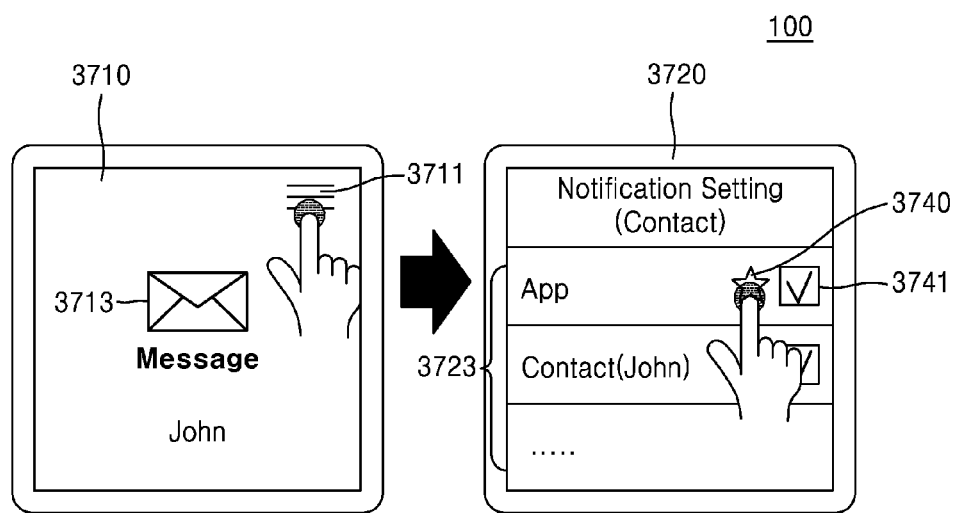
FIG. 37 illustrates an example of a screen for setting whether to receive a notification message and whether to prefer the notification message in a wearable device upon reception of the notification message, according to an exemplary embodiment.

FIG. 37 illustrates an example of a screen for setting whether to receive a notification message and whether to prioritize the notification message in a wearable device 100 upon (i.e., after or in response to) reception of the notification message, according to one or more exemplary embodiments.

Referring to FIG. 37, the wearable device 100 may display an icon 3713 indicating the reception of the notification message on a screen 3710 of the wearable device 100. Since this corresponds to that described above, a detailed description thereof is omitted here.

The wearable device 100 may receive a user input of selecting an icon 3711 for a notification message reception setting. When the user input of selecting the icon 3711 is received, the wearable device 100 may display a setting window 3720 for the notification message reception setting on the screen of the wearable device 100.

In addition, the setting window 3720 may display fields 3723 corresponding to attributes of the received notification message. Furthermore, the setting window 3720 may display a preference icon 3740 and a check box 3741 for setting whether to prioritize the attributes of the notification message and whether to receive the attributes of the notification message.

The wearable device 100 may receive a user input of selecting the preference icon 3740 and the check box 3741, and determine whether to receive the notification message and whether to prioritize the notification message corresponding to the attribute of the received notification message, based on the received user input.

Figure 38:
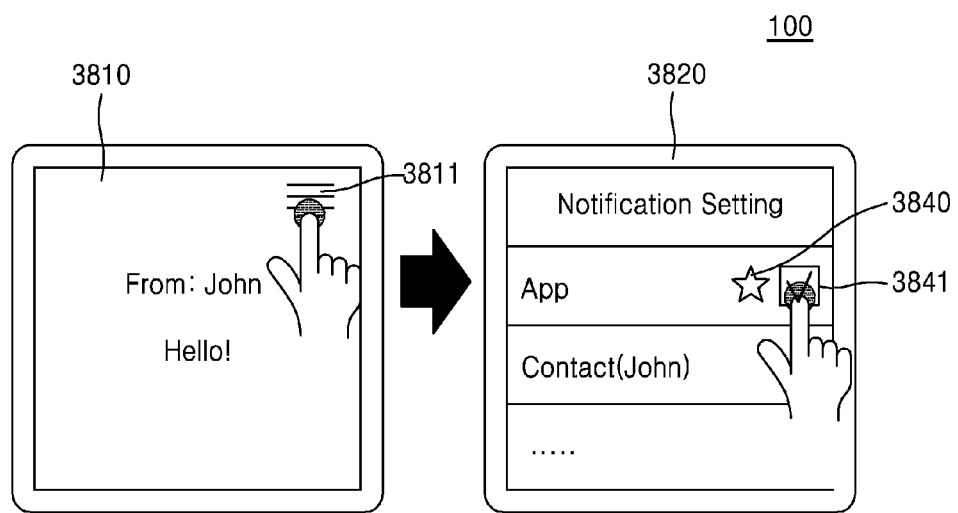
FIG. 38 illustrates an example of a screen for setting whether to receive a notification message and whether to prefer the notification message in a wearable device upon content display within the notification message, according to an exemplary embodiment.

FIG. 38 illustrates an example of a screen for setting whether to receive a notification message and whether to prioritize the notification message in a wearable device 100 upon content display within the notification message, according to one or more exemplary embodiments.

Referring to FIG. 38, the wearable device 100 may display content included in a notification message on a screen 3810 of the wearable device 100. The wearable device 100 may receive a user input of selecting an icon 3811 for a notification message reception setting, and display a setting window 3820 for the notification message reception setting on the screen of the wearable device 100, based on the received user input. Since this corresponds to that described above, a detailed description thereof is omitted here.

The wearable device 100 may display a list 3820 of the attributes of the received notification message. According to one or more exemplary embodiments, the list 3820 of the contents of the received notification message may further include attributes of the content included in the received notification message.

The wearable device 100 may receive a user input of selecting a preference icon 3840 and a check box 3841, and determine whether to receive the notification message and whether to prioritize the notification message corresponding to the attribute of the received notification message, based on the received user input. In addition, the wearable device 100 may determine whether to receive a notification message and whether to prioritize the message including content corresponding to attributes of the content included in the received notification message.

Figure 39:
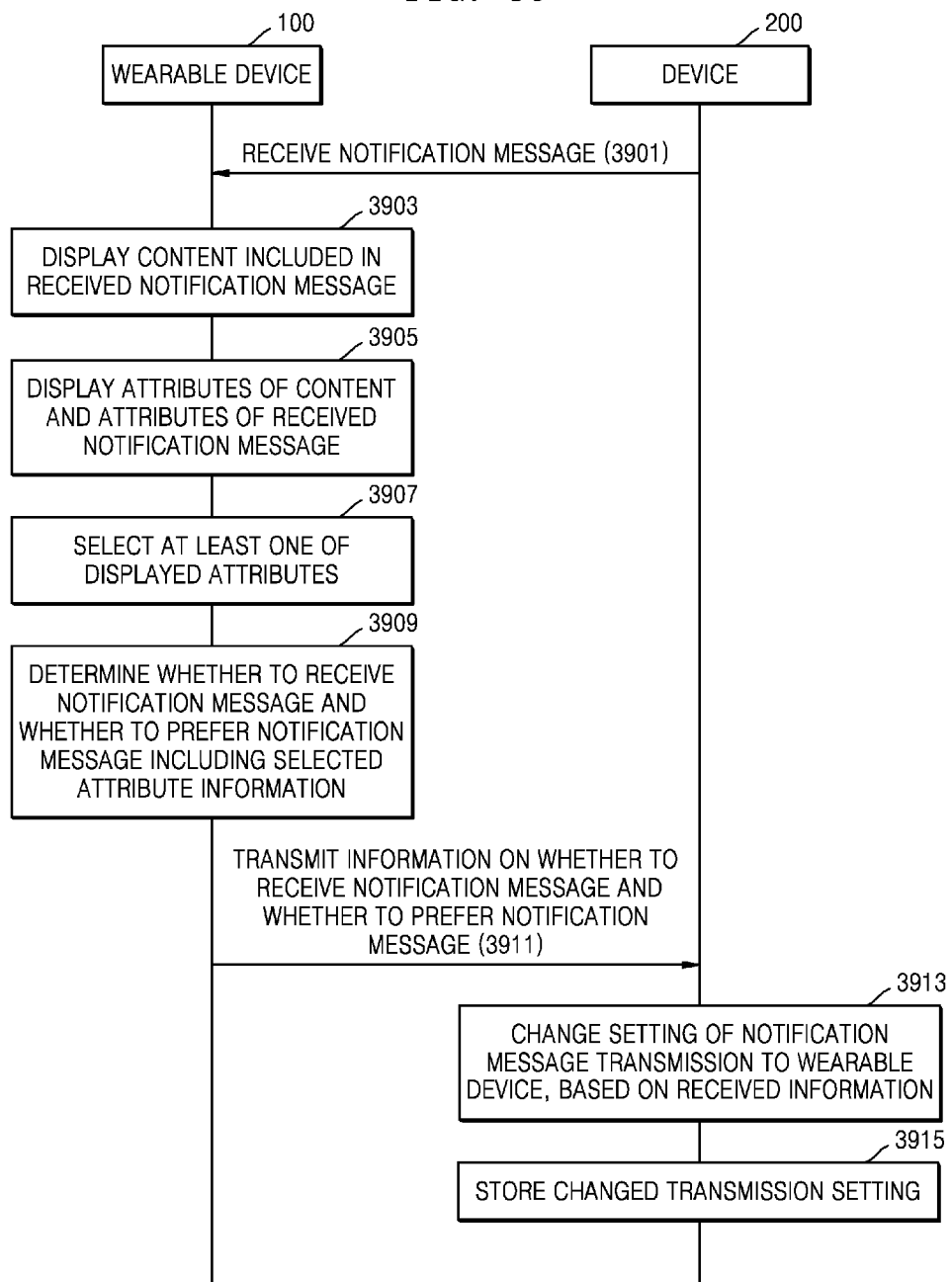
FIG. 39 illustrates a flowchart of a method of changing a transmission setting of a device according to notification message reception setting information and the notification message preference information in a wearable device, according to an exemplary embodiment.

FIG. 39 illustrates a flowchart of a method of changing a transmission setting of a device 200, based on whether to receive a notification message and whether to prioritize the notification message in a wearable device 100, according to one or more exemplary embodiments;

In operation 3901, the wearable device 100 may receive a notification message from the device 200. According to one or more exemplary embodiments, the device 200 may transmit a notification message generated by a notification event to the wearable device 100. In addition, the device 200 may transmit a notification message received from a server to the wearable device 100.

In operation 3903, the wearable device 100 may display content included in the received notification message. According to one or more exemplary embodiments, the content may not be displayed, and only whether to receive the notification message may be displayed.

In operation 3905, the wearable device 100 may display attributes of the received notification message and attributes of the content included in the notification message. According to one or more exemplary embodiments, the wearable device 100 may display at least one of the attributes of the received notification message, the attributes of the content included in the received notification message, and the attributes of the content received from the device 200 together with the notification message in the list form.

In operation 3907, the wearable device 100 may select the displayed attributes. According to one or more exemplary embodiments, the wearable device 100 may select at least one from the displayed attributes, based on the user input of selecting at least one from the displayed attributes.

In operation 3909, the wearable device 100 may determine whether to receive a notification message and whether to prioritize a notification message corresponding to the selected attribute. According to one or more exemplary embodiments, the wearable device 100 may determine whether to receive a notification message and whether to prioritize the notification message corresponding to the attribute selected in operation 3907, based on the user input.

In operation 3911, the wearable device 100 may transmit information on whether to receive the notification message and whether to prioritize the notification message in the wearable device 100. According to one or more exemplary embodiments, the wearable device 100 may transmit the information on whether to receive the notification message and the information on whether to prioritize the notification message separately or simultaneously.

In operation 3913, the device 200 may change the setting of notification message transmission to the wearable device 100, based on the received information on whether to receive the notification message and whether to prioritize the notification message.

In operation 3915, the device 200 may store the changed transmission setting. According to one or more exemplary embodiments, the device 200 may store the changed transmission setting as a predetermined mode, and apply the changed transmission setting according to a user input of selecting the predetermined mode.

Figure 40:
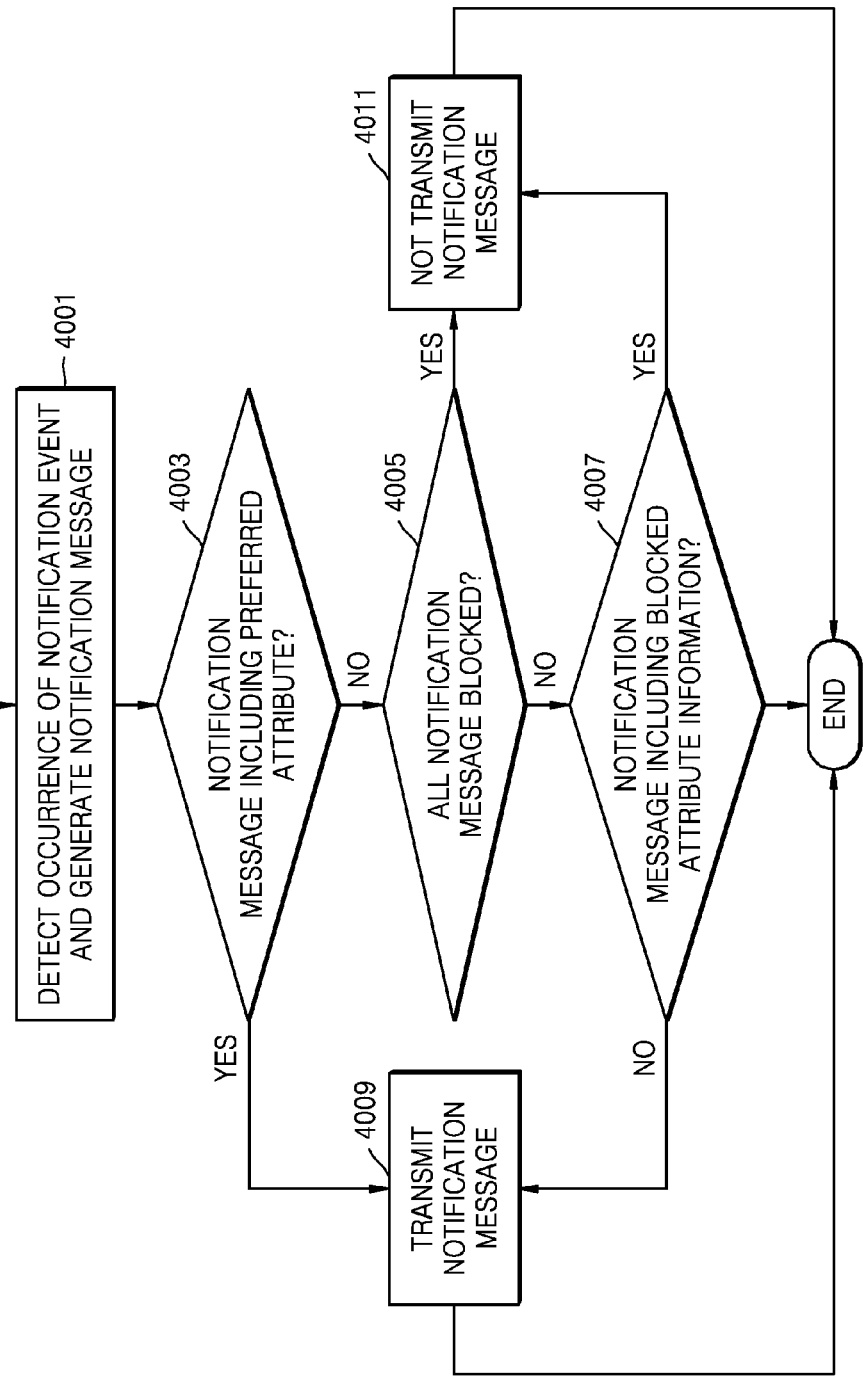
FIG. 40 illustrates a flowchart of a method of determining whether to transmit a notification message from a device to a wearable device, according to an exemplary embodiment.

FIG. 40 illustrates a flowchart of a method of determining whether to transmit a notification message to a wearable device 100, which is performed by a device 200, according to one or more exemplary embodiments.

In operation 4001, the device 200 may identify the occurrence of a notification event and generate a notification message. According to one or more other exemplary embodiments, the device 200 may receive a notification message from a server.

In operation 4003, the device 200 may determine whether the generated notification message is a notification message prioritized or preferred by the wearable device 100. According to one or more exemplary embodiments, the device 200 may determine whether the generated notification message is a notification message prioritized or preferred by the wearable device 100, based on information on whether to prioritize the notification message received from the wearable device 100. In addition, the device 200 may determine whether the generated notification message is a notification message prioritized or preferred by the wearable device 100, based on a notification message transmission setting stored in the device 200.

In operation 4009, when the generated notification message is a notification message including an attribute prioritized or preferred by the wearable device 100, the device 200 may transmit the notification message. According to one or more exemplary embodiments, when all notification messages are set to be blocked, the device 200 may transmit the notification message including the attribute prioritized or preferred by the wearable device 100.

In operation 4005, when the generated notification message is a notification message including the attribute that is not prioritized or preferred by the wearable device 100, the device 200 may determine whether the wearable device 100 is set to block all notification messages. According to one or more exemplary embodiments, the device 200 may determine whether the wearable device 100 is set to block all generated notification messages, based on the information on whether to prioritize the notification message that is received from the wearable device 100 or the notification message transmission setting stored in the device 200.

In operation 4011, when the wearable device 100 is set to block all notification messages, the device 200 may not transmit the notification message to the wearable device 100.

In operation 4007, when the wearable device 100 does not block all notification messages, the device 200 may determine whether the notification message generated in operation 4001 is a notification message including an attribute that is blocked in the wearable device 100. In addition, the device 200 may selectively transmit the notification message, based on the determination result.

For example, when the wearable device 100 is set to not receive the notification message from the FACEBOOK application, the device 200 may not transmit the notification message related to the FACEBOOK application to the wearable device 100. In addition, the device 200 may transmit a notification message related to another application, other than the FACEBOOK application, to the wearable device 100. Since this corresponds to operations 4009 and 4011, a detailed description thereof is omitted here.

Figure 41:
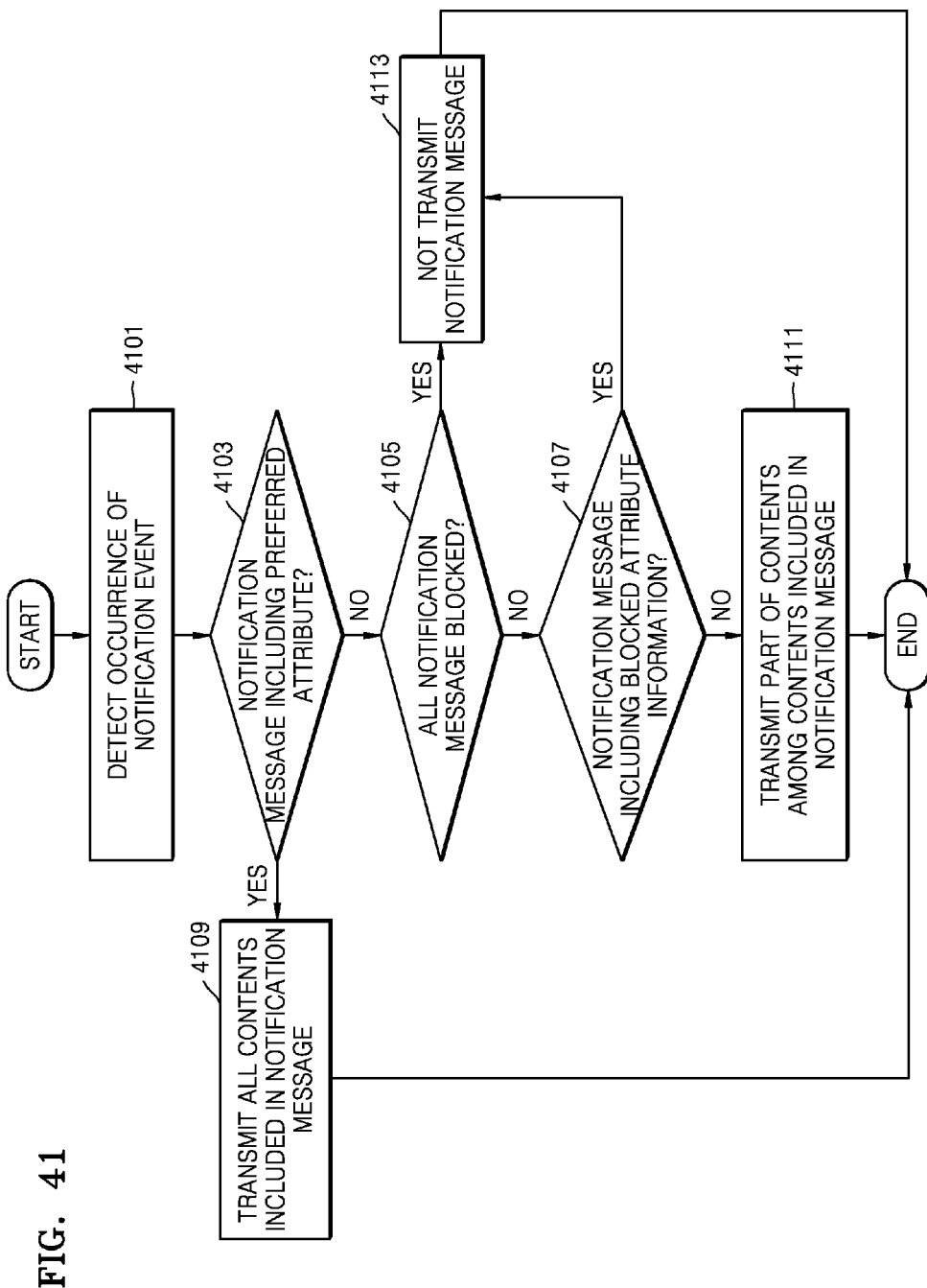
FIG. 41 illustrates a flowchart of a method of determining a size of a notification message transmitted to a wearable device according to preference of the notification message, which is performed by a device, according to an exemplary embodiment.

FIG. 41 illustrates a flowchart of a method of determining a size of a notification message transmitted to a wearable device 100, based on whether to prioritize the notification message, which is performed by a device 200, according to one or more exemplary embodiments.

In operation 4101, the device 200 may identify the occurrence of a notification event and generate a notification message.

In operation 4103, the device 200 may determine whether the generated notification message is a notification message prioritized or preferred by the wearable device 100.

Since operations 4101 and 4103 correspond to those described above, a detailed description thereof is omitted here.

In operation 4109, when the generated notification message is a notification message including an attribute prioritized or preferred by the wearable device 100, the device 200 may transmit all contents included in the notification message. When the content included in the notification message generated in operation 4101 has a size of 500 KB, the device 200 may transmit all of 500 KB to the wearable device 100. This will be described in detail below with reference to FIG. 42.

In operation 4105, when the generated notification message is not a notification message including the attribute that is prioritized or preferred by the wearable device 100, the device 200 may determine whether the wearable device 100 is set to block all notification messages.

In operation 4113, when the wearable device 100 is set to block all notification messages, the device 200 may not transmit the notification message to the wearable device 100. Since operations 4105 and 4113 correspond to those described above, a detailed description thereof is omitted here.

In operation 4107, when the wearable device 100 does not block all notification messages, the device 200 may determine whether the notification message generated in operation 4101 is a notification message including an attribute that is blocked in the wearable device 100. When the notification message generated in operation 4101 is a notification message including an attribute that is blocked by the wearable device 100, the device 200 may not transmit the notification message to the wearable device 100.

In operation 4111, when the notification message generated in operation 4101 is a notification message including an attribute that is set to be received by the wearable device 100, the device 200 may transmit a portion of the content included in the notification message. For example, when the content included in the notification message has a size of 500 MB, the device 200 may transmit only 200 KB to the wearable device 100. In addition, when an image is included in the notification message, the device 200 may transmit the notification message after converting a resolution of the image to a predetermined value or less. When music is included in the notification message, the device 200 may transmit a portion of the content so as to play the music for a predetermined time. However, exemplary embodiments are not limited thereto.

Figure 42:
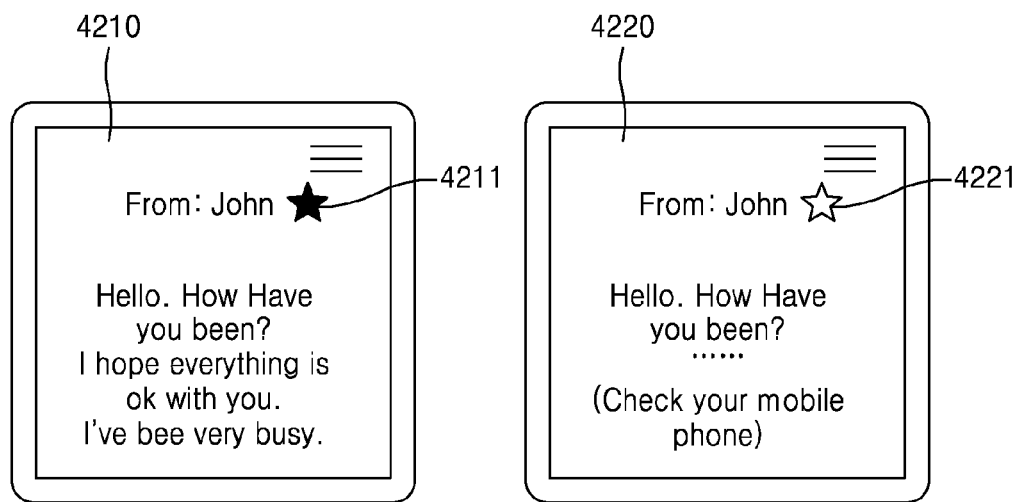
FIG. 42 illustrates an example of a screen that displays preference of a notification message in a wearable device, according to an exemplary embodiment.

FIG. 42 illustrates an example of a screen that displays whether to prioritize a notification message in a wearable device 100, according to one or more exemplary embodiments.

The wearable device 100 may display content included in the notification message on the screen. According to one or more exemplary embodiments, the wearable device 100 may receive all or a portion of the content included in the notification message, based on attributes prioritized or preferred by the wearable device 100. According to one or more exemplary embodiments, the wearable device 100 may receive all or a portion of the content related to the notification message, based on attributes prioritized or preferred by the wearable device 100.

Referring to FIG. 42, the wearable device 100 may receive a notification message sent by John. A text "Hello. How have you been? I hope everything is ok with you. I've been very busy" is included in the notification message received from John.

A first screen 4210 of FIG. 42 illustrates a screen in a case where the notification message from John is a notification message prioritized or preferred by the device 200. The wearable device 100 may display a preference icon 4211 indicating that the received notification message is a prioritized or preferred notification message, and an entire text included in the notification message.

According to one or more exemplary embodiments, the wearable device 100 may receive a total size of the content included in the notification message from the device 200.

Referring to FIG. 42, the wearable device 100 may display an entire text included in the notification message: "Hello. How have you been? I hope everything is ok with you. I've been very busy".

A second screen 4220 of FIG. 42 illustrates a screen in a case where the notification message from John is a notification message that is not prioritized or preferred by the device 200. The wearable device 100 may display a preference icon 4221 indicating that the received notification message is a non-prioritized or preferred notification message, and a part of the text included in the notification message.

According to one or more exemplary embodiments, the wearable device 100 may receive only a part of the content included in the notification message from the device 200. According to one or more exemplary embodiments, the wearable device 100 may receive the entire content included in the notification message from the device 200 and display only a part of the received content.

Referring to FIG. 42, the wearable device 100 may display a part of the content included in the notification message on the second screen 4220: "Hello. How have you been?". According to one or more exemplary embodiments, the wearable device 100 may receive, from the device 200, only text data corresponding to "Hello. How have you been?" among text data that is the content included in the notification message.

According to one or more exemplary embodiments, the wearable device 100 may display content, which is not displayed on the screen 4220, as a message of checking the device 200. In addition, the wearable device 100 may receive a portion of the content, which has not been received, from the device 200 so as to display the remaining non-displayed content, based on the user input, and display the entire content on the screen of the wearable device 100, based on the received data.

According to one or more exemplary embodiments, the description of FIG. 42 may be equally applied to a case where the notification message related to the content is received from the device 200 although the content is not included in the notification message.

Figure 43:
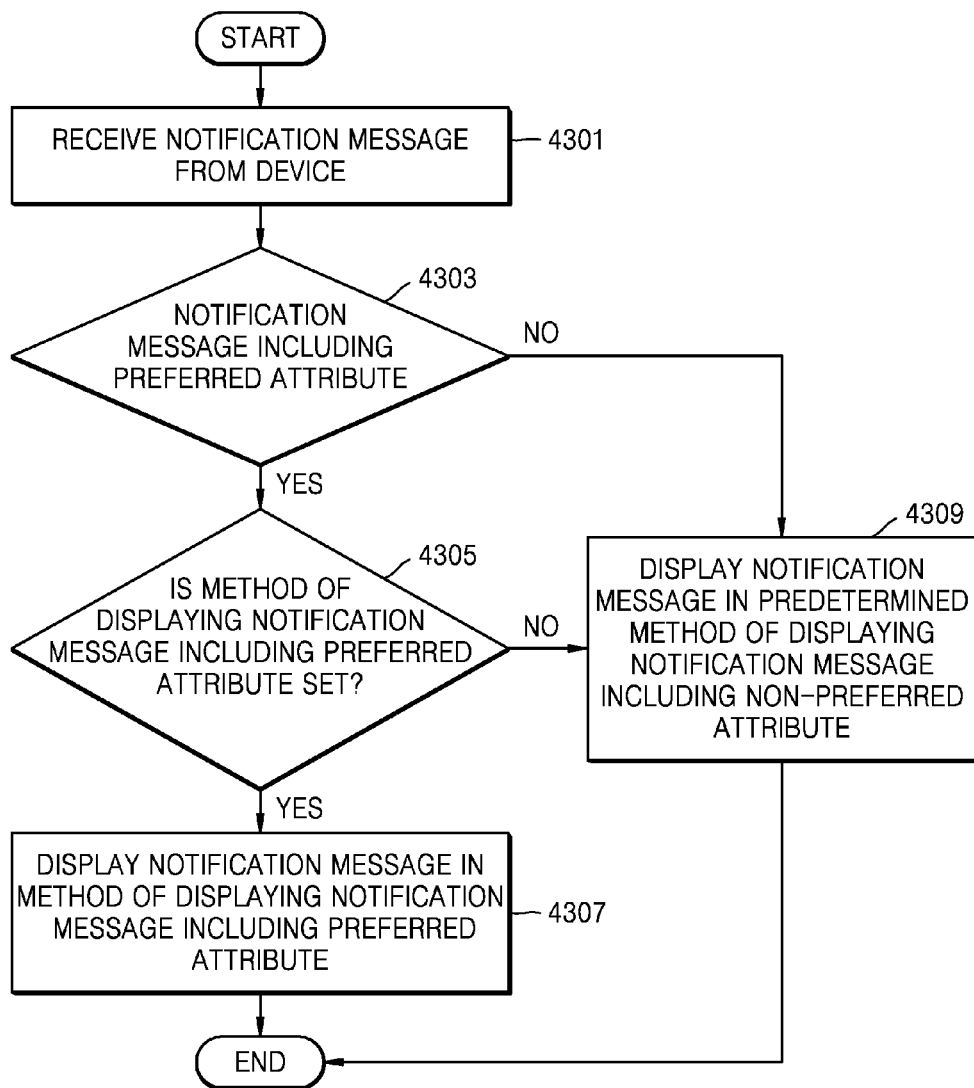
FIG. 43 illustrates a flowchart of a method of displaying a notification message according to preference of the notification message in a wearable device, according to an exemplary embodiment.

FIG. 43 illustrates a flowchart of a method of displaying a notification message according to whether to prioritize the notification message in a wearable device 100, according to one or more exemplary embodiments.

In operation 4301, the wearable device 100 may receive a notification message from the device 200. Since this corresponds to that described above, a detailed description thereof is omitted here.

In operation 4303, the wearable device 100 may determine whether the received notification message is a notification message including a prioritized or preferred attribute. According to one or more exemplary embodiments, the wearable device 100 may determine the attribute of the received notification message. In addition, the wearable device 100 may determine whether to prioritize the received notification message, based on a predetermined preference setting.

In operation 4305, when the received notification message is a notification message including a prioritized or preferred attribute, the wearable device 100 may determine whether a method of displaying the notification message including the prioritized or preferred attribute is set.

In operation 4307, when the method of displaying the notification message including the prioritized or preferred attribute is previously set, the notification message may be displayed according to the previously set method of displaying the notification message including the prioritized or preferred attribute.

In operation 4309, when the received notification message is not a notification message including a prioritized or preferred attribute or when the method of displaying the notification message including the prioritized or preferred attribute is not set, the wearable device 100 may display the notification message according to the predetermined method of displaying the non-prioritized or preferred notification message.

According to one or more exemplary embodiments, the method of displaying the notification message including the prioritized or preferred attribute may include a method of displaying the notification message in a predetermined area, a method of displaying the notification message together with a predetermined icon, or a method of displaying the notification message for more than a predetermined time, etc.

Figure 44:
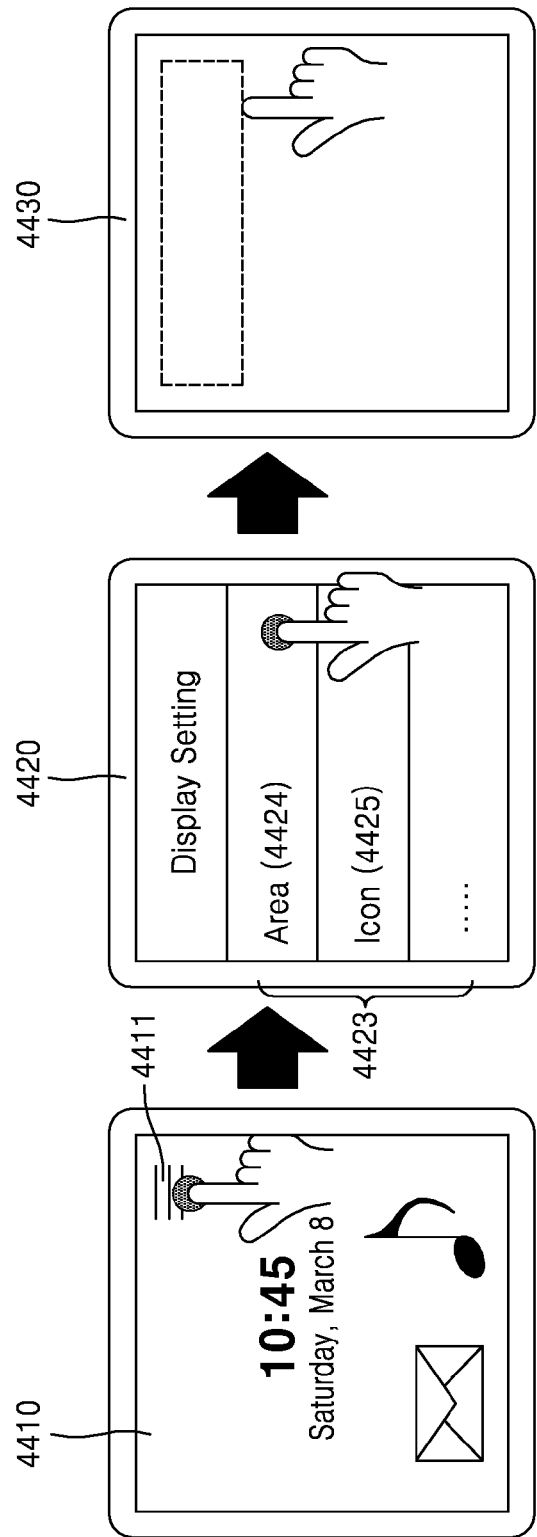
FIG. 44 illustrates an example of a setting of a method of displaying a preferred notification message in a wearable device, according to an exemplary embodiment.

FIG. 44 illustrates an example of a setting of a method of displaying a prioritized or preferred notification message in a wearable device 100, according to one or more exemplary embodiments.

Based on a user input, the wearable device 100 may set a method of displaying a notification message including a prioritized or preferred attribute.

Referring to FIG. 44, the wearable device 100 may display an icon 4411 for a notification message display setting on a screen 4410 of the wearable device 100. The wearable device 100 may receive a user input of selecting the icon 4411 for the notification message display setting. When the user input of selecting the icon 4411 is received, the wearable device 100 may display a setting window 4420 for the notification message display setting on the screen of the wearable device 100. The setting window 4420 for the notification message display setting may be displayed on the entire screen of the wearable device 100, but is not limited thereto.

In addition, the setting window 4420 may display a list 4423 of notification message display setting methods. For example, the list 4423 of the notification message display setting methods may include an area field 4424 and an icon field 4425.

The wearable device 100 may receive a user input of selecting the area field 4424. The wearable device 100 may display a screen 4430 for receiving a user input of selecting a predetermined area according to the reception of the user input of selecting the application field 4424. According to one or more exemplary embodiments, the wearable device 100 may receive a user input of selecting a predetermined area, like a touch input or a drag input. However, exemplary embodiments are not limited thereto.

Figure 45:
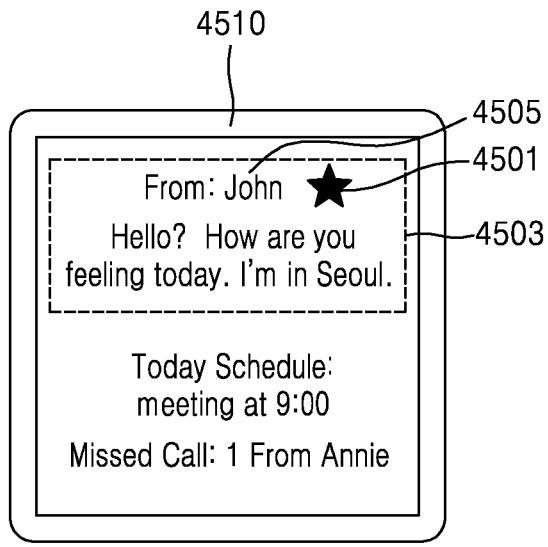
FIG. 45 illustrates an example of a screen upon reception of a notification message including an attribute that is preferred by a wearable device, according to an exemplary embodiment.

FIG. 45 illustrates an example of a screen display upon (i.e., after or in response to) reception of a notification message including an attribute prioritized or preferred by a wearable device 100, according to one or more exemplary embodiments.

The wearable device 100 may display contents of at least one received notification message on a screen 4510. According to one or more exemplary embodiments, the wearable device 100 may display contents of notification messages in order of reception time.

Referring to FIG. 45, the notification message 4505 received from John may be a notification message including an attribute that is prioritized or preferred by the wearable device 100. In the case of the prioritized or preferred notification message, the wearable device 100 may display the notification message together with a preference icon 4501. In addition, in the case of the notification message including the prioritized or preferred attribute, the wearable device 100 may display the content of the notification message in a predetermined area 4503. According to one or more exemplary embodiments, the predetermined area 4503 may be an area that is selected by the user input in FIG. 44.

In the case of the notification message including the non-prioritized or preferred attribute, the wearable device 100 may display the content included in the notification message in other area 4503, except for the predetermined area. In addition, in the case of the notification message including the non-prioritized or preferred attribute, the wearable device 100 may display an icon indicating the notification message including the non-prioritized or preferred attribute together with the content included in the notification message. However, exemplary embodiments are not limited thereto.

In addition, the wearable device 100 may continuously display the content included in the notification message including the prioritized or preferred attribute on the screen until a predetermined user input is received. However, exemplary embodiments are not limited thereto.

According to one or more exemplary embodiments, the wearable device 100 may receive all or a plurality of the notification messages from the device 200 and display the notification message, from among the received notification messages, including the preferred attribute on the screen 4510. The device 200 may transmit the notification messages, which are received from the server or are generated by the device 200, to the wearable device 100. The wearable device 100 may receive all or a plurality of the notification messages from the device 200 and store the received notification messages in the memory. The wearable device 100 may display the notification message including the preferred attribute on the screen 4510. In addition, the wearable device 100 may display the notification message having the preferred attribute on the screen 4510, without storing the received notification message.

Figure 46:
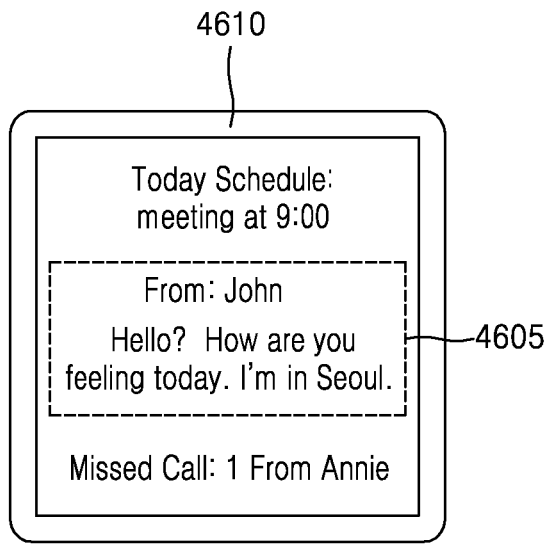
FIG. 46 illustrates an example of a screen display upon reception of a notification message including an attribute that is not preferred by a wearable device, according to an exemplary embodiment.

FIG. 46 illustrates an example of a screen display upon reception of a notification message including an attribute that is not prioritized or preferred by a wearable device 100, according to one or more exemplary embodiments.

The wearable device 100 may display contents of at least one received notification message on a screen 4510. Since this corresponds to that described above, a detailed description thereof is omitted here.

Referring to FIG. 46, the wearable device 100 may display only contents of a predetermined number of notification messages on a screen 4610 at a time. Therefore, the wearable device 100 may delete the contents of the sequentially displayed notification messages from the screen, based on the order of reception time of the notification messages.

According to one or more exemplary embodiments, in the case of the notification message including the prioritized or preferred attribute, the contents of the notification messages including the non-prioritized or preferred attribute may be deleted from the screen with the passage of time. In the case of the notification messages including the prioritized or preferred attribute, the contents of the notification messages including the prioritized or preferred attribute may be continuously displayed on the screen until a predetermined user input is received.

In addition, referring to FIG. 46, in a manner different from that in FIG. 45, since a notification message 4605 from John is not a notification message including an attribute that is prioritized or preferred by the wearable device 100, the content included in the notification message from John may not be displayed in an area selected by the user input in FIG. 44.

Figure 47:
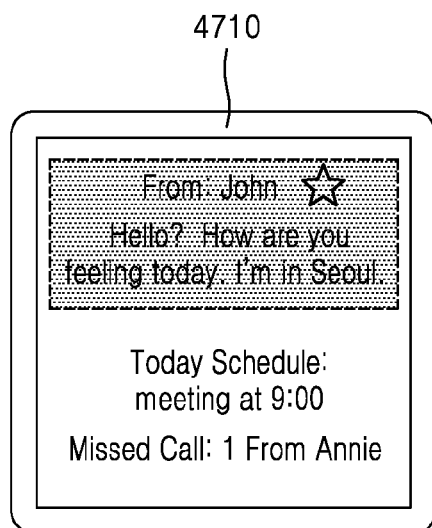
FIG. 47 illustrates an example of a screen that displays content included in a notification message including an attribute that is preferred by a wearable device, according to an exemplary embodiment.

FIG. 47 illustrates an example of a screen that displays content included in a notification message including an attribute that is prioritized or preferred by a wearable device 100, according to one or more exemplary embodiments.

Referring to FIG. 47, in the case of the notification message including the attribute that is prioritized or preferred by the wearable device 100, the wearable device 100 may display content included in the notification message including the prioritized or preferred attribute with a predetermined color on a screen 4710.

According to one or more exemplary embodiments, the wearable device 100 may highlight the content so as to indicate that the corresponding content is the content included in the notification message including the prioritized or preferred attribute. In addition, in a case where the content included in the notification message including the prioritized or preferred attribute is a text, the text may be displayed with a predetermined font or a predetermined font size. In addition, as described above, the wearable device 100 may display the content of the notification message together with the preference icon. However, exemplary embodiments are not limited thereto.

Figure 48:
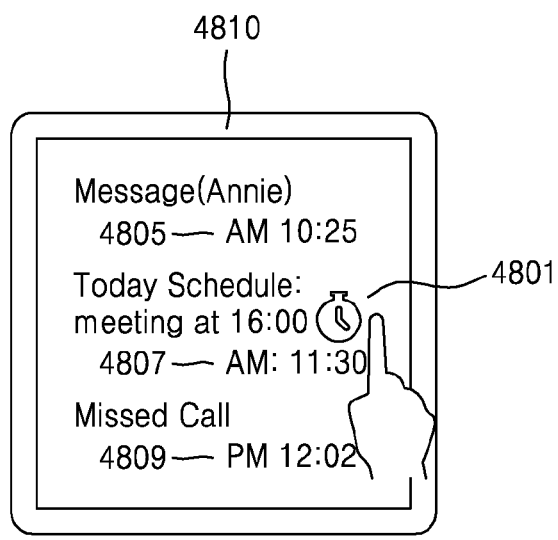
FIGS. 48 and 49 illustrate examples of a method of fixedly displaying a notification message in a wearable device, according to an exemplary embodiment.
Figure 49:
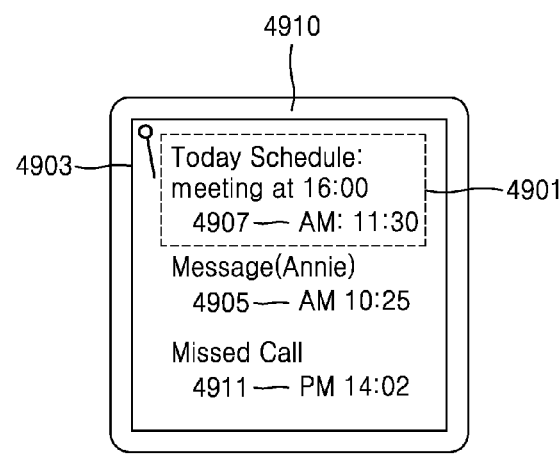

FIGS. 48 and 49 illustrate examples of a method of fixedly displaying a notification message in a wearable device 100, according to one or more exemplary embodiments.

In operation 48, the wearable device 100 may display content included in at least one received notification message on a screen 4810. The wearable device 100 may receive a user input of selecting at least one of the contents included in at least one notification message displayed on the screen 4810.

The wearable device 100 may fixedly display the content included in the selected notification message on the screen 4810, based on the received user input. The fixedly displaying on the screen may mean that the content is not deleted from the screen, regardless of the reception time of the notification message, even in the case of the notification message including the attribute that is prioritized or preferred by the wearable device 100. In addition, the wearable device 100 may fixedly display the notification message on the screen 4810, regardless of the preference of the notification message.

According to one or more exemplary embodiments, the user input of selecting the notification message displayed on the screen may include a user input of clicking content 4801 desired to be fixedly displayed on the screen for more than a predetermined time. However, exemplary embodiments are not limited thereto, and other types of user inputs may be provided in other exemplary embodiments for selecting the notification message.

In addition, according to one or more exemplary embodiments, the wearable device 100 may delete the notification message fixedly displayed on the screen immediately or after a predetermined time, based on the user input.

Referring to FIG. 49, the wearable device 100 may continuously display the content 4801 selected in FIG. 48 on the screen.

The wearable device 100 may display the content 4901, which is continuously displayed on the screen, in a predetermined area of the screen. According to one or more exemplary embodiments, the predetermined area may be an area that is selected in FIG. 44.

In addition, the wearable device 100 may display predetermined content 4903 so as to distinguish the content continuously displayed on the screen. The icon 4903 illustrated in FIG. 49 is merely exemplary and is not limited thereto. In addition, the wearable device 100 may delete the continuously, fixedly displayed content from the screen, based on the user input of selecting the icon 4903.

Figure 50:
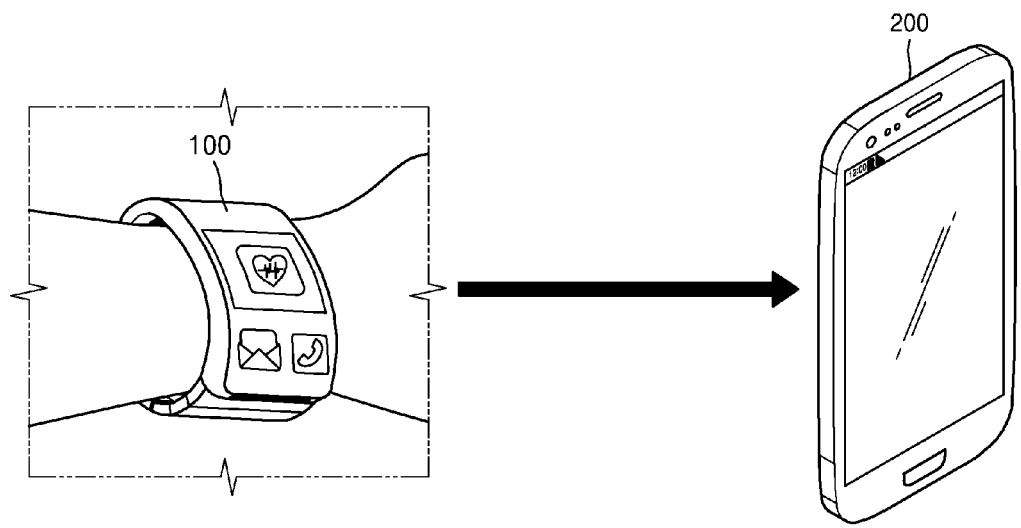
FIG. 50 illustrates a system for transmitting bio signal information from a wearable device to a device, according to an exemplary embodiment.

FIG. 50 illustrates a system for transmitting bio signal information (e.g., biometric information) from a wearable device 100 to a device 200, according to one or more exemplary embodiments.

The wearable device 100 may acquire bio signal information from a user. According to one or more exemplary embodiments, the wearable device 100 may acquire bio signal information from a user by using a sensor and an input device included in the wearable device 100. For example, the sensor included in the wearable device 100 may include a temperature sensor, a humidity sensor, an optical sensor, a pulse sensor, etc., and the input device may include a microphone. However, exemplary embodiments are not limited thereto.

According to one or more exemplary embodiments, the wearable device 100 may determine whether to receive the notification message and whether to prioritize the notification message according to the attribute of the wearable device 100, based on the acquired bio signal information of the user. For example, the wearable device 100 may select at least one attribute from the list of attributes of the notification message, based on the acquired bio signal information of the user.

The wearable device 100 may transmit the acquired bio signal information to the device 200. According to one or more exemplary embodiments, the wearable device 100 may transmit the acquired bio signal information from the device 200 periodically, at arbitrary periods (i.e., non-periodically), or based on a request from the device 200. However, exemplary embodiments are not limited thereto. In addition, the wearable device 100 may transmit the acquired bio signal information to an external server periodically, at arbitrary periods, or in response to a request from the external server.

The device 200 may receive bio signal information, which has been acquired by the wearable device 100, from the wearable device 100. According to one or more exemplary embodiments, the device 200 may transmit a predetermined notification message, based on the received bio signal information. For example, the device 200 may analyze the received bio signal information, determine a physical condition of a user, and transmit a notification message corresponding to the physical condition of the user, based on the determination result.

In addition, according to one or more exemplary embodiments, the device 200 may select an attribute to be transmitted to the wearable device 100, based on the bio signal information, and transmit a notification message corresponding to the selected attribute to the wearable device 100. For example, the device 200 may analyze the received bio signal information, determine a physical condition of a user, and transmit a notification message, in which the subject of the content included in the notification message is "health", to the wearable device 100, based on the determination result.

According to one or more exemplary embodiments, if necessary, the device 200 may analyze the content of the notification message and identify attributes of the content of the notification message, based on the parsing result. For example, the device 200 may analyze the content of the notification message to identify attributes of the content, based on a headline and a title included in the content. In addition, when the attributes of the content of the notification message are provided from the external server, the attributes of the content of the notification message may be identified based on the provided information.

According to one or more exemplary embodiments, attribute information of the content of the notification message, which is provided from the external server, may be included in metadata.

Figure 51:
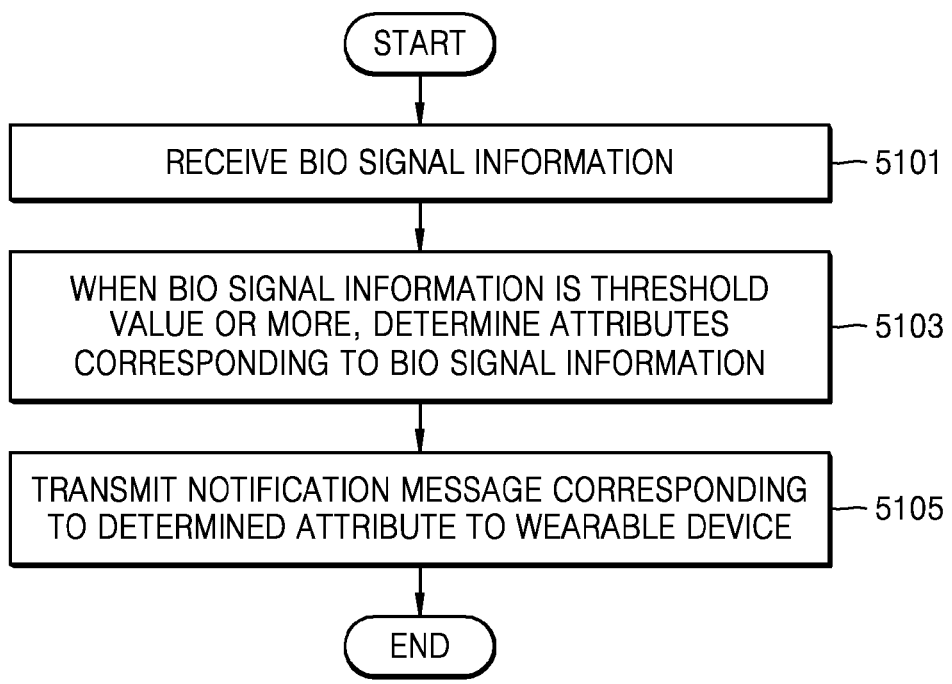
FIG. 51 illustrates a flowchart of a method of selecting an attribute of a notification message in a wearable device, based on bio signal information, according to an exemplary embodiment.

FIG. 51 illustrates a flowchart of a method of selecting attributes of a notification message in a wearable device 100, based on bio signal information, according to one or more exemplary embodiments.

In operation 5101, the device 200 may receive bio signal information from the wearable device 100. According to one or more exemplary embodiments, the device 200 may receive bio signal information acquired by the wearable device 100, or may acquire bio signal information of a user from an external server.

In operation 5103, when the bio signal information has a value greater than or equal to a threshold value, the device 200 may determine attributes corresponding to the bio signal information. The bio signal information may include body temperature information, pulse wave information, and voice information such as a height of voice and a cough sound, but is not limited thereto. When predetermined information included in the bio signal information is greater than or equal to a threshold value, the device 200 may determine attributes corresponding to the bio signal information. For example, when the body temperature information is greater than or equal to a threshold value, the device 200 may determine or select an attribute, i.e., the subject of the content included in the notification message, as "influenza".

In operation 5105, the device 200 may transmit a notification message corresponding to the determined attribute to the wearable device 100. According to one or more exemplary embodiments, the device 200 may transmit a notification message including an attribute determined in operation 5103 to the wearable device 100 among the notification messages generated according to the occurrence of the notification event or the notification messages received from the exterior.

Figure 52:
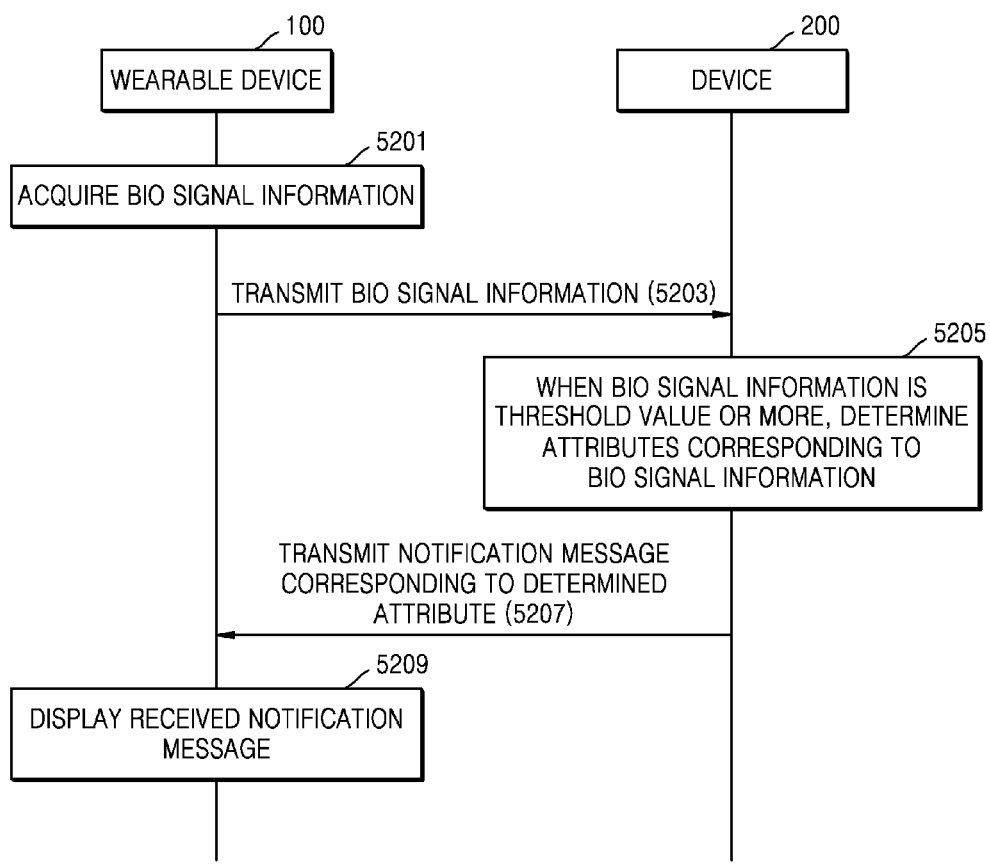
FIG. 52 illustrates a flowchart of a method of transmitting a notification message from a device to a wearable device, based on bio signal information, according to an exemplary embodiment.

FIG. 52 illustrates a flowchart of a method of transmitting a notification message from a device 200 to a wearable device 100, based on bio signal information, according to one or more exemplary embodiments.

In operation 5201, the wearable device 100 may acquire bio signal information. According to one or more exemplary embodiments, the wearable device 100 may acquire bio signal information by identifying a condition of a user, such as a body temperature and a voice tone, by using at least one sensor included in the wearable device 100. In addition, the wearable device 100 may acquire bio signal information by a user input.

In operation 5203, the wearable device 100 may transmit the acquired bio signal information to the device 200. The wearable device 100 may transmit the acquired bio signal information periodically, at arbitrary periods, or in response to a request from the wearable device 100. Since this corresponds to that described above, a detailed description thereof is omitted here.

In operation 5205, when the bio signal information received from the wearable device 100 has a value greater than or equal to a threshold value, the device 200 may determine attributes corresponding to the bio signal information. According to one or more exemplary embodiments, the device 200 may store the received bio signal information and analyze the bio signal information corresponding to a predetermined period of time. The device 200 may determine the attributes based on the result obtained by analyzing the bio signal information of the predetermined period.

In operation 5207, the device 200 may transmit a notification message corresponding to the determined attribute to the wearable device 100. Since this corresponds to that described above, a detailed description thereof is omitted here.

In operation 5209, the wearable device 100 may display the received notification message. According to one or more exemplary embodiments, the wearable device 100 may output an indicator (e.g., display icon, display symbol, audio output, vibration output, etc.) indicating the presence of the received notification message, and/or may display the content included in the notification message. In addition, the wearable device 100 may receive the content related to the notification message from the device 200 or a server and display the received content.

Figure 53:
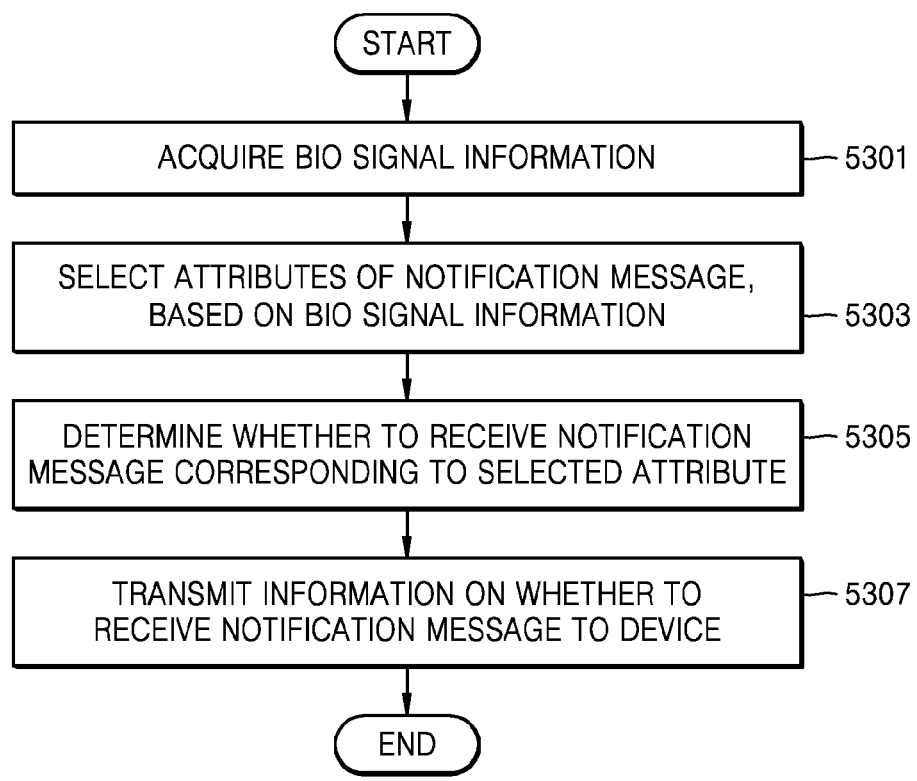
FIG. 53 illustrates a flowchart of a method of selecting an attribute of a notification message in a device, based on bio signal information, according to an exemplary embodiment.

FIG. 53 illustrates a flowchart of a method of selecting attributes of a notification message in a wearable device 100, based on bio signal information, according to one or more exemplary embodiments.

In operation 5301, the wearable device 100 may acquire bio signal information. According to one or more exemplary embodiments, the wearable device 100 may receive bio signal information from a server, may receive bio signal information from the device 200, or may acquire or determine bio signal information by using at least one sensor included in the wearable device 100. However, exemplary embodiments are not limited thereto.

In operation 5303, the wearable device 100 may select the attributes of the notification message, based on the bio signal information. According to one or more exemplary embodiments, the wearable device 100 may acquire information on a physical condition or emotion of the user by analyzing the bio signal information. The wearable device 100 may select attributes of a message to be received in the wearable device 100, based on the acquired information on the physical condition or emotion of the user. In addition, when the bio signal information is greater than or equal a threshold value, the wearable device 100 may determine attributes corresponding to the bio signal information.

In operation 5305, the wearable device 100 may determine whether to receive a notification message corresponding to the selected attribute. For example, when the bio signal information is greater than or equal to a threshold value, the wearable device 100 may determine (e.g., based on a user input) to receive notification messages in which the subject of the content included in the notification message is "health", "leisure", and "humor". According to another exemplary embodiment, the wearable device 100 may determine (e.g., based on a user input) whether to prioritize the notification message corresponding to the attribute selected in operation 5305.

In operation 5307, the wearable device 100 may transmit the information on whether to receive the notification message to the device 200. In addition, according to one or more exemplary embodiments, the wearable device 100 may transmit information on whether to prioritize the notification message to the device 200. Since this corresponds to that described above, a detailed description thereof is omitted here.

Figure 54:
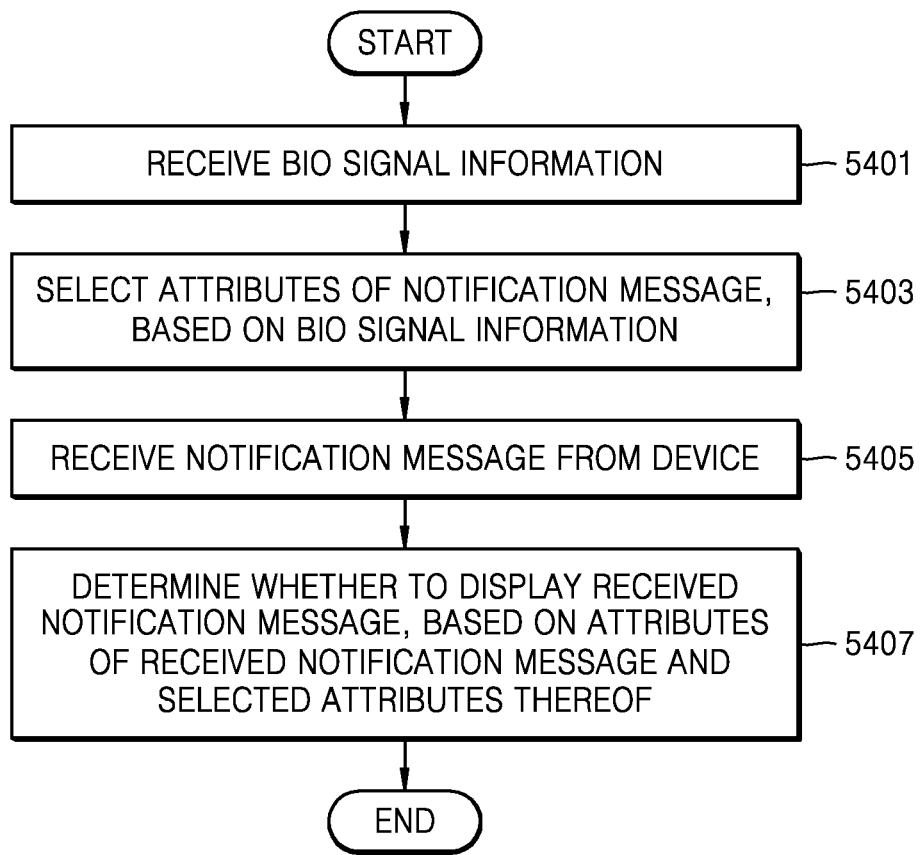
FIG. 54 illustrates a flowchart of a method of determining whether to display of a notification message in a wearable device, based on bio signal information, according to an exemplary embodiment.

FIG. 54 illustrates a flowchart of a method of determining whether to display a notification message in a wearable device 100, based on bio signal information, according to one or more exemplary embodiments.

In operation 5401, the wearable device 100 may acquire bio signal information.

In operation 5403, the wearable device 100 may select or determine one or more attributes of a notification message, based on the bio signal information.

In operation 5405, the wearable device 100 may determine (e.g., based on a user input) whether to display a notification message corresponding to the selected one or more attributes.

Since operations 5401 and 5405 correspond to those described above, a detailed description thereof is omitted here.

In operation 5407, the wearable device 100 may determine whether to display a notification message, based on the attributes of the notification message and the selected one or more attributes. According to one or more exemplary embodiments, the wearable device 100 may compare the one or more attributes selected in operation 5403 with the attributes of the received notification message, and selectively display the notification message, based on the comparison result.

According to one or more exemplary embodiments, the wearable device 100 may output a notification message generated therein (i.e., as opposed to being received from the device 200). In this case, the notification message may be based on a notification event occurring in or identified by the wearable device 100 (e.g., an event corresponding to a predetermined number of walking steps being detected by a sensor of the wearable device 100 in one day, an event corresponding to a predetermined heart rate being detected by a sensor of the wearable device 100, an event corresponding to a predetermined temperature detected by a sensor of the wearable device 100, an event corresponding to a predetermined physical condition detected by a sensor of the wearable device 100, etc.). Upon displaying the notification message (e.g., "5,000 steps"), the wearable device 100 may receive a user input to set a notification setting for the notification message. For example, the wearable device 100 may receive a user input to no longer display notification messages with the displayed attribute (or one or more selected attributes) of the displayed notification message, to prioritize notification messages with the displayed attribute (or one or more selected attributes) of the displayed notification message, to always display notification messages with the displayed attribute (or one or more selected attributes) of the displayed notification message, etc.

According to the user input, the wearable device 100 may store a notification message output setting and determine whether to display subsequent notification messages corresponding to the notification event based on the stored notification message output setting. Furthermore, the wearable device 100 may transmit information on the notification setting to the device 200 and the device may store the notification setting as a notification message reception setting for the wearable device 100 and/or for other wearable devices of the user.

Figure 55:
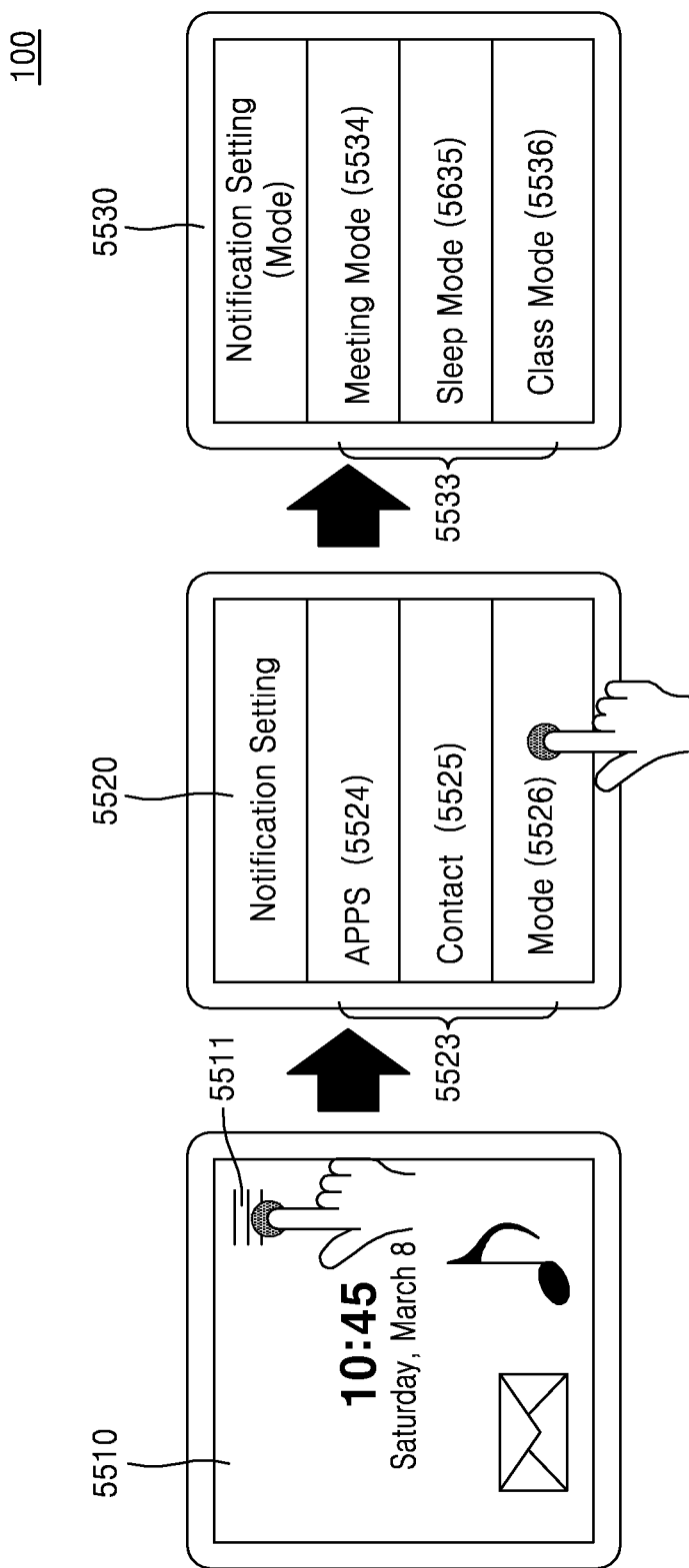
FIG. 55 illustrates an example of a notification message reception setting mode in a wearable device, according to an exemplary embodiment.

FIG. 55 illustrates an example of a notification message reception setting mode in a wearable device 100, according to one or more exemplary embodiments.

Based on a user input, the wearable device 100 may set a method of displaying a notification message including a prioritized or preferred attribute.

Referring to FIG. 55, the wearable device 100 may display an icon 5511 for a notification message display setting on a screen 5510 of the wearable device 100. The wearable device 100 may receive a user input of selecting the icon 5511 for the notification message display setting. When the user input of selecting the icon 5511 is received, the wearable device 100 may display a setting window 5520 for the notification message reception setting on the screen of the wearable device 100.

In addition, the setting window 5520 may display a list 5523 of notification message reception setting methods. For example, the list 5523 of the reception setting methods may include an application (APP) field 5524, a contact field 5525, and a mode field 5526.

The wearable device 100 may receive a user input of selecting the application field 5524. The wearable device 100 may display a list of a plurality of applications according to the reception of the user input of selecting the application field 5524. The list of the plurality of applications may display fields corresponding to the respective applications. By receiving a user input of selecting fields corresponding to the respective applications, the wearable device 100 may determine whether to receive a notification message including the application information corresponding to the selected fields.

The wearable device 100 may receive a user input of selecting the contact field 5525. The wearable device 100 may display a list of a plurality of contacts according to the reception of the user input of selecting the contact field 5525. The list of the plurality of contacts may display fields corresponding to the respective contacts. By receiving a user input of selecting fields corresponding to the respective contacts, the wearable device 100 may determine whether to receive a notification message including the contact information corresponding to the selected fields. According to one or more exemplary embodiments, the contact information may include sender information.

The wearable device 100 may receive a user input of selecting the mode field 5526. The wearable device 100 may display a list 5533 of a plurality of modes according to the reception of the user input of selecting the mode field 5526. According to one or more exemplary embodiments, the list 5533 of the plurality of modes may include a meeting mode field 5407, a sleep mode field 5409, and a class mode field 5411, but is not limited thereto.

According to one or more exemplary embodiments, the wearable device 100 may set whether to receive the notification message, based on the user input of selecting each mode. For example, the wearable device 100 may determine to block the reception of all notification messages, based on the user input of selecting the sleep mode. In addition, the wearable device 100 may determine to block the reception of all notification messages, except for the notification message from the message application, based on the user input of selecting the meeting mode. However, exemplary embodiments are not limited thereto.

According to one or more exemplary embodiments, each mode may be a predetermined reception setting, and the device 200 or the wearable device 100 may set whether to receive the notification message according to each mode, based on the user input.

Figure 56A:
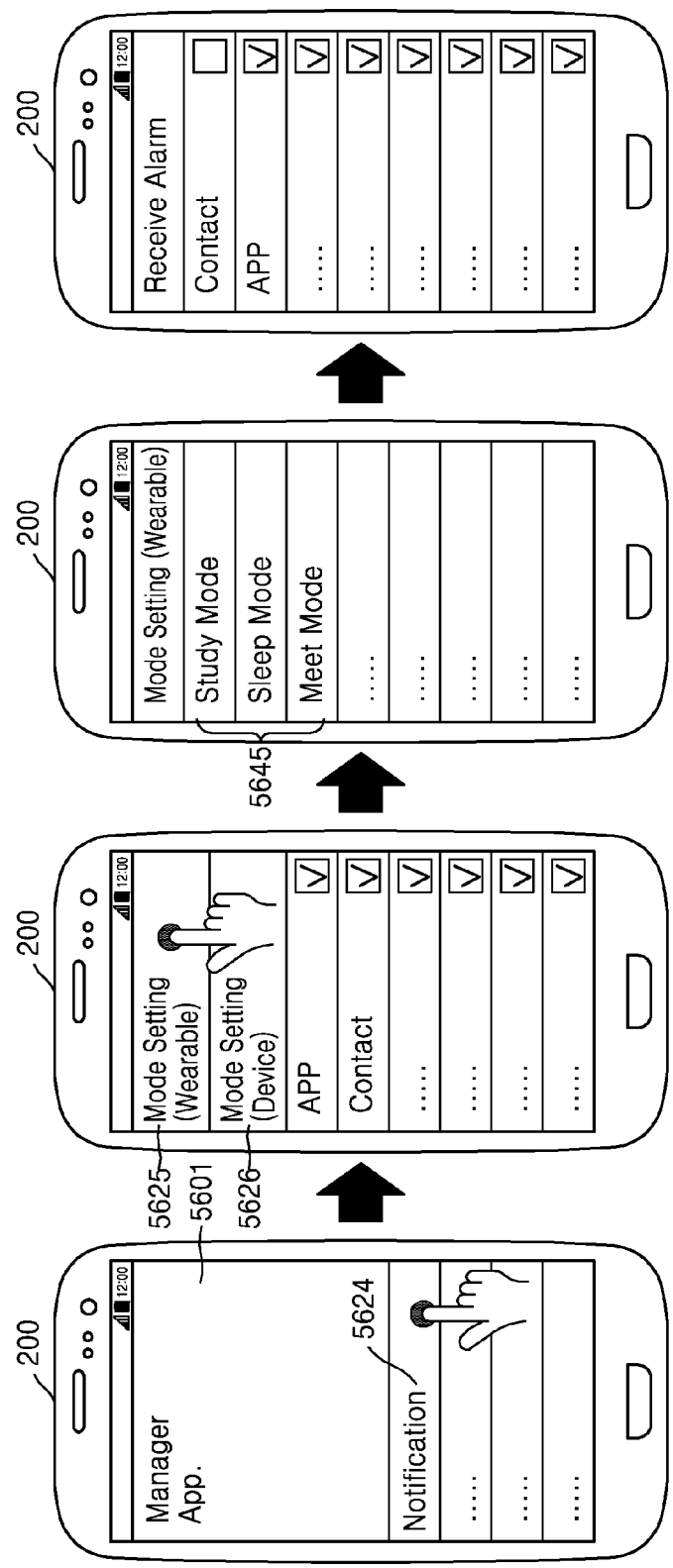
FIGS. 56A to 56C illustrate examples of a setting mode for transmission of a notification message from a device to a wearable device, according to one or more exemplary embodiments.
Figure 56B:
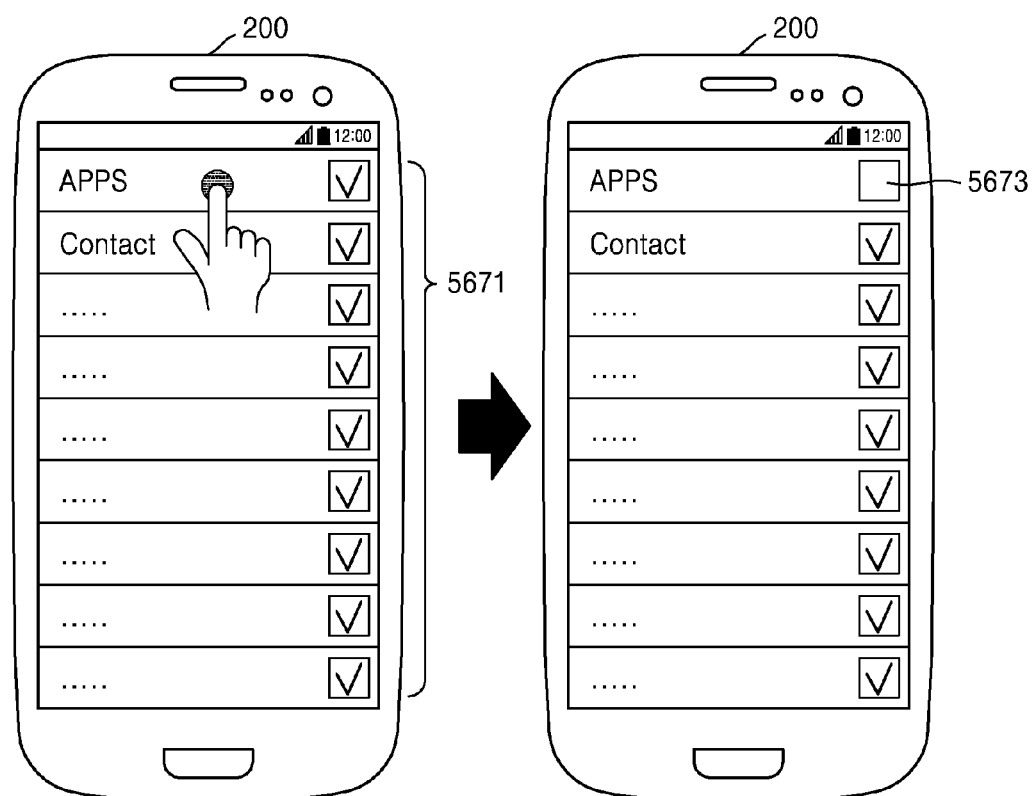
Figure 56C:
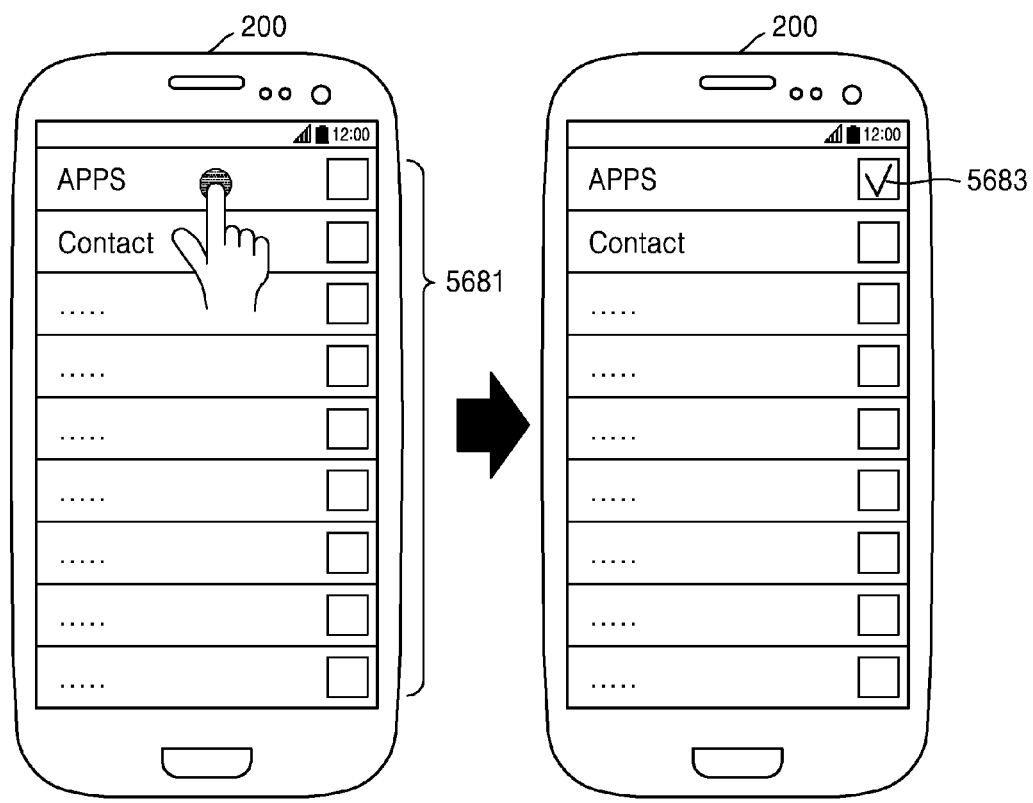

FIG. 56A to 56C illustrates an example of a setting mode for transmission of a notification message from a device 200 to a wearable device 100, according to one or more exemplary embodiments.

Referring to FIG. 56A, the device 200 may set various operations of the device 200, based on a user input. In addition, the device 200 may display a setting window 5601 for setting various operations of the device 200, based on a user input.

The setting window 5601 may include a notification setting field 5624. When a user input of selecting the notification setting field 5624 is received, the device 200 may display a mode setting field 5625 of the wearable device 100 and a mode setting field 5626 of the device 200 for setting a notification message reception of the device 200.

The device 200 may display a list 5645 of a plurality of modes, based on a user input of selecting the mode setting field 5625 of the wearable device 100. According to one or more exemplary embodiments, a name of each mode may be changed.

The notification message reception setting according to the mode corresponding to the selected field may be performed, based on a user input of selecting fields corresponding to at least one mode included in the list 5645 of the plurality of modes.

A notification message reception setting state as used herein may mean a state in which the notification message to be received by the device or the wearable device has been set based on information on whether to receive the notification message. The notification message reception setting state may include a receivable state and a non-receivable state, but is not limited thereto. According to one or more exemplary embodiments, the receivable state may include a state in which a predetermined notification message is set to be received, and the non-receivable state may include a state in which a predetermined notification message is set not to be received.

According to one or more exemplary embodiments, there may be two methods of setting whether to receive the notification message.

According to a first method, in a case where a user selects a certain field in a state where all notification messages are set to be receivable, a reception setting state of a notification message corresponding to the selected field may be changed. For example, in a case where all notification messages are initially in a receivable state and a user selects a certain field, a notification message corresponding to the selected field is changed to a non-receivable state.

Referring to FIG. 56B, the device 200 may display a notification message reception setting screen. All fields 5671 are checked ("✓") by default and all notification messages are in a receivable state. In a case where a user input for selecting at least one field is received, the selected field 5673 is unchecked and changed to a non-receivable state.

The device 200 may display a screen that is set not to receive the notification message, based on the user input for selecting the notification message field. That is, the device 200 may uncheck the selected field, based on the user input for selecting the notification message field.

For example, in a case where a user selects an "APPS" field 5673 in a state where all notification messages 5671 are checked, the "APPS" field 5673 is unchecked and the device 200 does not transmit the notification message related to the unchecked "APPS" field 5673 to the wearable device 100.

In addition, the device 200 may transmit all notification messages, including the notification message related to the unchecked "APPS" field 5673, to the wearable device 100, and the wearable device 100 may not display the notification message related to the "APPS" field 5673 from the received notification messages. Additionally, in this case, the wearable device 100 may delete or not store the received notification message related to the "APPS" field 5673.

According to a second method, in a case where a user selects a certain field in a state where all notification messages are set not to be received, a reception setting state of a notification message corresponding to the selected field may be changed. For example, in a case where all notification messages are in a non-receivable state and a user selects a certain field, a notification message corresponding to the selected field is changed to a receivable state.

Referring to FIG. 56C, the device 200 may display a notification message reception setting screen. All fields 5681 are unchecked by default and all notification messages are set in a non-receivable state. In a case where a user input for selecting at least one field is received, the selected "APPS" field 5683 is checked and changed to a receivable state.

The device 200 may display a screen that is set to receive the notification message, based on the user input for selecting the notification message field. That is, the device 200 may check the selected field, based on the user input for selecting the notification message field.

For example, in a case where a user selects the "APPS" field 5683 in a state where the fields 5681 corresponding to all notification messages are unchecked, the "APPS" field 5683 is checked and the device 200 may transmit the notification message related to the checked "APPS" field 5683 to the wearable device 100.

In addition, the device 200 may transmit all notification messages, including the notification message related to the checked "APPS" field 5683, to the wearable device 100, and the wearable device 100 may display only the notification message related to the "APPS" field 5683 from among the received notification messages. Additionally, in this case, the wearable device 100 may delete or not store the received notification messages that are not related to the "APPS" field 5683.

According to one or more exemplary embodiments, the device 200 may store the notification message reception setting of each mode, and the wearable device 100 may set whether to receive the notification message in the wearable device 100 by selecting the reception setting of each mode that is stored in the device 200.

According to one or more exemplary embodiments, the device 200 may set the mode of the wearable device 100 in the device 200. The device 200 may selectively transmit the notification message to the wearable device 100 according to the set mode. For example, in a case where a user selects a mode setting field 5625 of the wearable device 100 in the device 200 and then selects a study mode from among a plurality of mode lists 5645 displayed on the screen, the device 200 may transmit, to the wearable device 100, only the notification message corresponding to the field selected at the time of setting the study mode. Alternatively, in a case where a user selects a sleep mode from among the plurality of mode lists 5645 displayed on the screen, the device 200 may transmit, to the wearable device 100, only the notification message corresponding to the field selected at the time of setting the sleep mode. Alternatively, in a case where a user selects a meet mode from among the plurality of mode lists 5645 displayed on the screen, the device 200 may transmit, to the wearable device 100, only the notification message corresponding to the field selected at the time of setting the meet mode.

According to one or more exemplary embodiments, in a case where the mode of the wearable device 100 is set in the device 200, the device 200 may transmit mode setting information to the wearable device 200. The wearable device 100 may selectively display the notification message received from the device 200 on the screen of the wearable device 100, based on the mode setting information received from the device 200. For example, the device 200 may transmit all the notification messages to the wearable device 100, and the wearable device 100 may selectively display the received notification messages on the screen, based on the set mode.

Figure 57:
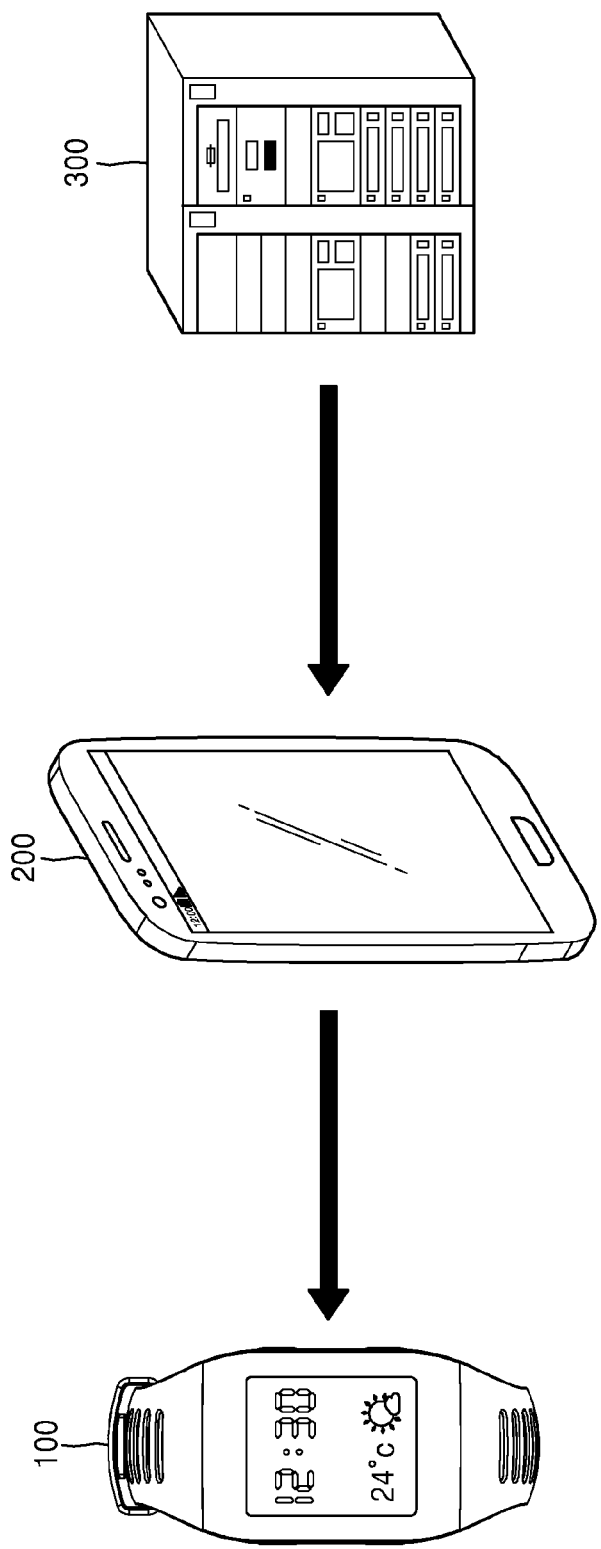
FIG. 57 illustrates a system for transmitting a notification message among a server, a device, and a wearable device, according to an exemplary embodiment.

FIG. 57 illustrates a system for transmitting a notification message including a server 300, a device 200, and a wearable device 100, according to one or more exemplary embodiments.

The wearable device 100 may be connected to the device 200, and the device 200 may be connected to the server 300. According to one or more exemplary embodiments, the wearable device 100 may be directly connected to the server 300, or may be connected to the server 300 via one or more other servers or devices.

According to one or more exemplary embodiments, the wearable device 100 may transmit at least one of information on whether to receive the notification message and acquired bio signal information to the server 300 or the device 200 connected thereto. According to one or more exemplary embodiments, the device 200 may transmit the information received from the server 300 to the wearable device 100, and may transmit the information generated by the device 200 to the wearable device 100.

According to one or more exemplary embodiments, the wearable device 100 may be connected to the device 200 by short-range wireless communication. Since this corresponds to that described above, a detailed description thereof is omitted here.

The server 300 may acquire the bio signal information received from the wearable device 100 or the device 200, and determine a condition of a user, based on the acquired bio signal information. According to one or more exemplary embodiments, the condition of the user may include an emotional state of the user, a motion of the user, and a physical condition of the user, but is not limited thereto. The server 300 may provide the determined condition to at least one of the device 200 and the wearable device 100, and the device 200 or the wearable device 100 may set whether to receive the notification message, based on the information on the condition of the user that is provided from the server 300.

Figure 58A:
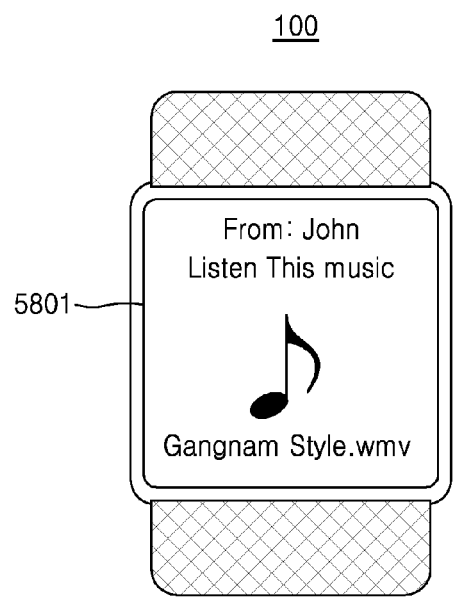
FIGS. 58A and 58B illustrate examples of a method of streaming content included in a notification message, according to an exemplary embodiment.
Figure 58B:
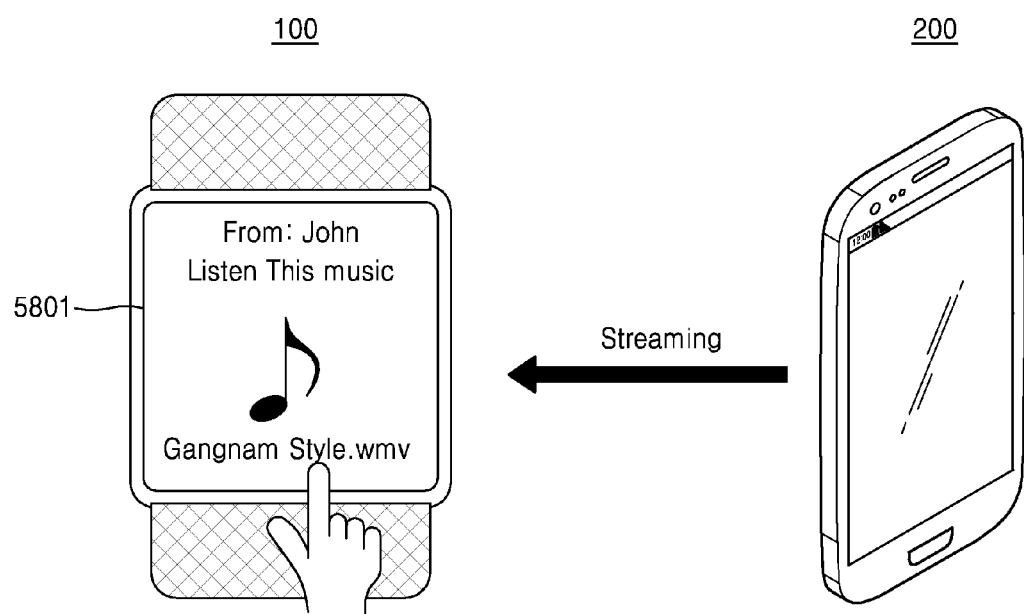

FIGS. 58A and 58B illustrate examples of a method of streaming content included in a notification message, according to one or more exemplary embodiments.

The wearable device 100 may receive a notification message from the device 200. According to one or more other exemplary embodiments, the wearable device 100 may receive the notification message from a server.

The notification message may include content, and the content may include at least one of music, a moving picture, an image, a text, etc. In addition, the content included in the notification message may include information for receiving a streaming service.

Referring to FIG. 58A, the wearable device 100 may display content included in a notification message on a screen 5801. Music data is included in the form of an attached file within the notification message.

According to one or more exemplary embodiments, the wearable device 100 may receive the attached file itself from the device 200, or may receive information for receiving the streaming service instead of the attached file. For example, in FIG. 58A, the wearable device 100 receives a notification message including an attached file "Gangnam Style.wmv" from the device 200. The wearable device 100 may execute the attached file, based on a user input.

Referring to FIG. 58B, the wearable device 100 may display content included in a notification message on a screen 5801. In FIG. 58B, music data is included in the form of an attached file within the notification message.

However, in FIG. 58B, the wearable device 100 may receive a notification message, without an attached file, from the device 200. The wearable device 100 may receive information on the attached file, instead of the attached file, and information capable of receiving the music of the attached file from the device 200 by streaming the music.

The wearable device 100 may receive data and play the music by streaming the music from the device 200, based on a user input. According to one or more exemplary embodiments, in a case where it is difficult to provide the attached file by a streaming service, the wearable device 100 may display a message indicating the checking of the attached file in the device 200 on the screen.

Figure 59:
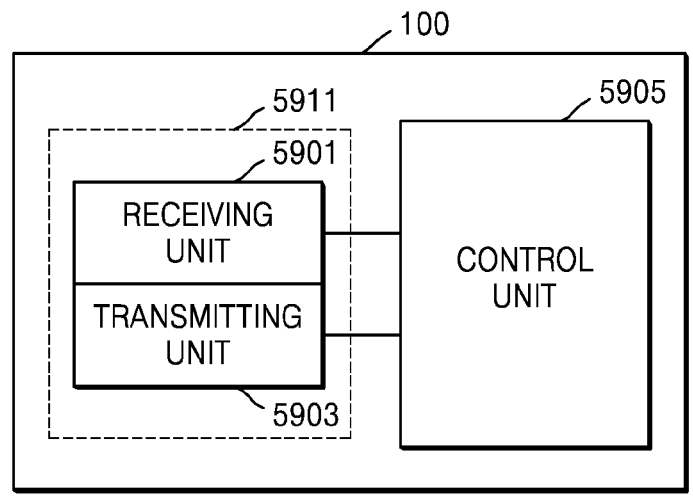
FIG. 59 is a block diagram illustrating a configuration of a wearable device, according to an exemplary embodiment.

FIG. 59 is a block diagram illustrating a configuration of a wearable device 100, according to one or more exemplary embodiments.

As illustrated in FIG. 59, the wearable device 100 according to the exemplary embodiment may include a communicator 5911 (e.g., communication unit) and a controller 5905 (e.g., control unit). The communicator 5911 may include a receiver 5901 (e.g., receiving unit) and a transmitter 5903 (e.g., transmitting unit, transmitting device, etc.). It is understood that according to one or more other exemplary embodiments, the wearable device 100 may be implemented with a larger number of elements than illustrated in FIG. 59, or may be implemented with a smaller number of elements than illustrated in FIG. 59.

The communicator 5911 may include the receiver 5901 and the transmitter 5903, and the communicator 5911 may include one or more elements for communication with the device 200 or the server 300.

The communicator 5911 may transmit and receive data by using a local area network, a wide area network, a value added network, a satellite communication network, a personal area network, etc.

The receiver 5901 may receive a notification message from the device 200 connected thereto. According to one or more exemplary embodiments, the notification message may include, as attribute information, at least one of sender information, application information, date information, time information, content information, recipient information, biometric information, etc. In addition, according to one or more exemplary embodiments, the receiver 5901 may directly receive the notification message from an external server.

The transmitter 5903 may transmit, to the device 200, information on whether to receive the notification message from the wearable device 100. According to one or more exemplary embodiments, the information on whether to receive the notification message may include information on an attribute selected by the wearable device 100, and information on whether to receive a notification message corresponding to the selected attribute. In addition, according to one or more exemplary embodiments, the information on whether to receive the notification message may include at least one of the sender information, the application information, the date information, the time information, the content information, the recipient information, the biometric information, etc., of the received notification message.

According to one or more exemplary embodiments, the transmitter 5903 may transmit, to the device 200, information on whether to prioritize the notification message.

The receiver 5901 and the transmitter 5903 are merely distinguished for convenience of description, and both the operation of the receiver 5901 and the operation of the transmitter 5903 may be performed in the communicator 5911, by different communicators, or by a plurality of communicators.

The controller 5905 controls an overall operation of the wearable device 100. For example, the controller 5905 may control elements included in the wearable device 100 by executing a program stored in the wearable device 100.

The controller 5905 may set whether to receive, via the receiver 5901, a notification message. According to one or more exemplary embodiments, the controller 5905 may select an attribute of the notification message and set whether to receive a notification message corresponding to the selected attribute. According to one or more exemplary embodiments, the controller 5905 may generate notification message reception setting information that is information indicating whether to receive a notification message.

According to one or more exemplary embodiments, the controller 5905 may set whether to receive a notification message corresponding to the attribute of the received notification message.

According to one or more exemplary embodiments, the controller 5905 may set whether to receive a notification message including the same sender information as the sender information of the received notification message. In addition, according to one or more exemplary embodiments, the controller 5905 may set whether to receive a notification message including the same application information as the application information of the received notification message, the same content information as the content information of the received notification message, the same recipient information as the recipient information of the received notification message, the same date information as the date information of the received notification message, the same time information as the time information of the received notification message, the same biometric information as the biometric information of the received notification message, etc.

According to one or more exemplary embodiments, the controller 5905 may change predetermined information on whether to receive a notification message, based on the information on whether to receive the notification message.

In addition, according to one or more exemplary embodiments, the controller 5905 may determine to block all notification messages in the wearable device 100. According to one or more exemplary embodiments, the controller 5905 may determine to always receive notification messages including the same sender information as the sender information of the received notification message and block all other notification messages except for notification messages determined to be always received.

According to one or more exemplary embodiments, the controller 5905 may determine whether to prioritize notification messages including the same sender information as the sender information of the received notification message, the same application information as the application information of the received notification message, the same content information as the content information of the received notification message, the same recipient information as the recipient information of the received notification message, the same date information as the date information of the received notification message, the same time information as the time information of the received notification message, the same biometric information as the biometric information of the received notification message, etc. In addition, according to one or more exemplary embodiments, the controller 5905 may determine a method of displaying the received notification message, based on information on whether to prioritize the notification message.

According to one or more exemplary embodiments, the controller 5905 may select an attribute based on acquired bio signal information, and determine whether to receive a notification message corresponding to the selected attribute. In addition, according to one or more exemplary embodiments, the controller 5905 may determine whether to display the notification message corresponding to the selected attribute.

Figure 60:
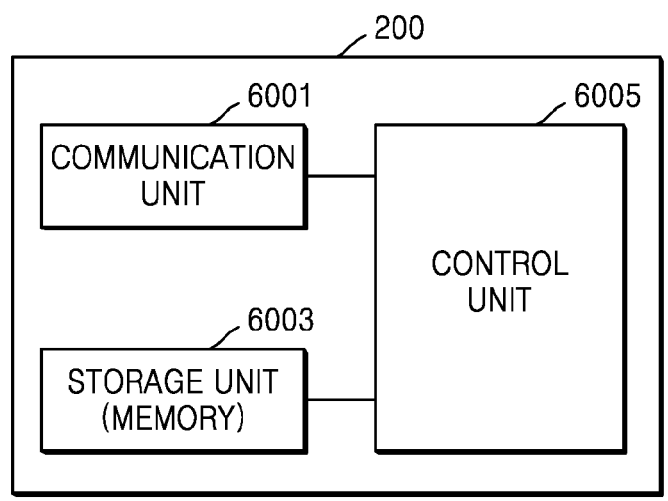
FIG. 60 is a block diagram illustrating a configuration of a device, according to an exemplary embodiment.

FIG. 60 is a block diagram illustrating a configuration of a device 200, according to one or more exemplary embodiments.

As illustrated in FIG. 60, the device 200 according to the exemplary embodiment may include a communicator 6001, a storage (e.g., memory) 6003, and a controller 6005. It is understood that, in one or more other exemplary embodiments, the device 200 may be implemented with a larger number of elements than illustrated in FIG. 60, or may be implemented with a smaller number of elements than illustrated in FIG. 60.

The communicator 6001 may transmit a notification message to the wearable device 100. In addition, the communicator 6001 may receive a notification message from a server. The notification message may include a notification message acquired or determined by or in response to the occurrence of a notification event. According to one or more exemplary embodiments, the notification message may include at least one of sender information, application information, content information, date information, time information, recipient information, biometric information, etc.

The communicator 6001 may receive information on whether to receive the notification message from the wearable device 100. According to one or more exemplary embodiments, the communicator 6001 may receive information on whether to prioritize the notification message from the wearable device 100.

The storage 6003 may include a memory. The storage 6003 may store the notification transmission setting that is changed in the controller 6005. In addition, according to one or more exemplary embodiments, the storage 6003 may store at least one of information on whether to receive the notification message and information on whether to prioritize the notification message, which are received from the wearable device 100.

In addition, according to one or more exemplary embodiments, the storage 6003 may store a predetermined notification message transmission setting of the device 200, and may store a notification message transmission/reception setting according to each mode.

The controller 6005 controls an overall operation of the device 200. For example, the controller 6005 may control elements included in the wearable device 100 by executing a program stored in the device 200.

The controller 6005 may change information on whether to transmit the notification message to the wearable device 100, based on the received information on whether to receive the notification message. In addition, the controller 6005 may acquire a notification message generated by a notification event.

According to one or more exemplary embodiments, the controller 6005 may determine a notification message to be transmitted to the wearable device 100, based on the received information on whether to receive the notification message. In addition, the controller 6005 may selectively transmit the notification message to the wearable device 100 by determining whether the notification message is a notification message corresponding to the attribute selected in the wearable device 100 and controlling the communicator 6001.

According to one or more exemplary embodiments, the controller 6005 may determine a size of content of the notification message, which is to be transmitted to the wearable device 100, based on the received information on whether to prioritize the notification message. Since this corresponds to that described above, a detailed description thereof is omitted here.

Figure 61:
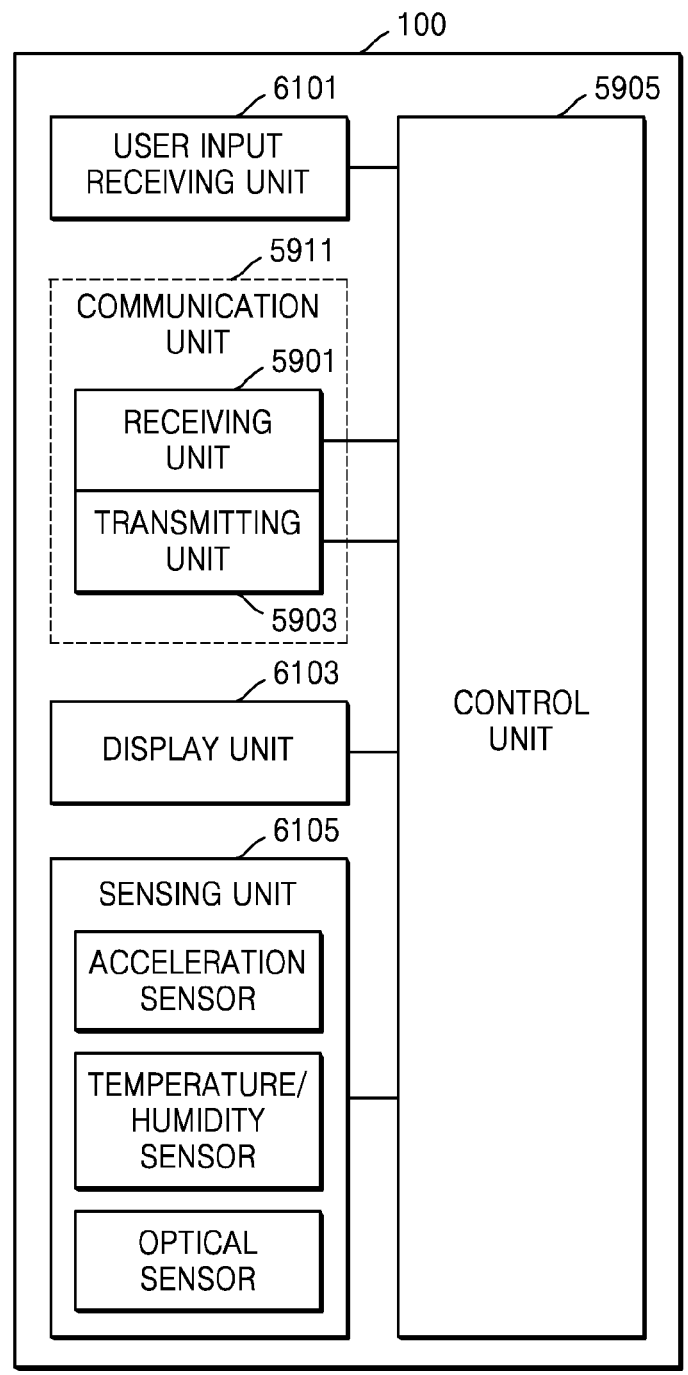
FIG. 61 is a block diagram illustrating a configuration of a wearable device, according to an exemplary embodiment.

FIG. 61 is a block diagram illustrating a configuration of a wearable device 100, according to one or more exemplary embodiments.

As illustrated in FIG. 61, the wearable device 100 according to the exemplary embodiment may include a communicator 5911, a controller 5905, a user input receiver 6101, and a sensor 6105. The communicator 5911 may include a receiver 5901 and a transmitter 5903.

Since the communicator 5911 including the receiver 5901 and the transmitter 5903 and the controller 5905 correspond to those described above, a detailed description thereof is omitted here. In addition, according to one or more exemplary embodiments, the controller 5909 may control the respective elements included in the device 200 so as to perform the above-described operations of the device 200.

The user input receiver 6101 allows the wearable device 100 to receive a user input. The user input receiver 6101 refers to a unit, device, mechanism, etc., that allows a user to input data for controlling the wearable device 100. For example, the user input device 6101 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, a jog switch, a dial, a switch, a microphone, an acceleration sensor, a gesture sensor, but is not limited thereto. In addition, the user input receiver 6101 may determine the reception of the user input, based on predetermined information acquired in the sensor 6105.

According to one or more exemplary embodiments, the user input receiver 6101 may receive a user input of selecting at least one attribute of the notification message. In addition, the user input receiver 6101 may receive a user input of selecting the reception or blocking of the notification message corresponding to the selected attribute. According to one or more exemplary embodiments, the user input receiver 6101 may receive a user input of selecting whether to prioritize the notification message or selecting a predetermined mode.

The display 6103 may display whether to receive the notification message or display content included in the received notification message. In addition, according to one or more exemplary embodiments, the display 6103 may display a variety of information, such as time information and information on a state of a provided service. This corresponds to that described above.

The output device 6220 operates to output an audio signal, a video signal, or a vibration signal. The output device 6220 may include a display 6221, an audio output device 6222, and a vibration motor 6223.

In a case where the display 6103 and a touch pad form a layered structure to correspond to a touch screen, the display 6103 may also be used as an input device as well as an output unit. The display 6103 may include at least one of a Liquid Crystal Display (LCD), a Thin-Film Transistor-Liquid Crystal Display (TFT-LCD), an Organic Light-Emitting Diode (OLED) display, a flexible display, a three-dimensional (3D) display, an electrophoretic display, a light emitting diode (LED) display, a plasma display panel, an active-matrix OLED (AMOLED) display, etc.

The sensor 6105 may include at least one of an acceleration sensor 6106, a temperature/humidity sensor 6107, and an optical sensor 6108, but is not limited thereto. The acceleration sensor 6106 may acquire motion information of a user. The temperature/humidity sensor 6107 may acquire bio signal information of a user, such as a pulse and a body temperature.

In addition, according to one or more exemplary embodiments, the wearable device 100 may include a memory. The memory may include a storage medium of at least one type of a flash memory type, a hard disk type, a multimedia card type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In addition, according to one or more exemplary embodiments, the wearable device 100 may further include an audio output device and a vibration motor.

Figure 62:
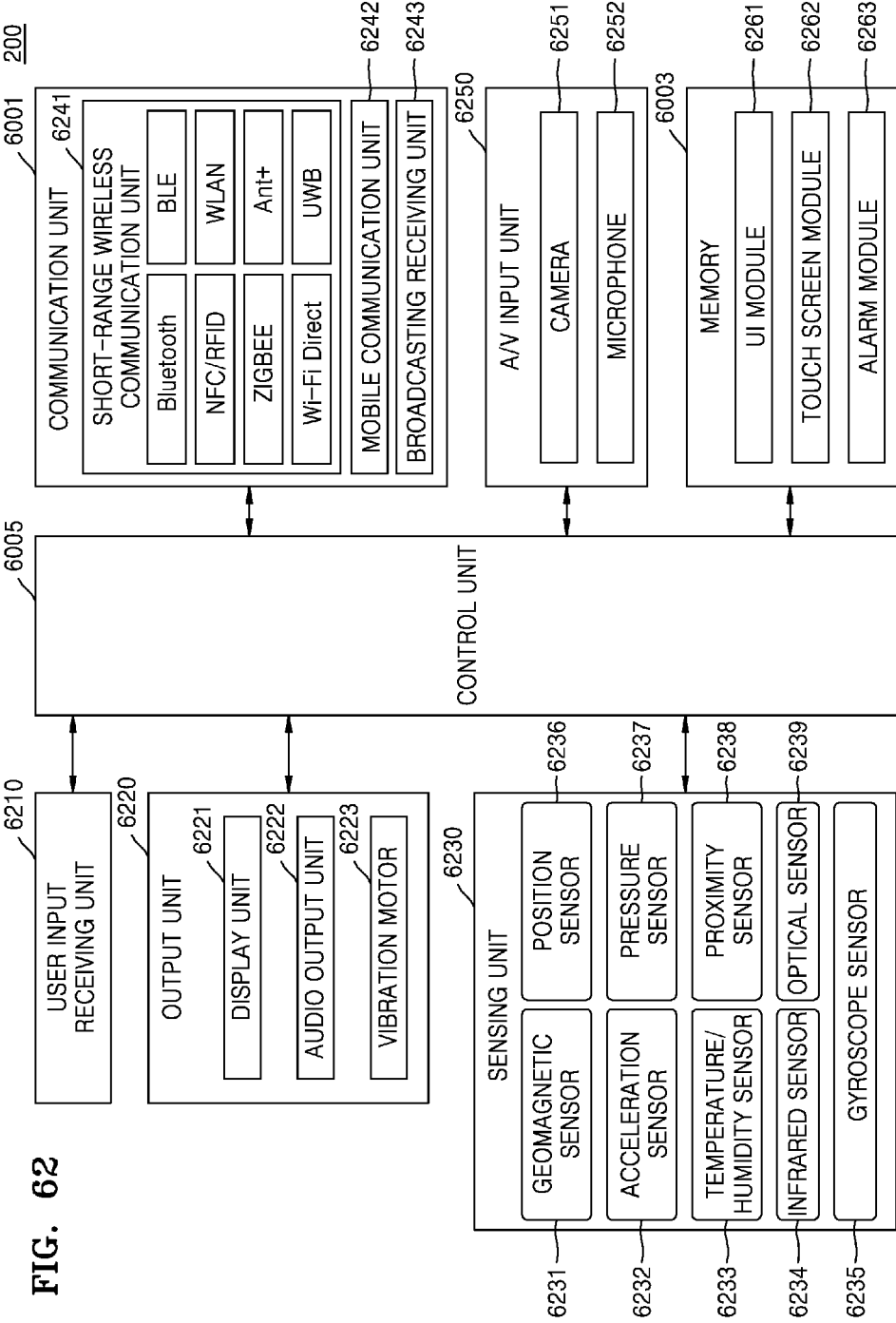
FIG. 62 is a block diagram illustrating a configuration of a device, according to an exemplary embodiment.

FIG. 62 is a block diagram illustrating a configuration of a device 200, according to one or more exemplary embodiments.

As illustrated in FIG. 62, the device 200 according to the present exemplary embodiment may include a communicator 6001, a storage (e.g., memory) 6003, a controller 6005, a user input receiver 6210, an output device 6220, a sensor 6230, and an A/V input device 6250.

The communicator 6001 may include one or more elements for communication between the device 200 and the wearable device 100 or between the device 200 and the server 300. For example, the communicator 6001 may include a short-range wireless communicator 6241, a mobile communicator 6242, a broadcasting receiver 6243, etc.

The short-range wireless communicator 6241 may include a Bluetooth communicator, a Bluetooth Low Energy (BLE) communicator, a Near Field Communication (NFC) unit, a wireless local area network (WLAN), i.e., WiFi, communicator, a Zigbee communicator, an infrared data association (IrDA) communicator, a Wi-Fi Direct (WFD) communicator, an Ultra WideBand (UWB) communicator, and an Ant+ communicator, but is not limited thereto.

The mobile communicator 6242 transmits and receives a wireless signal to and from at least one of a base station, an external terminal, and a server on a mobile communication network. The wired signal may include a voice call signal, a video call signal, or various types of data according to text/multimedia message transmission/reception.

The broadcasting receiver 6243 receives broadcasting signals and/or broadcasting-related information via a broadcasting channel. The broadcasting channel may include a satellite channel and a terrestrial broadcast channel. According to one or more other exemplary embodiments, the device 200 may not include the broadcasting receiver 6243.

In addition, the communicator 6001 may transmit the notification message to the wearable device 100, and may receive information on whether to receive the notification message from the wearable device 100. According to one or more exemplary embodiments, the device 200 may transmit the notification message to the wearable device 100 by the short-range wireless communication, and may receive information on whether to receive the notification message from the wearable device 100. Since this corresponds to that described above, a detailed description thereof is omitted here.

The memory 6003 may store programs for processing and control of the controller 6005, and may store data input from the device 200 or output from the device 200.

The memory 6003 may include a storage medium of at least one type of a flash memory type, a hard disk type, a multimedia card type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The programs, stored in the memory 6003, may be classified into a plurality of modules according to functions. For example, the programs may be classified into a User Interface (UI) module 6261, a touch screen module 6262, and an alarm module 6263.

The UI module 6261 may provide a specialized UI or GUI which interworks with the device 200 according to applications. The touch screen module 6262 may identify a touch gesture on a touch screen by a user and transmit information on the touch gesture to the controller 6005. According to one or more exemplary embodiments, the touch screen module 6262 may recognize and analyze touch codes. The touch screen module 6262 may be implemented with separate hardware including a controller.

Various types of sensors may be disposed inside or near the touch screen, in order to identify (e.g., detect, determine, etc.) a touch or a proximity touch on the touch screen. An example of a sensor for identifying a touch on the touch screen may be a tactile sensor. The tactile sensor is a sensor for identifying a contact of a specific object to such a degree that humans may feel the contact with the specific object or to a higher degree. The tactile sensor may identify various types of information such as information about a roughness of a contact surface, a hardness of a contact object, a temperature at a contact point, and/or the like.

Additionally, an example of a sensor for identifying a touch on the touch screen is a proximity sensor.

The proximity sensor refers to a sensor that identifies the presence or absence of an object approaching a predetermined detection surface or an object existing near the sensor by an electromagnetic force or infrared light, without mechanical contact. Examples of the proximity sensor includes a transmission-type photoelectric sensor, a direct reflection-type photoelectric sensor, a mirror reflection-type photoelectric sensor, a radio frequency oscillation-type proximity sensor, an electrostatic capacitance type proximity sensor, a magnetic-type proximity sensor, an infrared proximity sensor. Touch gestures of a user may include a tap, a touch and hold, a double-tap, a drag, panning, a flick, a drag-and-drop, a swipe, and/or the like.

The alarm module 6263 outputs a signal for notifying an event occurrence of the device 200. Examples of events occurring in the device 200 include a call signal reception, a message reception, a key signal input, and a touch input. The alarm module 6263 may output an alarm signal in a form of a video signal via the display 6221 or in a form of an audio signal via the audio output unit 6222. The alarm module 6263 may also output an alarm signal in a form of a vibration signal via the vibration motor 6223. Since the operation of the memory 6003 corresponds to that described above, a detailed description thereof is omitted here.

The controller 6005 controls an overall operation of the device 200. For example, the controller 6005 may control elements included in the wearable device 100 by executing a program stored in the device 200. Since this corresponds to that described above, a detailed description thereof is omitted here.

The user input receiver 6210 is a unit, device, mechanism, etc., that allows the user to input data for controlling the device 200. For example, the user input receiver 6210 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but is not limited thereto.

The output device 6220 operates to output an audio signal, a video signal, or a vibration signal. The output device 6220 may include a display 6221, an audio output device 6222, and a vibration motor 6223.

The display 6221 displays information processed in the device 200.

Meanwhile, in a case where the display 6221 and a touch pad form a layered structure to correspond to a touch screen, the display 6221 may also be used as an input device as well as an output unit. The display 6221 may include at least one from among a Liquid Crystal Display (LCD), a Thin-Film Transistor-Liquid Crystal Display (TFT-LCD), an Organic Light-Emitting Diode (OLED) display, a flexible display, a three-dimensional (3D) display, an electrophoretic display, a light emitting diode (LED) display, a plasma display panel, an active-matrix (AMOLED) display, a cathode ray tube (CRT) display, etc. According to implementations of the device 200, the device 200 may include two or more displays 6221. The two or more displays 6221 may be disposed to face each other by a hinge.

The audio output device 6222 outputs audio data that may be received from the communicator 6001 or stored in the memory 6003. In addition, the audio output device 6222 outputs an audio signal related to functions performed at the device 200 such as, for example, a call signal reception sound, a message reception sound, and an alarm sound. The audio output device 6222 may include a speaker, a buzzer, and/or the like.

The vibration motor 6223 may output a vibration signal. For example, the vibration motor 6223 may output a vibration signal which corresponds to an output of audio data or video data such as, for example, a call signal reception sound, a message reception sound, and/or the like. Additionally, the vibration motor 6223 may output a vibration signal, if a touch is input to a touch screen.

The sensor 6230 may identify a status of the device 200 or a status of an object to which the device 200 is attached, and transmit the sensing information to the controller 6005.

The sensor 6230 may include at least one of a geomagnetic sensor 6231, an acceleration sensor 6232, a temperature/humidity sensor 6233, an infrared sensor 6234, a gyroscope sensor 6235, a position sensor (for example, GPS) 6236, a pressure sensor 6237, a proximity sensor 6238, and an optical sensor 6239, but is not limited thereto. Additionally, since the operations of the respective sensors may be intuitively inferred from their names, a detailed description thereof is omitted here.

The audio/video (A/V) input device 6250 operates to input audio or video signals, and may include a camera 6251 and a microphone 6252. The camera 6251 may obtain an image frame such as a still picture or a moving picture through an image sensor, in a video phone mode or a photographing mode. An image captured through the image sensor may be processed through the controller 6005 or an additional image processing unit.

The image frame processed in the camera 6251 may be stored in memory 6003, or transmitted through the communicator 6001. The A/V input device 6250 may include two or more cameras 6251 according to a configuration type of the terminal.

The microphone 6252 receives external sound signals and processes the external sound signals into electrical voice data. For example, the microphone 6252 may receive audio signals from an external device 200 or a speaker. The microphone 6252 may use various noise removal algorithms for removing noise generated in the process of receiving external audio signals.

In addition, one or more exemplary embodiments can be implemented through computer-readable code/instructions in/on a medium, e.g., a computer-readable medium, to control at least one processing element to implement any above-described exemplary embodiment. The medium can correspond to any medium/media permitting the storage and/or transmission of the computer readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer-readable code is stored/transferred and executed in a distributed fashion. Furthermore, the processing element could include a processor or a computer processor, and processing elements may be distributed and/or included in a single device.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to exemplary embodiments illustrated in the drawings, and specific language has been used to describe these exemplary embodiments. However, no limitation of the scope of this disclosure is intended by this specific language, and this disclosure should be construed to encompass all embodiments that would normally occur to one of ordinary skill in the art in view of this disclosure.

Exemplary embodiments may be described in terms of functional block components and various processing steps. Such functional blocks may be realized by any number of hardware and/or software components configured to perform the specified functions. For example, exemplary embodiments may employ various integrated circuit components (e.g., memory elements, processing elements, logic elements, look-up tables, and the like) that may carry out a variety of functions under the control of one or more processors or other control devices. Similarly, where the elements of exemplary embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, exemplary embodiments could employ any number of related art techniques for electronics configuration, signal processing, control, data processing, and the like. The words "mechanism" and "element" are used broadly and are not limited to mechanical or physical exemplary embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

It should be understood that exemplary embodiments described herein should be considered in a descriptive sense only and not for purposes of limitation. Descriptions of features or aspects within each embodiment should typically be considered as available for other similar features or aspects in other exemplary embodiments.

While one or more exemplary embodiments of the present disclosure have been described above with reference to the figures, it will be understood by those of ordinary skill in the art that various changes in form and details may be made therein without departing from the spirit and scope of the present disclosure as defined by the following claims.

What is claimed is:

1. A portable device comprising:
a wireless communicator configured to receive, from a wearable device via wireless communication, information regarding a notification setting; and
a controller configured to identify an event and to determine, based on the received information, whether to transmit a notification to the wearable device in response to the identified event,
wherein the notification setting is a setting, input by a user, of whether or not to receive, by the wearable device from the portable device, notifications corresponding to the event based on an attribute of the event.

2. The portable device according to claim 1, further comprising:
a storage configured to store the notification setting based on the received information,
wherein in response to the event, the controller determines, based on the stored notification setting, whether to transmit the notification to the wearable device.

3. The portable device according to claim 1, wherein:
the received information regarding the notification setting comprises sender information; and
in response to receiving a message from an external device, the controller determines not to transmit, to the wearable device, a notification notifying of the received message when a sender of the received message corresponds to the sender information.

4. The portable device according to claim 3, further comprising a storage configured to store the received message.

5. The portable device according to claim 1, wherein:
the received information regarding the notification setting comprises application information; and
in response to an event caused by an application, the controller determines not to transmit, to the wearable device, a notification for the event when the application corresponds to the application information.

6. The portable device according to claim 1, wherein:
the received information regarding the notification setting comprises content information; and
in response to an event related to content, the controller determines not to transmit, to the wearable device, a notification for the event when the content corresponds to the content information.

7. The portable device according to claim 1, wherein:
the wireless communicator transmits, to the wearable device, a first notification in response to the notification event, and receives, from the wearable device, the information regarding the notification setting for the event in response to the transmitted first notification.

8. The portable device according to claim 7, wherein:
the received information regarding the notification setting comprises at least one from among sender information, application information, and content information included in the first notification; and
the controller determines the setting to not transmit a second notification for the event that corresponds to the at least one from among the sender information, the application information, and the content information.

9. A wearable device comprising:
a wireless communicator configured to receive, from another device via wireless communication, a notification corresponding to an event identified by the other device;
an output device configured to output the notification or an indicator of the notification;
an input device configured to receive, in response to the output notification or the output indicator of the notification, a user input of a notification setting with respect to the received notification; and
a controller configured to control the wireless communicator to transmit, to the other device, information regarding the notification setting,
wherein the notification setting is a setting for transmission of notifications from the other device to the wearable device based on the user input with respect to the received notification, and
wherein the notification setting is a setting of whether or not to receive, by the wearable device from the other device, notifications corresponding to the event based on an attribute of the event.

10. The wearable device according to claim 9, wherein:
the notification setting corresponds to sender information of the received notification; and
the controller controls the wireless communicator to transmit the information regarding the notification setting to instruct the other device to not transmit, to the wearable device, a notification for an event when sender information of the event corresponds to the sender information of the received notification.

11. The wearable device according to claim 9, wherein:
the notification setting corresponds to application information of the received notification; and
the controller controls the wireless communicator to transmit the information regarding the notification setting to instruct the other device to not transmit, to the wearable device, a notification for an event when application information of the event corresponds to the application information of the received notification.

12. The wearable device according to claim 9, wherein:
the notification setting corresponds to content information of the received notification; and
the controller controls the wireless communicator to transmit the information regarding the notification setting to instruct the other device to not transmit, to the wearable device, a notification for an event when content information of the event corresponds to the content information of the received notification.

13. The wearable device according to claim 9, wherein the controller controls the wireless communicator to transmit the information regarding the notification setting to instruct the other device to not transmit, to the wearable device, a notification for an event when attribute information of the event corresponds to selected attribute information of the received notification, selected via the received user input.

14. The wearable device according to claim 9, wherein the controller controls the wireless communicator to transmit the information regarding the notification setting to instruct the other device to transmit, to the wearable device, a notification for an event when attribute information of the event corresponds to selected attribute information of the received notification, selected via the received user input.

15. The wearable device according to claim 9, wherein the controller controls the wireless communicator to transmit the information regarding the notification setting to instruct the other device to prioritize a notification for an event when attribute information of the event corresponds to selected attribute information of the received notification, selected via the received user input.

16. The wearable device according to claim 9, wherein the wireless communication is a Bluetooth communication, a Bluetooth Low Energy (BLE) communication, a Near Field Communication (NFC), a Zigbee communication, an infrared data association (IrDA) communication, or a Wi-Fi Direct (WFD) communication.

17. A system comprising:
a portable device comprising:
  a first wireless communicator configured to perform a wireless communication, and
  a first controller configured to identify an event and to transmit, via the wireless communication, a first notification in response to the identified event; and
a wearable device comprising:
  a second wireless communicator configured to receive, from the portable device via the wireless communication, the first notification,
  an output device configured to output the first notification or an indicator of the first notification,
  an input device configured to receive, in response to the output first notification or the output indicator of the first notification, a user input of a notification setting with respect to the received first notification, and
  a second controller configured to control the second wireless communicator to transmit, to the portable device, information regarding the notification setting,
wherein the first wireless communicator is configured to receive, from the wearable device via the wireless communication, the information regarding the notification setting,
wherein in response to identifying the event again, the first controller is configured to determine, based on the received information, whether to transmit a second notification to the wearable device in response to the identified event, and
wherein the notification setting is a setting of whether or not to receive, by the wearable device from the portable device, notifications corresponding to the event based on an attribute of the event.

18. The system according to claim 17, wherein:
the received information regarding the notification setting comprises sender information; and
in response to receiving a message from an external device, the first controller determines not to transmit, to the wearable device, a notification notifying of the received message when a sender of the received message corresponds to the sender information.

19. The system according to claim 17, wherein:
the received information regarding the notification setting comprises application information; and
in response to an event caused by an application, the first controller determines not to transmit, to the wearable device, a notification for the event when the application corresponds to the application information.

20. The system according to claim 17, wherein:
the received information regarding the notification setting comprises content information; and
in response to an event related to content, the first controller determines not to transmit, to the wearable device, a notification for the event when the content corresponds to the content information.

21. A wearable device comprising:
a communicator configured to receive notification messages from a device connected to the wearable device via short-range wireless communication;
a display configured to display at least one notification message;
an input device configured to receive a user input of a notification setting with respect to the at least one notification message; and
a controller configured to:
  control the communicator to transmit, to the device, information regarding the notification setting; and
  determine the at least one notification message to be displayed on the display from among the received notification messages, based on information on whether to receive the at least one notification message,
wherein the communicator is further configured to receive, from the device, the information on whether to receive the at least one notification message, the at least one notification message being based on the information regarding the notification setting.

22. A device comprising:
a display configured to display a setting of whether to receive notification messages;
a communicator configured to transmit, to a wearable device connected to the device via short-range wireless communication, information on whether to receive the notification messages; and
a controller configured to:
  control, in a state where all the notification messages are set to be receivable by the wearable device, the communicator to receive, from the wearable device, a user input for changing a setting of receivable notification messages,
  change the setting of the receivable notification messages, based on the received user input, and
  transmit information on the changed setting to the wearable device,
wherein the setting of the receivable notification messages is a setting of whether or not to receive, by the wearable device from the device, notifications corresponding to an event based on an attribute of the event.

* * * * *